US012748356B2

(12) United States Patent
Fujii et al.

(10) Patent No.: US 12,748,356 B2
(45) Date of Patent: Sep. 29, 2026

(54) ELECTROPHOTOGRAPHIC PHOTORECEPTOR, PROCESS CARTRIDGE, AND IMAGE FORMING APPARATUS

(71) Applicant: FUJIFILM Business Innovation Corp., Tokyo (JP)

(72) Inventors: Ryosuke Fujii, Ebina (JP); Tomoya Sasaki, Ebina (JP); Hiroko Kobayashi, Ebina (JP); Yuto Okazaki, Ebina (JP); Kosuke Narita, Ebina (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 544 days.

(21) Appl. No.: 18/362,566

(22) Filed: Jul. 31, 2023

(65) Prior Publication Data

US 2024/0248419 A1 Jul. 25, 2024

(30) Foreign Application Priority Data

Jan. 11, 2023 (JP) ................................. 2023-002700

(51) Int. Cl.

| | |
|---|---|
| ***G03G 5/05*** | (2006.01) |
| ***C08G 63/54*** | (2006.01) |
| ***C08G 64/06*** | (2006.01) |

(52) U.S. Cl.

CPC ............. *G03G 5/056* (2013.01); *C08G 63/54* (2013.01); *C08G 64/06* (2013.01); *G03G 5/0564* (2013.01)

(58) Field of Classification Search

CPC ............................. G03G 5/056; G03G 5/0564

See application file for complete search history.

(56) References Cited

FOREIGN PATENT DOCUMENTS

| | | |
|---|---|---|
| JP | 04-087823 A | 3/1992 |
| JP | 05-011700 B2 | 2/1993 |

(Continued)

OTHER PUBLICATIONS

Translation of WO 2008/050669.*
Translation of WO 2012/115088.*

*Primary Examiner* — Peter L Vajda

(74) *Attorney, Agent, or Firm* — Sughrue Mion, PLLC

(57) ABSTRACT

An electrophotographic photoreceptor contains a conductive substrate, and a lamination type photosensitive layer disposed on the conductive substrate and including a charge generation layer and a charge transport layer, in which the charge transport layer contains a charge transport material, at least one of a polyester resin or a polycarbonate resin that has a constitutional unit containing biphenyl represented by Formula (1), and an aromatic dicarboxylic acid represented by Formula (2), Formula (1)

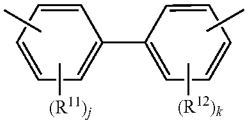

Formula (2)

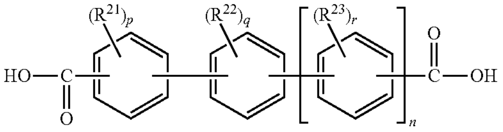

in Formula (1), j represents an integer of 0 or greater and 4 or less, j pieces of $R^{11}$'s each independently represent a methyl group or an ethyl group, k represents an (Continued)

10A integer of 0 or greater and 4 or less, and k pieces of $R^{12}$'s each independently represent a methyl group or an ethyl group, in Formula (2), p represents an integer of 0 or greater and 4 or less, p pieces of $R^{21}$'s each independently represent a methyl group or an ethyl group, q represents an integer of 0 or greater and 4 or less, q pieces of $R^{22}$'s each independently represent a methyl group or an ethyl group, r represents an integer of 0 or greater and 4 or less, r pieces of $R^{23}$'s each independently represent a methyl group or an ethyl group, and n represents 0 or 1.

20 Claims, 3 Drawing Sheets

(56) References Cited

FOREIGN PATENT DOCUMENTS

| | | | | | |
|---|---|---|---|---|---|
| JP | 05-036951 | A | | 2/1993 | |
| JP | 2008-031347 | A | | 2/2008 | |
| JP | 2008-033140 | A | | 2/2008 | |
| JP | 2009-104111 | A | | 5/2009 | |
| JP | 2013-097300 | A | | 5/2013 | |
| JP | 2018-159087 | A | | 10/2018 | |
| JP | 2019-012141 | A | | 1/2019 | |
| JP | 2019-035900 | A | | 3/2019 | |
| JP | 2021-015223 | A | | 2/2021 | |
| JP | 2021-071565 | A | | 5/2021 | |
| JP | 2021-117377 | A | | 8/2021 | |
| JP | 2021-148818 | A | | 9/2021 | |
| WO | WO 2008/050669 | | * | 5/2008 | ............... G03G 5/05 |
| WO | WO 2012/115088 | | * | 8/2012 | ............... G03G 5/05 |
| WO | 2019/070003 | A1 | | 4/2019 | |

* cited by examiner

ELECTROPHOTOGRAPHIC PHOTORECEPTOR, PROCESS CARTRIDGE, AND IMAGE FORMING APPARATUS

CROSS-REFERENCE TO RELATED APPLICATIONS

This application is based on and claims priority under 35 USC 119 from Japanese Patent Application No. 2023-002700 filed Jan. 11, 2023.

BACKGROUND

(i) Technical Field

The present invention relates to an electrophotographic photoreceptor, a process cartridge, and an image forming apparatus.

(ii) Related Art

JP2009-104111A discloses an electrophotographic photoreceptor that includes a photosensitive layer containing a plurality of kinds of electron-withdrawing compounds in which the energy level value of LUMO is in a range of −1.0 eV to −3.0 eV and a hindered phenol-based antioxidant.

JP2008-033140A discloses a method of producing an electrophotographic photoreceptor, including a drying step of heating a polyarylate resin to 100° C. or higher such that the content of diphenyl ether dicarboxylic acid in the polyarylate resin is set to 50 ppm or less with respect to the total mass of the polyarylate resin, and a step of forming a charge transport layer using a polyarylate resin after the drying step.

JP2008-031347A discloses a resin for forming a coating film of an electronic component such as an electrophotographic photoreceptor, which contains, as a main component, polyester formed of one or more kinds of divalent carboxylic acid residues selected from the group consisting of 4,4'-biphenyl dicarboxylic acid, 4,4'-diphenyl ether dicarboxylic acid, and 1,4-cyclohexane dicarboxylic acid, and a dihydric phenol residue.

SUMMARY

Aspects of non-limiting embodiments of the present disclosure relate to an electrophotographic photoreceptor, a process cartridge, and an image forming apparatus formed such that the abrasion resistance is excellent and a phenomenon in which a toner adheres to a non-image area of a recording medium is unlikely to occur.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

Specific means for achieving the above-described object includes the following aspects. Each formula is the same as the formula having the same number described below.

According to an aspect of the present disclosure, there is provided an electrophotographic photoreceptor including a conductive substrate, and a lamination type photosensitive layer disposed on the conductive substrate and including a charge generation layer and a charge transport layer, in which the charge transport layer contains a charge transport material, at least one of a polyester resin or a polycarbonate resin that has a constitutional unit containing biphenyl represented by Formula (1), and an aromatic dicarboxylic acid represented by Formula (2).

BRIEF DESCRIPTION OF THE DRAWINGS

Exemplary embodiment(s) of the present invention will be described in detail based on the following figures, wherein.

DETAILED DESCRIPTION

Figure 1:
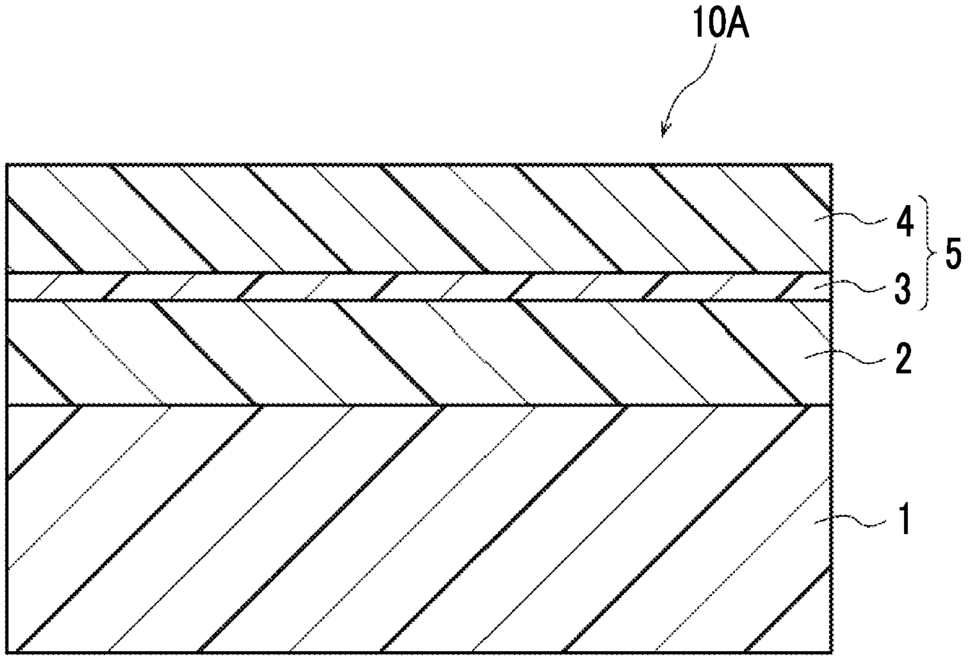
FIG. 1 is a partial cross-sectional view showing an example of a layer configuration of an electrophotographic photoreceptor according to a first exemplary embodiment.

Hereinafter, exemplary embodiments of the present disclosure will be described. The following descriptions and examples merely illustrate the exemplary embodiments, and do not limit the scope of the exemplary embodiments.

In the present disclosure, a numerical range shown using "to" indicates a range including numerical values described before and after "to" as a minimum value and a maximum value.

In a numerical range described in a stepwise manner in the present disclosure, an upper limit value or a lower limit value described in a certain numerical range may be replaced with an upper limit value or a lower limit value in another numerical range described in a stepwise manner. Further, in a numerical range described in the present disclosure, an upper limit value or a lower limit value described in the numerical range may be replaced with a value shown in Examples.

In the present disclosure, the meaning of the term "step" includes not only an independent step but also a step whose intended purpose is achieved even in a case where the step is not clearly distinguished from other steps.

In the present disclosure, in a case where an exemplary embodiment is described with reference to drawings, the configuration of the exemplary embodiment is not limited to the configuration shown in the drawings. In addition, the sizes of members in each drawing are conceptual and the relative relation in the sizes between the members is not limited thereto.

In the present disclosure, each component may include a plurality of kinds of substances corresponding to each component. In the present disclosure, in a case where a plurality of kinds of substances corresponding to each component in a composition are present, the amount of each component in the composition indicates the total amount of the plurality of kinds of substances present in the composition unless otherwise specified.

In the present disclosure, each component may include a plurality of kinds of particles corresponding to each component. In a case where a plurality of kinds of particles corresponding to each component are present in a composition, the particle diameter of each component indicates the value of a mixture of the plurality of kinds of particles present in the composition, unless otherwise specified.

In the present disclosure, an alkyl group and an alkylene group are any of linear, branched, or cyclic unless otherwise specified.

In the present disclosure, a hydrogen atom in an organic group, an aromatic ring, a linking group, an alkyl group, an alkylene group, an aryl group, an aralkyl group, an alkoxy group, an aryloxy group, or the like may be substituted with a halogen atom.

In the present disclosure, in a case where a compound is represented by a structural formula, the compound may be represented by a structural formula in which symbols (C and H) representing a carbon atom and a hydrogen atom in a hydrocarbon group and/or a hydrocarbon chain are omitted.

In the present disclosure, the term "constitutional unit" of a copolymer or a resin has the same definition as that for a monomer unit.

In the present disclosure, ppm stands for parts per million and is on a mass basis.

Electrophotographic Photoreceptor

The present disclosure provides a first exemplary embodiment and a second exemplary embodiment of an electrophotographic photoreceptor (hereinafter, also referred to as a "photoreceptor").

The photoreceptor according to the first exemplary embodiment includes a conductive substrate, and a lamination type photosensitive layer disposed on the conductive substrate and including a charge generation layer and a charge transport layer. The photoreceptor according to the first exemplary embodiment may further include other layers (for example, an undercoat layer and an interlayer).

The photoreceptor according to the second exemplary embodiment includes a conductive substrate, and a single layer type photosensitive layer disposed on the conductive substrate. The photoreceptor according to the second exemplary embodiment may further include other layers (for example, an undercoat layer and an interlayer).

FIG. 1 is a partial cross-sectional view schematically showing an example of the layer configuration of the photoreceptor according to the first exemplary embodiment. A photoreceptor 10A shown in FIG. 1 includes a lamination type photosensitive layer. The photoreceptor 10A has a structure in which an undercoat layer 2, a charge generation layer 3, and a charge transport layer 4 are laminated in this order on a conductive substrate 1, and the charge generation layer 3 and the charge transport layer 4 constitute a photosensitive layer 5 (so-called function separation type photosensitive layer). The photoreceptor 10A may include an interlayer (not shown) between the undercoat layer 2 and the charge generation layer 3. The undercoat layer 2 may or may not be present.

Figure 2:
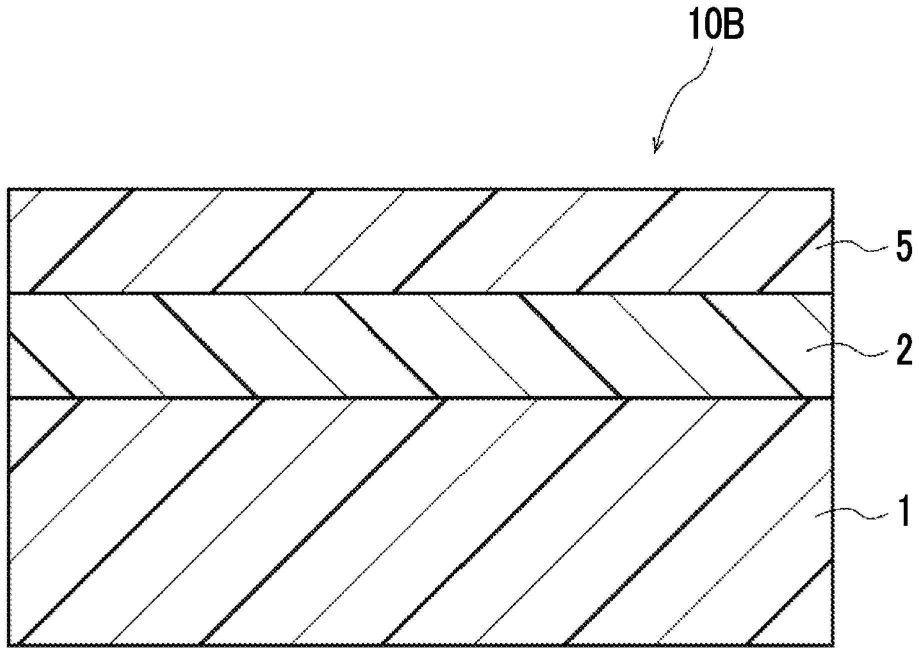
FIG. 2 is a partial cross-sectional view showing an example of a layer configuration of an electrophotographic photoreceptor according to a second exemplary embodiment.

FIG. 2 is a partial cross-sectional view schematically showing an example of the layer configuration of the photoreceptor according to the second exemplary embodiment. A photoreceptor 10B shown in FIG. 2 includes a single layer type photosensitive layer. The photoreceptor 10B has a structure in which the undercoat layer 2 and the photosensitive layer 5 are laminated in this order on the conductive substrate 1. The photoreceptor 10B may include an interlayer (not shown) between the undercoat layer 2 and the photosensitive layer 5. The undercoat layer 2 may or may not be present.

In the photoreceptor according to the first exemplary embodiment, the charge transport layer contains a charge transport material, at least one of a polyester resin or a polycarbonate resin which has a constitutional unit containing biphenyl represented by Formula (1), and an aromatic dicarboxylic acid represented by Formula (2).

In the photoreceptor according to the second exemplary embodiment, the single layer type photosensitive layer contains a charge transport material, at least one of a polyester resin or a polycarbonate resin which has a constitutional unit containing biphenyl represented by Formula (1), and an aromatic dicarboxylic acid represented by Formula (2).

Formula (1)

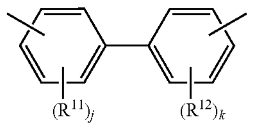

Formula (2)

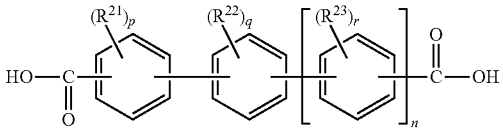

In Formula (1), j represents an integer of 0 or greater and 4 or less, j pieces of $R^{11}$'s each independently represent a methyl group or an ethyl group, k represents an integer of 0 or greater and 4 or less, and k pieces of $R^{12}$'s each independently represent a methyl group or an ethyl group.

In Formula (2), p represents an integer of 0 or greater and 4 or less, p pieces of $R^{21}$'s each independently represent a methyl group or an ethyl group, q represents an integer of 0 or greater and 4 or less, q pieces of $R^{22}$'s each independently represent a methyl group or an ethyl group, r represents an integer of 0 or greater and 4 or less, r pieces of $R^{23}$'s each independently represent a methyl group or an ethyl group, and n represents 0 or 1.

In the constitutional unit containing biphenyl represented by Formula (1), the biphenyl represented by Formula (1) may be a part or the entirety of the structure formed by removing an ester bond (—C(═O)O—) or a carbonate bond (—OC(═O)O—) from the constitutional unit. In other words, the right end and the left end of the biphenyl represented by Formula (1) may be each independently bonded to an ester bond or a carbonate bond directly or bonded to an ester bond or a carbonate bond via another atom or an atomic group.

Hereinafter, in a case of description common to the first exemplary embodiment and the second exemplary embodiment, both exemplary embodiments are collectively referred to as the present exemplary embodiment.

The photoreceptor according to the present exemplary embodiment has excellent abrasion resistance and is unlikely to cause a phenomenon (fogging) in which a toner adheres to a non-image area of a recording medium, and the mechanism thereof is assumed as follows.

In the photosensitive layer containing, as a binder resin, at least one of a polyester resin or a polycarbonate resin which has a constitutional unit containing biphenyl represented by Formula (1), the aggregation force of the binder resins is increased due to the stacking action of biphenyls represented by Formula (1), and thus the abrasion resistance of the photosensitive layer is improved.

However, fogging may occur in a case where a photoreceptor including the photosensitive layer described above is used. The reason for this is assumed to be that the charge is likely to be accumulated between the binder resins having high aggregating properties.

Meanwhile, in a case where the photosensitive layer also contains an aromatic dicarboxylic acid represented by Formula (2), it is assumed that the aromatic dicarboxylic acid acts on the charge transport material and moves the charge that tends to be accumulated between the binder resins. As a result, it is assumed that fogging is unlikely to occur.

From the viewpoint of more efficiently suppressing occurrence of fogging, the mass proportion of the aromatic dicarboxylic acid represented by Formula (2) in the total mass of the charge transport layer of the photoreceptor according to the first exemplary embodiment is, for example, preferably 0.1 ppm or greater and 1,000 ppm or less, more preferably 3.0 ppm or greater and 300 ppm or less, and still more preferably 5.0 ppm or greater and 120 ppm or less.

From the viewpoint of more efficiently suppressing occurrence of fogging, the mass proportion of the aromatic dicarboxylic acid represented by Formula (2) in the total mass of the single layer type photosensitive layer of the photoreceptor according to the second exemplary embodiment is, for example, preferably 0.4 ppm or greater and 1,000 ppm or less, more preferably 5.0 ppm or greater and 300 ppm or less, and still more preferably 15 ppm or greater and 120 ppm or less.

Examples of a method of adjusting the content of the aromatic dicarboxylic acid represented by Formula (2) which is contained in the charge transport layer or the single layer type photosensitive layer include a method of adding the aromatic dicarboxylic acid represented by Formula (2) to a composition for forming the layer.

Examples of a method of controlling the content of the aromatic dicarboxylic acid represented by Formula (2) which is contained in the charge transport layer or the single layer type photosensitive layer to 1,000 ppm or less include the following methods.

In a case of polymerization of the polyester resin, a method of increasing the purity of the monomer serving as a raw material, a method of sufficiently dissolving the monomer and initiating the polymerization reaction, a method of setting the concentration of the dicarboxylic acid (specifically, dicarboxylic acid chloride) in the polymerization reaction system to be low, or the like may be employed.

After the polymerization of the polyester resin, a method of reprecipitating and purifying the polyester resin in a solvent (for example, alcohol) that is a poor solvent of the polyester resin and a good solvent of the aromatic dicarboxylic acid represented by Formula (2) or a method of performing an amine treatment on the polyester resin and decomposing the aromatic dicarboxylic acid represented by Formula (2) may be employed.

In the present exemplary embodiment, the mass of the aromatic dicarboxylic acid represented by Formula (2) which is contained in the charge transport layer or the single layer type photosensitive layer is quantified by the following measuring method.

The following description is for the first exemplary embodiment. The description for the second exemplary embodiment is made in the same manner as described above except for replacing "charge transport layer" with "single layer type photosensitive layer".

The photoreceptor is immersed in a solvent in which the binder resin of the charge transport layer is dissolved to elute the charge transport layer. A mixture of the components constituting the charge transport layer is obtained by removing the solvent from the solution used to elute the charge transport layer (for example, vacuum drying is performed after concentration of the solution). This mixture is dissolved in a good solvent for the binder resin, and a poor solvent is added thereto to reprecipitate the binder resin. The supernatant after the reprecipitation of the binder resin is filtered, and the filtrate is used as a measurement sample. The measurement sample is analyzed by high performance liquid chromatography (HPLC). For example, HPLC measurement is performed by using an ODS column as a separation column for analysis, water containing phosphoric acid and acetonitrile as an eluent, and a photodiode array detector (example of the detection wavelength: 254 nm) as a detection device. A calibration curve showing the relationship between the mass and the peak area derived from the aromatic dicarboxylic acid represented by Formula (2) is prepared in advance.

Hereinafter, the polyester resin and the polycarbonate resin having a constitutional unit containing biphenyl represented by Formula (1) and the aromatic dicarboxylic acid represented by Formula (2) will be described in detail.

Polyester Resin (1)

In the present disclosure, the polyester resin having a constitutional unit containing biphenyl represented by Formula (1) will be referred to as a polyester resin (1).

Formula (1)

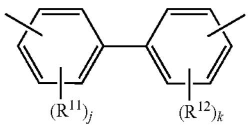

In Formula (1), j represents an integer of 0 or greater and 4 or less, j pieces of $R^{11}$'s each independently represent a methyl group or an ethyl group, k represents an integer of 0 or greater and 4 or less, and k pieces of $R^{12}$'s each independently represent a methyl group or an ethyl group.

j represents an integer of 0 or greater and 4 or less, for example, preferably an integer of 0 or greater and 3 or less, more preferably an integer of 0 or greater and 2 or less, still more preferably 0 or 1, and particularly preferably 0.

In a case where j represents an integer of 1 or greater, j pieces of $R^{11}$'s each independently represent a methyl group or an ethyl group and, for example, preferably a methyl group.

k represents an integer of 0 or greater and 4 or less, for example, preferably an integer of 0 or greater and 3 or less, more preferably an integer of 0 or greater and 2 or less, still more preferably 0 or 1, and particularly preferably 0.

In a case where k represents an integer of 1 or greater, k pieces of $R^{12}$'s each independently represent a methyl group or an ethyl group and, for example, preferably a methyl group.

From the viewpoint that the polyester resin (1) has a constitutional unit containing biphenyl represented by Formula (1) in a molecule, the polyester resin (1) has, for example, preferably at least one of a dicarboxylic acid unit (1-A) represented by Formula (1-A) or a diol unit (1-B) represented by Formula (1-B) and more preferably a dicarboxylic acid unit (1-A) represented by Formula (1-A).

Formula (1-A)

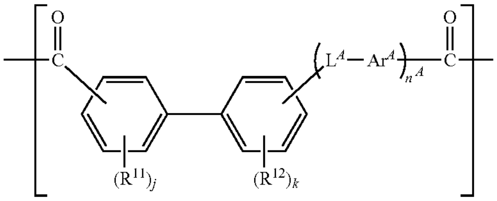

In Formula (1-A), j represents an integer of 0 or greater and 4 or less, j pieces of $R^{11}$'s each independently represent a methyl group or an ethyl group, k represents an integer of 0 or greater and 4 or less, k pieces of $R^{12}$'s each independently represent a methyl group or an ethyl group, $L^A$ represents a single bond or a divalent linking group, $Ar^A$ represents an aromatic ring that may have a substituent, and $n^A$ represents 0, 1, or 2.

j, k, $R^{11}$, and $R^{12}$ in Formula (1-A) each have the same definition as that for j, k, $R^{11}$, and $R^{12}$ in Formula (1), and the specific forms and the desired forms are also the same as described above.

In a case where $L^A$ represents a divalent linking group, examples of the divalent linking group include an oxygen atom, a sulfur atom, and —$C(Ra^1)(Ra^2)$—. Here, $Ra^1$ and $Ra^2$ each independently represent a hydrogen atom, an alkyl group having 1 or more and 10 or less carbon atoms, an aryl group having 6 or more and 12 or less carbon atoms, or an aralkyl group having 7 or more and 20 or less carbon atoms, and $Ra^1$ and $Ra^2$ may be bonded to each other to form a cyclic alkyl group.

The alkyl group having 1 or more and 10 or less carbon atoms as $Ra^1$ and $Ra^2$ may be any of linear, branched, or cyclic. The number of carbon atoms of the alkyl group is, for example, preferably 1 or more and 6 or less, more preferably 1 or more and 4 or less, and still more preferably 1 or 2.

The aryl group having 6 or more and 12 or less carbon atoms as $Ra^1$ and $Ra^2$ may be any of a monocycle or a polycycle. The number of carbon atoms of the aryl group is, for example, preferably 6 or more and 10 or less and more preferably 6.

The alkyl group in the aralkyl group having 7 or more and 20 or less carbon atoms as $Ra^1$ and $Ra^2$ may be any of linear, branched, or cyclic. The number of carbon atoms of the alkyl group in the aralkyl group having 7 or more and 20 or less carbon atoms is, for example, preferably 1 or more and 4 or less, more preferably 1 or more and 3 or less, and still more preferably 1 or 2.

The aryl group in the aralkyl group having 7 or more and 20 or less carbon atoms as $Ra^1$ and $Ra^2$ may be any of a monocycle or a polycycle. The number of carbon atoms of the aryl group is, for example, preferably 6 or more and 10 or less and more preferably 6.

The aromatic ring as $Ar^A$ may be any of a monocycle or a polycycle. Examples of the aromatic ring include a benzene ring, a naphthalene ring, an anthracene ring, and a phenanthrene ring. Among these, for example, a benzene ring and a naphthalene ring are preferable.

The hydrogen atom on the aromatic ring as $Ar^A$ may be substituted with an alkyl group, an aryl group, an aralkyl group, an alkoxy group, an aryloxy group, a halogen atom, or the like. As the substituent in a case where the aromatic ring as $Ar^A$ is substituted, for example, an alkyl group having 1 or more and 10 or less carbon atoms, an aryl group having 6 or more and 12 or less carbon atoms, and an alkoxy group having 1 or more and 6 or less carbon atoms are preferable.

Formula (1-B)

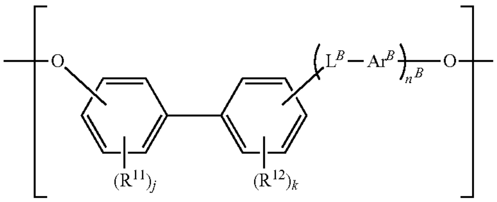

In Formula (1-B), j represents an integer of 0 or greater and 4 or less, j pieces of $R^{11}$'s each independently represent a methyl group or an ethyl group, k represents an integer of 0 or greater and 4 or less, k pieces of $R^{12}$'s each independently represent a methyl group or an ethyl group, $L^B$ represents a single bond or a divalent linking group, $Ar^B$ represents an aromatic ring that may have a substituent, and $n^B$ represents 0, 1, or 2.

j, k, $R^{11}$, and $R^{12}$ in Formula (1-B) each have the same definition as that for j, k, $R^{11}$, and $R^{12}$ in Formula (1), and the specific forms and the desired forms are also the same as described above.

In a case where $L^B$ represents a divalent linking group, examples of the divalent linking group include an oxygen atom, a sulfur atom, and —$C(Rb^1)(Rb^2)$—. Here, $Rb^1$ and $Rb^2$ each independently represent a hydrogen atom, an alkyl group having 1 or more and 10 or less carbon atoms, an aryl group having 6 or more and 12 or less carbon atoms, or an aralkyl group having 7 or more and 20 or less carbon atoms, and $Rb^1$ and $Rb^2$ may be bonded to each other to form a cyclic alkyl group.

The alkyl group having 1 or more and 10 or less carbon atoms as $Rb^1$ and $Rb^2$ may be linear, branched, or cyclic. The number of carbon atoms of the alkyl group is, for example, preferably 1 or more and 6 or less, more preferably 1 or more and 4 or less, and still more preferably 1 or 2.

The aryl group having 6 or more and 12 or less carbon atoms as $Rb^1$ and $Rb^2$ may be any of a monocycle or a polycycle. The number of carbon atoms of the aryl group is, for example, preferably 6 or more and 10 or less and more preferably 6.

The alkyl group in the aralkyl group having 7 or more and 20 or less carbon atoms as $Rb^1$ and $Rb^2$ may be any of linear, branched, or cyclic. The number of carbon atoms of the alkyl group in the aralkyl group having 7 or more and 20 or less carbon atoms is, for example, preferably 1 or more and 4 or less, more preferably 1 or more and 3 or less, and still more preferably 1 or 2.

The aryl group in the aralkyl group having 7 or more and 20 or less carbon atoms as $Rb^1$ and $Rb^2$ may be any of a monocycle or a polycycle. The number of carbon atoms of the aryl group is, for example, preferably 6 or more and 10 or less and more preferably 6.

The aromatic ring as $Ar^B$ may be any of a monocycle or a polycycle. Examples of the aromatic ring include a benzene ring, a naphthalene ring, an anthracene ring, and a phenanthrene ring. Among these, for example, a benzene ring and a naphthalene ring are preferable.

The hydrogen atom on the aromatic ring as $Ar^B$ may be substituted with an alkyl group, an aryl group, an aralkyl group, an alkoxy group, an aryloxy group, a halogen atom, or the like. As the substituent in a case where the aromatic ring as $Ar^B$ is substituted, for example, an alkyl group having 1 or more and 10 or less carbon atoms, an aryl group having 6 or more and 12 or less carbon atoms, and an alkoxy group having 1 or more and 6 or less carbon atoms are preferable.

It is preferable that the dicarboxylic acid unit (1-A) represented by Formula (1-A) is, for example, a dicarboxylic acid unit (11-A) represented by Formula (11-A).

It is preferable that the diol unit (1-B) represented by Formula (1-B) is, for example, a diol unit (11-B) represented by Formula (11-B).

Formula (11-A)

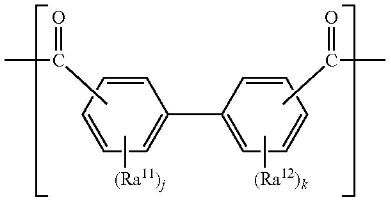

Formula (11-B)

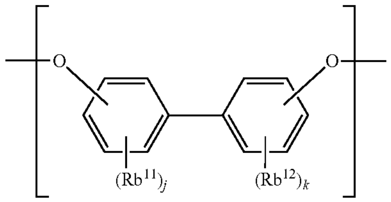

In Formula (11-A), j represents an integer of 0 or greater and 4 or less, j pieces of $R^{11}$'s each independently represent a methyl group or an ethyl group, k represents an integer of 0 or greater and 4 or less, and k pieces of $R^{12}$'s each independently represent a methyl group or an ethyl group.

In Formula (11-B), j represents an integer of 0 or greater and 4 or less, j pieces of $R^{11}$ 's each independently represent a methyl group or an ethyl group, k represents an integer of 0 or greater and 4 or less, and k pieces of $R^{12}$'s each independently represent a methyl group or an ethyl group.

j, k, $R^{11}$, and $R^{12}$ in Formula (11-A) each have the same definition as that for j, k, $R^{11}$, and $R^{12}$ in Formula (1), and the specific forms and the desired forms are also the same as described above.

j, k, $R^{11}$, and $R^{12}$ in Formula (11-B) each have the same definition as that for j, k, $R^{11}$, and $R^{12}$ in Formula (1), and the specific forms and the desired forms are also the same as described above.

Specific examples of the dicarboxylic acid unit (1-A) include the following dicarboxylic acid units (1-A1) to (1-A10). The dicarboxylic acid unit (1-A) is not limited thereto.

(1-A1)

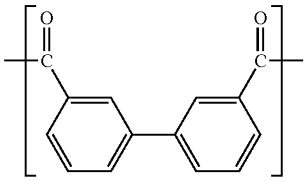

-continued (1-A2)

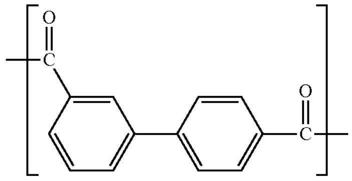

(1-A3)

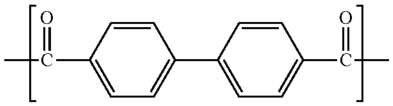

(1-A4)

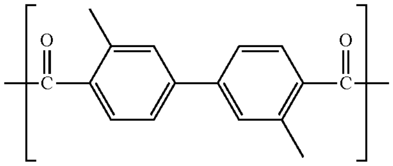

(1-A5)

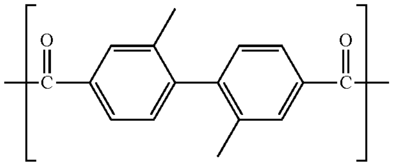

(1-A6)

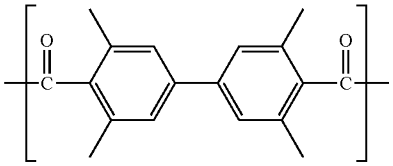

(1-A7)

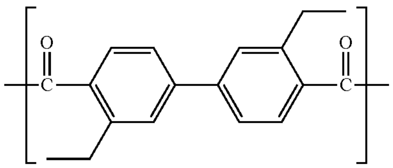

(1-A8)

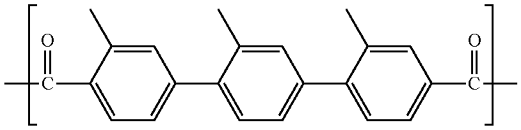

(1-A9)

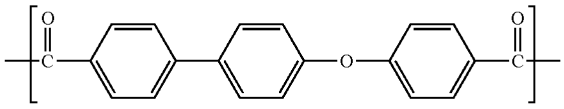

(1-A10)

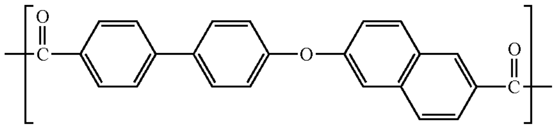

As the dicarboxylic acid unit (1-A), for example, at least one selected from the group consisting of the dicarboxylic acid units (1-A3) to (1-A7) is preferable, at least one selected from the group consisting of the dicarboxylic acid units (1-A3) to (1-A6) is more preferable, and the dicarboxylic acid unit (1-A3) is still more preferable.

Specific examples of the diol unit (1-B) include the following diol units (1-B1) to (1-B10). The diol unit (1-B) is not limited thereto.

(1-B1)

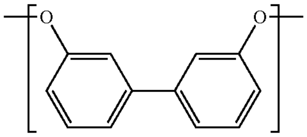

(1-B2)

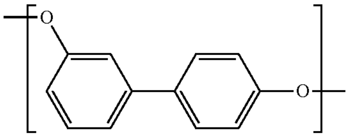

(1-B3)

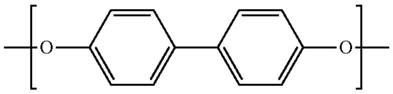

(1-B4)

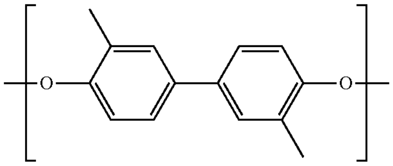

(1-B5)

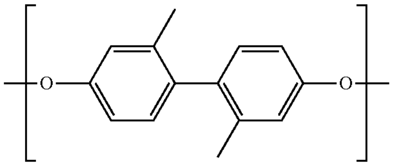

(1-B6)

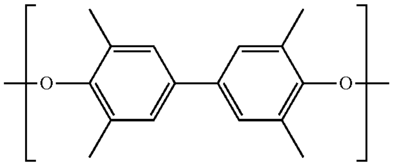

(1-B7)

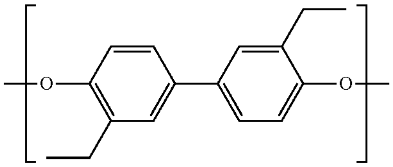

(1-B8)

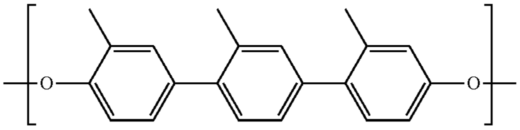

-continued (1-B9)

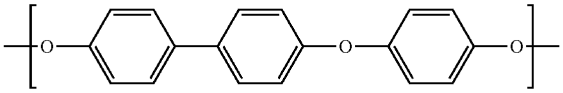

(1-B10)

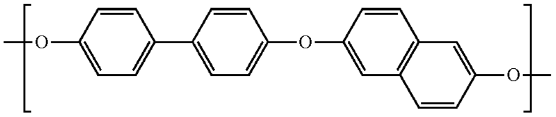

As the diol unit (1-B), for example, at least one selected from the group consisting of the diol units (1-B3) to (1-B7) is preferable, at least one selected from the group consisting of the diol units (1-B3) to (1-B6) is more preferable, and the diol unit (1-B3) is still more preferable.

The total mass proportion of the constitutional unit containing biphenyl represented by Formula (1) in the mass of the polyester resin (1) is, for example, preferably 15% by mass or greater and 60% by mass or less, more preferably 20% by mass or greater and 55% by mass or less, and still more preferably 25% by mass or greater and 50% by mass or less.

The polyester resin (1) may have a constitutional unit other than the constitutional unit containing biphenyl represented by Formula (1). Hereinafter, the constitutional unit other than the constitutional unit containing biphenyl represented by Formula (1) will be described.

The polyester resin (1) may have at least one dicarboxylic acid unit (A) selected from the group consisting of a dicarboxylic acid unit (A1) represented by Formula (A1), a dicarboxylic acid unit (A3) represented by Formula (A3), and a dicarboxylic acid unit (A4) represented by Formula (A4).

In a case where the polyester resin (1) has a dicarboxylic acid unit (A), the polyester resin (1) may have one or two or more kinds of dicarboxylic acid units (A). As the dicarboxylic acid unit (A), for example, at least one selected from the group consisting of the dicarboxylic acid unit (A3) and the dicarboxylic acid unit (A4) is preferable.

Formula (A1)

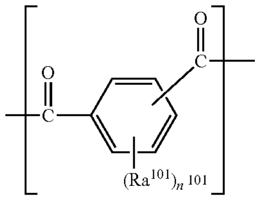

In Formula (A1), $n^{101}$ represents an integer of 0 or greater and 4 or less, and $n^{101}$ pieces of $Ra^{101}$'s each independently represent an alkyl group having 1 or more and 10 or less carbon atoms, an aryl group having 6 or more and 12 or less carbon atoms, or an alkoxy group having 1 or more and 6 or less carbon atoms.

$n^{101}$ represents, for example, preferably 0, 1, or 2, more preferably 0 or 1, and still more preferably 0.

Formula (A3)

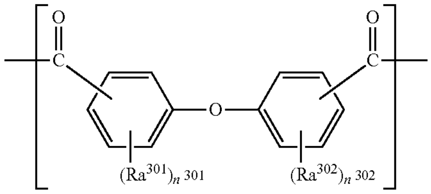

In Formula (A3), $n^{301}$ and $n^{302}$ each independently represent an integer of 0 or greater and 4 or less, and $n^{301}$ pieces of $Ra^{301}$'s and $n^{302}$ pieces of $Ra^{302}$'s each independently represent an alkyl group having 1 or more and 10 or less carbon atoms, an aryl group having 6 or more and 12 or less carbon atoms, or an alkoxy group having 1 or more and 6 or less carbon atoms.

$n^{301}$ represents, for example, preferably 0, 1, or 2, more preferably 0 or 1, and still more preferably 0.

$n^{302}$ represents, for example, preferably 0, 1, or 2, more preferably 0 or 1, and still more preferably 0.

Formula (A4)

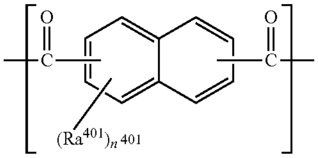

In Formula (A4), $n^{401}$ represents an integer of 0 or greater and 6 or less, and $n^{401}$ pieces of $Ra^{401}$'s each independently represent an alkyl group having 1 or more and 10 or less carbon atoms, an aryl group having 6 or more and 12 or less carbon atoms, or an alkoxy group having 1 or more and 6 or less carbon atoms.

$n^{401}$ represents, for example, preferably an integer of 0 or greater and 4 or less, more preferably 0, 1, or 2, and still more preferably 0.

The specific forms and the desired forms of $Ra^{101}$ in Formula (A1), $Ra^{301}$ and $Ra^{302}$ in Formula (A3), and $Ra^{401}$ in Formula (A4) are the same as each other, and hereinafter, $Ra^{101}$, $Ra^{301}$, $Ra^{302}$, and $Ra^{401}$ will be collectively referred to as "Ra".

The alkyl group having 1 or more and 10 or less carbon atoms as Ra may be any of linear, branched, or cyclic. The number of carbon atoms of the alkyl group is, for example, preferably 1 or more and 6 or less, more preferably 1 or more and 4 or less, and still more preferably 1 or 2.

Examples of the linear alkyl group having 1 or more and 10 or less carbon atoms include a methyl group, an ethyl group, an n-propyl group, an n-butyl group, an n-pentyl group, an n-hexyl group, an n-heptyl group, an n-octyl group, an n-nonyl group, and an n-decyl group.

Examples of the branched alkyl group having 3 or more and 10 or less carbon atoms include an isopropyl group, an isobutyl group, a sec-butyl group, a tert-butyl group, an isopentyl group, a neopentyl group, a tert-pentyl group, an isohexyl group, a sec-hexyl group, a tert-hexyl group, an isoheptyl group, a sec-heptyl group, a tert-heptyl group, an isooctyl group, a sec-octyl group, a tert-octyl group, an isononyl group, a sec-nonyl group, a tert-nonyl group, an isodecyl group, a sec-decyl group, and a tert-decyl group.

Examples of the cyclic alkyl group having 3 or more and 10 or less carbon atoms include a cyclopropyl group, a cyclobutyl group, a cyclopentyl group, a cyclohexyl group, a cycloheptyl group, a cyclooctyl group, a cyclononyl group, a cyclodecyl group, and polycyclic (for example, bicyclic, tricyclic, or spirocyclic) alkyl groups to which these monocyclic alkyl groups are linked.

The aryl group having 6 or more and 12 or less carbon atoms as Ra may be any of a monocycle or a polycycle. The number of carbon atoms of the aryl group is, for example, preferably 6 or more and 10 or less and more preferably 6.

Examples of the aryl group having 6 or more and 12 or less carbon atoms include a phenyl group, a biphenyl group, a 1-naphthyl group, and a 2-naphthyl group.

The alkyl group in the alkoxy group having 1 or more and 6 or less carbon atoms as Ra may be any of linear, branched, or cyclic. The number of carbon atoms of the alkyl group in the alkoxy group having 1 or more and 6 or less carbon atoms is, for example, preferably 1 or more and 4 or less, more preferably 1 or more and 3 or less, and still more preferably 1 or 2.

Examples of the linear alkoxy group having 1 or more and 6 or less carbon atoms include a methoxy group, an ethoxy group, an n-propoxy group, an n-butoxy group, an n-pentyloxy group, and an n-hexyloxy group.

Examples of the branched alkoxy group having 3 or more and 6 or less carbon atoms include an isopropoxy group, an isobutoxy group, a sec-butoxy group, a tert-butoxy group, an isopentyloxy group, a neopentyloxy group, a tert-pentyloxy group, an isohexyloxy group, a sec-hexyloxy group, and a tert-hexyloxy group.

Examples of the cyclic alkoxy group having 3 or more and 6 or less carbon atoms include a cyclopropoxy group, a cyclobutoxy group, a cyclopentyloxy group, and a cyclohexyloxy group.

Hereinafter, dicarboxylic acid units (A1-1) to (A1-9) are shown as specific examples of the dicarboxylic acid unit (A1). The dicarboxylic acid unit (A1) is not limited thereto.

(A1-1)

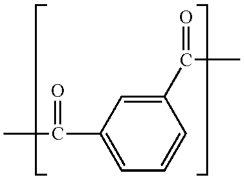

(A1-2)

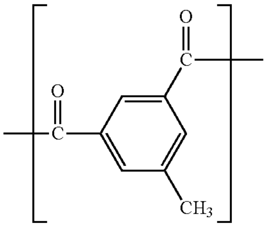

(A1-3)

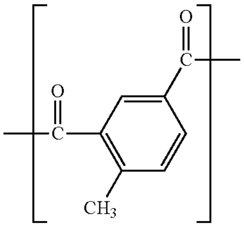

-continued (A1-4)

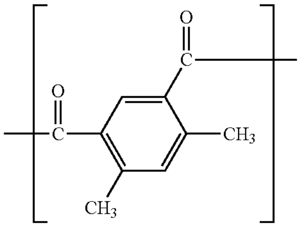

(A1-5)

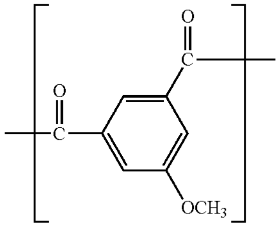

(A1-6)

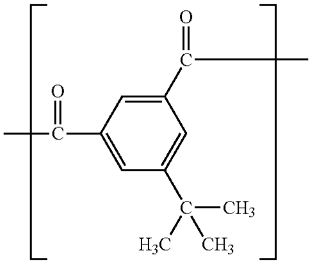

(A1-7)

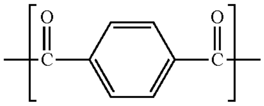

(A1-8)

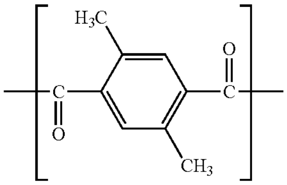

(A1-9)

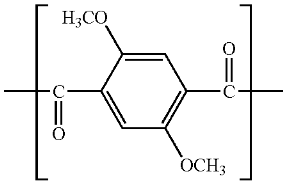

Hereinafter, dicarboxylic acid units (A3-1) and (A3-2) are shown as specific examples of the dicarboxylic acid unit (A3). The dicarboxylic acid unit (A3) is not limited thereto.

(A3-1)

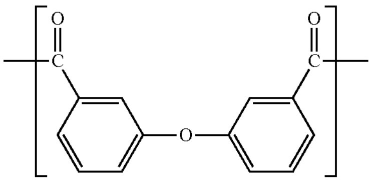

-continued (A3-2)

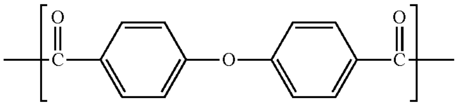

Hereinafter, dicarboxylic acid units (A4-1) to (A4-3) are shown as specific examples of the dicarboxylic acid unit (A4). The dicarboxylic acid unit (A4) is not limited thereto.

(A4-1)

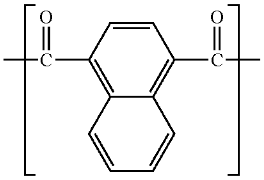

(A4-2)

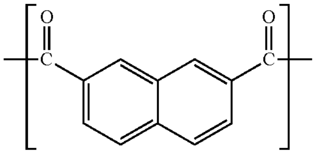

(A4-3)

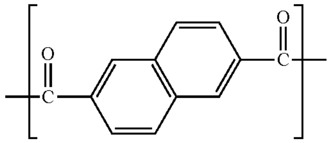

The polyester resin has, for example, preferably at least one selected from the group consisting of (A1-1), (A1-7), (A3-2), and (A4-3) and more preferably at least one selected from the group consisting of (A3-2) and (A4-3) in the specific examples described above, as the dicarboxylic acid unit (A).

In a case where the polyester resin (1) has a dicarboxylic acid unit (A), the total mass proportion of the dicarboxylic acid unit (A) in the mass of the polyester resin (1) is, for example, preferably 15% by mass or greater and 60% by mass or less, more preferably 20% by mass or greater and 55% by mass or less, and still more preferably 25% by mass or greater and 50% by mass or less.

The polyester resin (1) may have other dicarboxylic acid units in addition to the constitutional unit containing biphenyl represented by Formula (1) and the dicarboxylic acid unit (A). Examples of other dicarboxylic acid units include aliphatic dicarboxylic acids (such as oxalic acid, malonic acid, maleic acid, fumaric acid, citraconic acid, itaconic acid, glutaconic acid, succinic acid, alkenyl succinic acid, adipic acid, and sebacic acid) units, alicyclic dicarboxylic acid (such as cyclohexanedicarboxylic acid) units, and lower (for example, having 1 or more and 5 or less carbon atoms) alkyl ester units thereof. These dicarboxylic acid units contained in the polyester resin (1) may be used alone or in combination of two or more kinds thereof.

The polyester resin (1) may have at least one diol unit (B) selected from the group consisting of a diol unit (B1) represented by Formula (B1), a diol unit (B2) represented by Formula (B2), a diol unit (B3) represented by Formula (B3), a diol unit (B4) represented by Formula (B4), a diol unit (B5) represented by Formula (B5), a diol unit (B6) represented by Formula (B6), and a diol unit (B8) represented by Formula (B8).

In a case where the polyester resin (1) has a diol unit (B), the polyester resin (1) may have one or two or more kinds of diol units (B).

As the diol unit (B), for example, at least one selected from the group consisting of a diol unit (B1), a diol unit (B2), a diol unit (B4), a diol unit (B5), and a diol unit (B6) is preferable, at least one selected from the group consisting of a diol unit (B1), a diol unit (B2), a diol unit (B5), and a diol unit (B6) is more preferable, at least one selected from the group consisting of a diol unit (B1), a diol unit (B2), and a diol unit (B6) is still more preferable, and at least one selected from the group consisting of a diol unit (B1) and a diol unit (B2) is most preferable.

Formula (B1)

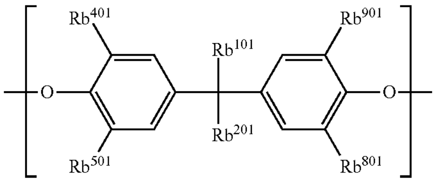

In Formula (B1), $Rb^{101}$ represents a branched alkyl group having 4 or more and 20 or less carbon atoms, $Rb^{201}$ represents a hydrogen atom or an alkyl group having 1 or more and 3 or less carbon atoms, and $Rb^{401}$, $Rb^{501}$, $Rb^{801}$, and $Rb^{901}$ each independently represent a hydrogen atom, an alkyl group having 1 or more and 4 or less carbon atoms, an alkoxy group having 1 or more and 6 or less carbon atoms, or a halogen atom.

The number of carbon atoms of the branched alkyl group having 4 or more and 20 or less carbon atoms as $Rb^{1}$ is, for example, preferably 4 or more and 16 or less, more preferably 4 or more and 12 or less, and still more preferably 4 or more and 8 or less. Specific examples of $Rb^{101}$ include an isobutyl group, a sec-butyl group, a tert-butyl group, an isopentyl group, a neopentyl group, a tert-pentyl group, an isohexyl group, a sec-hexyl group, a tert-hexyl group, an isoheptyl group, a sec-heptyl group, a tert-heptyl group, an isooctyl group, a sec-octyl group, a tert-octyl group, an isononyl group, a sec-nonyl group, a tert-nonyl group, an isodecyl group, a sec-decyl group, a tert-decyl group, an isododecyl group, a sec-dodecyl group, a tert-dodecyl group, a tert-tetradecyl group, and a tert-pentadecyl group.

Formula (B2)

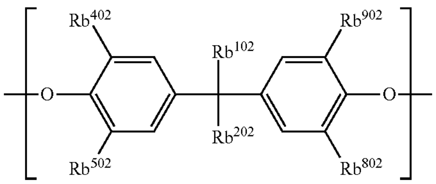

In Formula (B2), $Rb^{102}$ represents a linear alkyl group having 4 or more and 20 or less carbon atoms, $Rb^{202}$ represents a hydrogen atom or an alkyl group having 1 or more and 3 or less carbon atoms, and $Rb^{402}$, $Rb^{502}$, $Rb^{802}$, and $Rb^{902}$ each independently represent a hydrogen atom, an alkyl group having 1 or more and 4 or less carbon atoms, an alkoxy group having 1 or more and 6 or less carbon atoms, or a halogen atom.

The number of carbon atoms of the linear alkyl group having 4 or more and 20 or less carbon atoms as $Rb^{102}$ is, for example, preferably 4 or more and 16 or less, more preferably 4 or more and 12 or less, and still more preferably 4 or more and 8 or less. Specific examples of $Rb^{102}$ include an n-butyl group, an n-pentyl group, an n-hexyl group, an n-heptyl group, an n-octyl group, an n-nonyl group, an n-decyl group, an n-undecyl group, an n-dodecyl group, a tridecyl group, an n-tetradecyl group, an n-pentadecyl group, an n-heptadecyl group, an n-octadecyl group, an n-nonadecyl group, and an n-icosyl group.

Formula (B3)

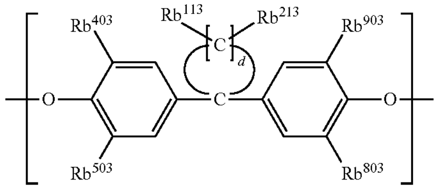

In Formula (B3), $Rb^{113}$ and $Rb^{213}$ each independently represent a hydrogen atom, a linear alkyl group having 1 or more and 3 or less carbon atoms, an alkoxy group having 1 or more and 4 or less carbon atoms, or a halogen atom, d represents an integer of 7 or greater and 15 or less, and $Rb^{403}$, $Rb^{503}$, $Rb^{803}$, and $Rb^{903}$ each independently represent a hydrogen atom, an alkyl group having 1 or more and 4 or less carbon atoms, an alkoxy group having 1 or more and 6 or less carbon atoms, or a halogen atom.

The number of carbon atoms of the linear alkyl group having 1 or more and 3 or less carbon atoms as $Rb^{113}$ and $Rb^{213}$ is, for example, preferably 1 or 2 and more preferably 1. Specific examples of such a group include a methyl group, an ethyl group, and an n-propyl group.

The alkyl group in the alkoxy group having 1 or more and 4 or less carbon atoms as $Rb^{113}$ and $Rb^{213}$ may be linear, branched, or cyclic. The number of carbon atoms of the alkyl group in the alkoxy group having 1 or more and 4 or less carbon atoms is, for example, preferably 1 or more and 3 or less, more preferably 1 or 2, and still more preferably 1. Specific examples of such a group include a methoxy group, an ethoxy group, an n-propoxy group, an n-butoxy group, an isopropoxy group, an isobutoxy group, a sec-butoxy group, a tert-butoxy group, a cyclopropoxy group, and a cyclobutoxy group.

Examples of the halogen atom as $Rb^{113}$ and $Rb^{213}$ include a fluorine atom, a chlorine atom, a bromine atom, and an iodine atom.

Formula (B4)

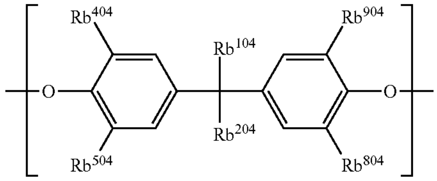

In Formula (B4), $Rb^{104}$ and $Rb^{204}$ each independently represent a hydrogen atom, an alkyl group having 1 or more and 3 or less carbon atoms, and $Rb^{404}$, $Rb^{504}$, $Rb^{804}$, and $Rb^{904}$ each independently represent a hydrogen atom, an alkyl group having 1 or more and 4 or less carbon atoms, an alkoxy group having 1 or more and 6 or less carbon atoms, or a halogen atom.

The alkyl group having 1 or more and 3 or less carbon atoms as $Rb^{104}$ may be any of linear, branched, or cyclic. The number of carbon atoms of the alkyl group is, for example, preferably 1 or 2 and more preferably 1. Specific examples of $Rb^{104}$ include a methyl group, an ethyl group, an n-propyl group, an isopropyl group, and a cyclopropyl group.

Formula (B5)

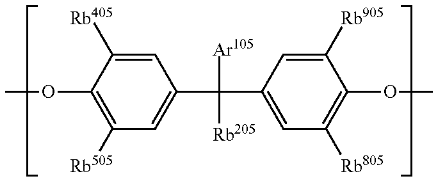

In Formula (B5), $Ar^{105}$ represents an aryl group having 6 or more and 12 or less carbon atoms or an aralkyl group having 7 or more and 20 or less carbon atoms, $Rb^{205}$ represents a hydrogen atom or an alkyl group having 1 or more and 3 or less carbon atoms, and $Rb^{405}$, $Rb^{505}$, $Rb^{805}$, and $Rb^{905}$ each independently represent a hydrogen atom, an alkyl group having 1 or more and 4 or less carbon atoms, an alkoxy group having 1 or more and 6 or less carbon atoms, or a halogen atom.

The aryl group having 6 or more and 12 or less carbon atoms as $Ar^{105}$ may be any of a monocycle or a polycycle. The number of carbon atoms of the aryl group is, for example, preferably 6 or more and 10 or less and more preferably 6.

The alkyl group in the aralkyl group having 7 or more and 20 or less carbon atoms as $Ar^{105}$ may be any of linear, branched, or cyclic. The number of carbon atoms of the alkyl group in the aralkyl group having 7 or more and 20 or less carbon atoms is, for example, preferably 1 or more and 4 or less, more preferably 1 or more and 3 or less, and still more preferably 1 or 2. The aryl group in the aralkyl group having 7 or more and 20 or less carbon atoms as $Ar^{105}$ may be any of a monocycle or a polycycle. The number of carbon atoms of the aryl group is, for example, preferably 6 or more and 10 or less and more preferably 6. Examples of the aralkyl group having 7 or more and 20 or less carbon atoms include a benzyl group, a phenylethyl group, a phenylpropyl group, a 4-phenylbutyl group, a phenylpentyl group, a phenylhexyl group, a phenylheptyl group, a phenyloctyl group, a phenylnonyl group, a naphthylmethyl group, a naphthylethyl group, an anthracenylmethyl group, and a phenyl-cyclopentylmethyl group.

Formula (B6)

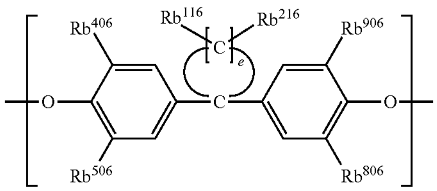

In Formula (B6), $Rb^{116}$ and $Rb^{216}$ each independently represent a hydrogen atom, a linear alkyl group having 1 or more and 3 or less carbon atoms, an alkoxy group having 1 or more and 4 or less carbon atoms, or a halogen atom, e represents an integer of 4 or greater and 6 or less, and $Rb^{406}$, $Rb^{506}$, $Rb^{806}$, and $Rb^{906}$ each independently represent a hydrogen atom, an alkyl group having 1 or more and 4 or less carbon atoms, an alkoxy group having 1 or more and 6 or less carbon atoms, or a halogen atom.

The number of carbon atoms of the linear alkyl group having 1 or more and 3 or less carbon atoms as $Rb^{116}$ and $Rb^{216}$ is, for example, preferably 1 or 2 and more preferably 1. Specific examples of such a group include a methyl group, an ethyl group, and an n-propyl group.

The alkyl group in the alkoxy group having 1 or more and 4 or less carbon atoms as $Rb^{116}$ and $Rb^{216}$ may be linear, branched, or cyclic. The number of carbon atoms of the alkyl group in the alkoxy group having 1 or more and 4 or less carbon atoms is, for example, preferably 1 or more and 3 or less, more preferably 1 or 2, and still more preferably 1. Specific examples of such a group include a methoxy group, an ethoxy group, an n-propoxy group, an n-butoxy group, an isopropoxy group, an isobutoxy group, a sec-butoxy group, a tert-butoxy group, a cyclopropoxy group, and a cyclobutoxy group.

Examples of the halogen atom as $Rb^{116}$ and $Rb^{216}$ include a fluorine atom, a chlorine atom, a bromine atom, and an iodine atom.

Formula (B6)

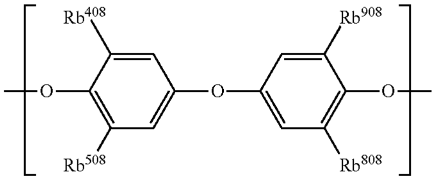

In Formula (B8), $Rb^{408}$, $Rb^{508}$, $Rb^{808}$, and $Rb^{908}$ each independently represent a hydrogen atom, an alkyl group having 1 or more and 4 or less carbon atoms, an alkoxy group having 1 or more and 6 or less carbon atoms, or a halogen atom.

The specific forms and the desired forms of $Rb^{201}$ in Formula (B1), $Rb^{202}$ in Formula (B2), $Rb^{204}$ in Formula (B4), and $Rb^{205}$ in Formula (B5) are the same as each other, and hereinafter, $Rb^{201}$, $Rb^{202}$, $Rb^{204}$, and $Rb^{205}$ will be collectively referred to as "$Rb^{200}$".

The alkyl group having 1 or more and 3 or less carbon atoms as $Rb^{200}$ may be any of linear, branched, or cyclic. The number of carbon atoms of the alkyl group is, for example, preferably 1 or 2 and more preferably 1.

The alkyl group having 1 or more and 3 or less carbon atoms includes a methyl group, an ethyl group, an n-propyl group, an isopropyl group, and a cyclopropyl group.

The specific forms and the desired forms of $Rb^{401}$ in Formula (B1), $Rb^{402}$ in Formula (B2), $Rb^{403}$ in Formula (B3), $Rb^{404}$ in Formula (B4), $Rb^{405}$ in Formula (B5), $Rb^{406}$ in Formula (B6), and $Rb^{408}$ in Formula (B8) are the same as each other, and hereinafter, $Rb^{401}$, $Rb^{402}$, $Rb^{403}$, $Rb^{404}$, $Rb^{405}$, $Rb^{406}$, and $Rb^{408}$ will be collectively referred to as "$Rb^{400}$".

The alkyl group having 1 or more and 4 or less carbon atoms as $Rb^{400}$ may be any of linear, branched, or cyclic. The number of carbon atoms of the alkyl group is, for example, preferably 1 or more and 3 or less, more preferably 1 or 2, and still more preferably 1.

Examples of the linear alkyl group having 1 or more and 4 or less carbon atoms include a methyl group, an ethyl group, an n-propyl group, and an n-butyl group.

Examples of the branched alkyl group having 3 or 4 carbon atoms include an isopropyl group, an isobutyl group, a sec-butyl group, and a tert-butyl group.

Examples of the cyclic alkyl group having 3 or 4 carbon atoms include a cyclopropyl group and a cyclobutyl group.

The alkyl group in the alkoxy group having 1 or more and 6 or less carbon atoms as $Rb^{400}$ may be any of linear, branched, or cyclic. The number of carbon atoms of the alkyl group in the alkoxy group having 1 or more and 6 or less carbon atoms is, for example, preferably 1 or more and 4 or less, more preferably 1 or more and 3 or less, and still more preferably 1 or 2.

Examples of the linear alkoxy group having 1 or more and 6 or less carbon atoms include a methoxy group, an ethoxy group, an n-propoxy group, an n-butoxy group, an n-pentyloxy group, and an n-hexyloxy group.

Examples of the branched alkoxy group having 3 or more and 6 or less carbon atoms include an isopropoxy group, an isobutoxy group, a sec-butoxy group, a tert-butoxy group, an isopentyloxy group, a neopentyloxy group, a tert-pentyloxy group, an isohexyloxy group, a sec-hexyloxy group, and a tert-hexyloxy group.

Examples of the cyclic alkoxy group having 3 or more and 6 or less carbon atoms include a cyclopropoxy group, a cyclobutoxy group, a cyclopentyloxy group, and a cyclohexyloxy group.

Examples of the halogen atom as $Rb^{400}$ include a fluorine atom, a chlorine atom, a bromine atom, and an iodine atom.

The specific forms and the desired forms of $Rb^{501}$ in Formula (B1), $Rb^{502}$ in Formula (B2), $Rb^{503}$ in Formula (B3), $Rb^{504}$ in Formula (B4), $Rb^{505}$ in Formula (B5), $Rb^{506}$ in Formula (B6), and $Rb^{508}$ in Formula (B8) are the same as each other, and hereinafter, $Rb^{501}$, $Rb^{502}$, $Rb^{503}$, $Rb^{504}$, $Rb^{505}$, $Rb^{506}$, and $Rb^{508}$ will be collectively referred to as "$Rb^{500}$".

The alkyl group having 1 or more and 4 or less carbon atoms as $Rb^{500}$ may be any of linear, branched, or cyclic. The number of carbon atoms of the alkyl group is, for example, preferably 1 or more and 3 or less, more preferably 1 or 2, and still more preferably 1.

Examples of the linear alkyl group having 1 or more and 4 or less carbon atoms include a methyl group, an ethyl group, an n-propyl group, and an n-butyl group.

Examples of the branched alkyl group having 3 or 4 carbon atoms include an isopropyl group, an isobutyl group, a sec-butyl group, and a tert-butyl group.

Examples of the cyclic alkyl group having 3 or 4 carbon atoms include a cyclopropyl group and a cyclobutyl group.

The alkyl group in the alkoxy group having 1 or more and 6 or less carbon atoms as $Rb^{500}$ may be any of linear, branched, or cyclic. The number of carbon atoms of the alkyl group in the alkoxy group having 1 or more and 6 or less carbon atoms is, for example, preferably 1 or more and 4 or less, more preferably 1 or more and 3 or less, and still more preferably 1 or 2.

Examples of the linear alkoxy group having 1 or more and 6 or less carbon atoms include a methoxy group, an ethoxy group, an n-propoxy group, an n-butoxy group, an n-pentyloxy group, and an n-hexyloxy group.

Examples of the branched alkoxy group having 3 or more and 6 or less carbon atoms include an isopropoxy group, an isobutoxy group, a sec-butoxy group, a tert-butoxy group, an isopentyloxy group, a neopentyloxy group, a tert-pentyloxy group, an isohexyloxy group, a sec-hexyloxy group, and a tert-hexyloxy group.

Examples of the cyclic alkoxy group having 3 or more and 6 or less carbon atoms include a cyclopropoxy group, a cyclobutoxy group, a cyclopentyloxy group, and a cyclohexyloxy group.

Examples of the halogen atom as $Rb^{500}$ include a fluorine atom, a chlorine atom, a bromine atom, and an iodine atom.

The specific forms and the desired forms of $Rb^{801}$ in Formula (B1), $Rb^{802}$ in Formula (B2), $Rb^{803}$ in Formula (B3), $Rb^{804}$ in Formula (B4), $Rb^{805}$ in Formula (B5), $Rb^{806}$ in Formula (B6), and $Rb^{808}$ in Formula (B8) are the same as each other, and hereinafter, $Rb^{801}$, $Rb^{802}$, $Rb^{803}$, $Rb^{804}$, $Rb^{805}$, $Rb^{806}$, and $Rb^{808}$ will be collectively referred to as "$Rb^{800}$".

The alkyl group having 1 or more and 4 or less carbon atoms as $Rb^{800}$ may be any of linear, branched, or cyclic. The number of carbon atoms of the alkyl group is, for example, preferably 1 or more and 3 or less, more preferably 1 or 2, and still more preferably 1.

Examples of the linear alkyl group having 1 or more and 4 or less carbon atoms include a methyl group, an ethyl group, an n-propyl group, and an n-butyl group.

Examples of the branched alkyl group having 3 or 4 carbon atoms include an isopropyl group, an isobutyl group, a sec-butyl group, and a tert-butyl group.

Examples of the cyclic alkyl group having 3 or 4 carbon atoms include a cyclopropyl group and a cyclobutyl group.

The alkyl group in the alkoxy group having 1 or more and 6 or less carbon atoms as $Rb^{800}$ may be any of linear, branched, or cyclic. The number of carbon atoms of the alkyl group in the alkoxy group having 1 or more and 6 or less carbon atoms is, for example, preferably 1 or more and 4 or less, more preferably 1 or more and 3 or less, and still more preferably 1 or 2.

Examples of the linear alkoxy group having 1 or more and 6 or less carbon atoms include a methoxy group, an ethoxy group, an n-propoxy group, an n-butoxy group, an n-pentyloxy group, and an n-hexyloxy group.

Examples of the branched alkoxy group having 3 or more and 6 or less carbon atoms include an isopropoxy group, an isobutoxy group, a sec-butoxy group, a tert-butoxy group, an isopentyloxy group, a neopentyloxy group, a tert-pentyloxy group, an isohexyloxy group, a sec-hexyloxy group, and a tert-hexyloxy group.

Examples of the cyclic alkoxy group having 3 or more and 6 or less carbon atoms include a cyclopropoxy group, a cyclobutoxy group, a cyclopentyloxy group, and a cyclohexyloxy group.

Examples of the halogen atom as $Rb^{800}$ include a fluorine atom, a chlorine atom, a bromine atom, and an iodine atom.

The specific forms and the desired forms of $Rb^{901}$ in Formula (B1), $Rb^{902}$ in Formula (B2), $Rb^{903}$ in Formula (B3), $Rb^{904}$ in Formula (B4), $Rb^{905}$ in Formula (B5), $Rb^{906}$ in Formula (B6), and $Rb^{908}$ in Formula (B8) are the same as each other, and hereinafter, $Rb^{901}$, $Rb^{902}$, $Rb^{903}$, $Rb^{904}$, $Rb^{905}$, $Rb^{906}$, and $Rb^{908}$ will be collectively referred to as "$Rb^{900}$".

The alkyl group having 1 or more and 4 or less carbon atoms as $Rb^{900}$ may be any of linear, branched, or cyclic. The number of carbon atoms of the alkyl group is, for example, preferably 1 or more and 3 or less, more preferably 1 or 2, and still more preferably 1.

Examples of the linear alkyl group having 1 or more and 4 or less carbon atoms include a methyl group, an ethyl group, an n-propyl group, and an n-butyl group.

Examples of the branched alkyl group having 3 or 4 carbon atoms include an isopropyl group, an isobutyl group, a sec-butyl group, and a tert-butyl group.

Examples of the cyclic alkyl group having 3 or 4 carbon atoms include a cyclopropyl group and a cyclobutyl group.

The alkyl group in the alkoxy group having 1 or more and 6 or less carbon atoms as $Rb^{900}$ may be any of linear, branched, or cyclic. The number of carbon atoms of the alkyl group in the alkoxy group having 1 or more and 6 or less carbon atoms is, for example, preferably 1 or more and 4 or less, more preferably 1 or more and 3 or less, and still more preferably 1 or 2.

Examples of the linear alkoxy group having 1 or more and 6 or less carbon atoms include a methoxy group, an ethoxy group, an n-propoxy group, an n-butoxy group, an n-pentyloxy group, and an n-hexyloxy group.

Examples of the branched alkoxy group having 3 or more and 6 or less carbon atoms include an isopropoxy group, an isobutoxy group, a sec-butoxy group, a tert-butoxy group, an isopentyloxy group, a neopentyloxy group, a tert-pentyloxy group, an isohexyloxy group, a sec-hexyloxy group, and a tert-hexyloxy group.

Examples of the cyclic alkoxy group having 3 or more and 6 or less carbon atoms include a cyclopropoxy group, a cyclobutoxy group, a cyclopentyloxy group, and a cyclohexyloxy group.

Examples of the halogen atom as $Rb^{900}$ include a fluorine atom, a chlorine atom, a bromine atom, and an iodine atom.

Hereinafter, diol units (B1-1) to (B1-6) are shown as specific examples of the diol unit (B1). The diol unit (B1) is not limited thereto.

(B1-1)

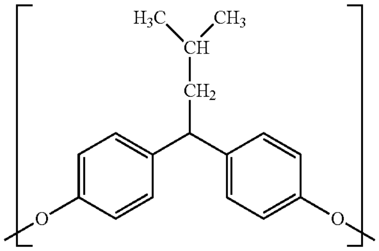

(B1-2)

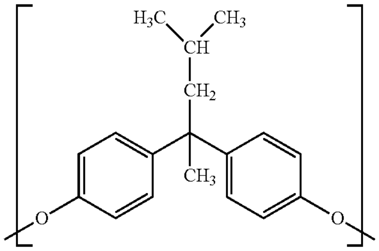

(B1-3)

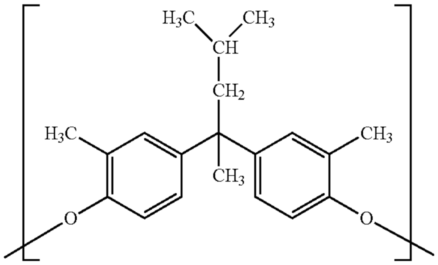

-continued (B1-4)

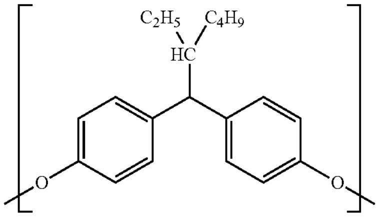

(B1-5)

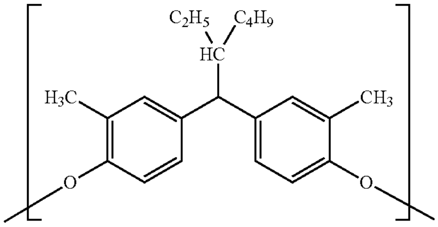

(B1-6)

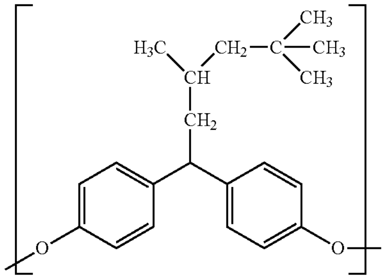

Hereinafter, diol units (B2-1) to (B2-11) are shown as specific examples of the diol unit (B2). The diol unit (B2) is not limited thereto.

(B2-1)

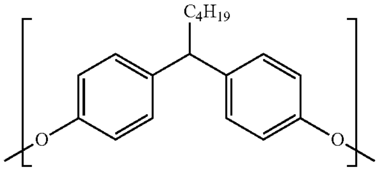

(B2-2)

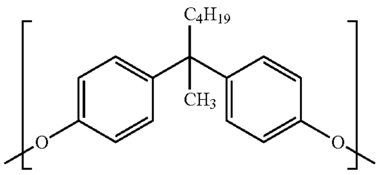

(B2-3)

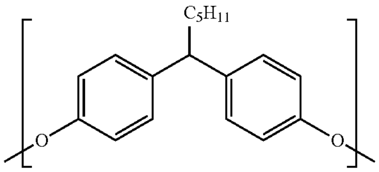

(B2-4)

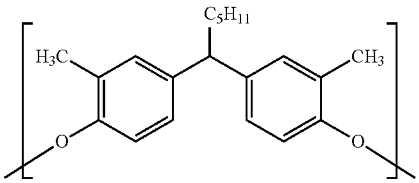

-continued
(B2-5)
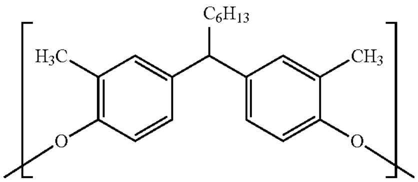
(B2-6)
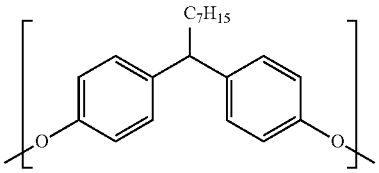
(B2-7)
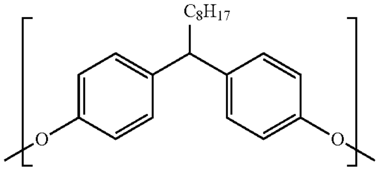
(B2-8)
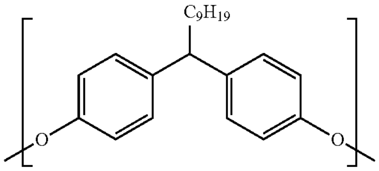
(B2-9)
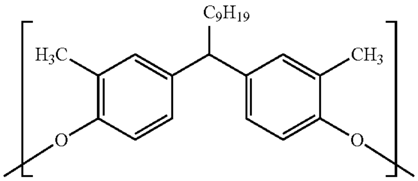
(B2-10)
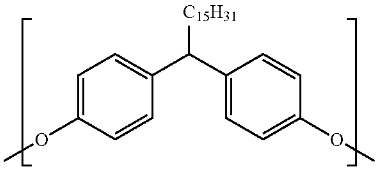
(B2-11)
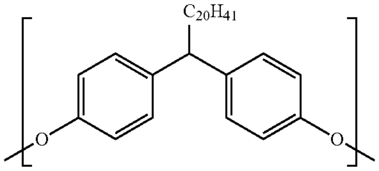
Hereinafter, diol units (B3-1) to (B3-4) are shown as specific examples of the diol unit (B3). The diol unit (B3) is not limited thereto.
(B3-1)
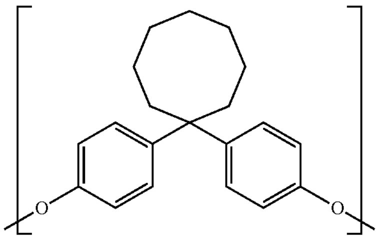
(B3-2)
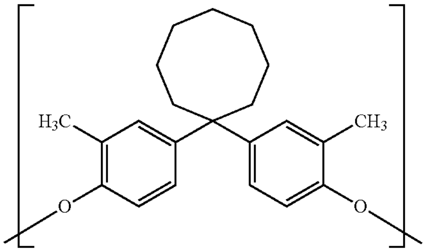
(B3-3)
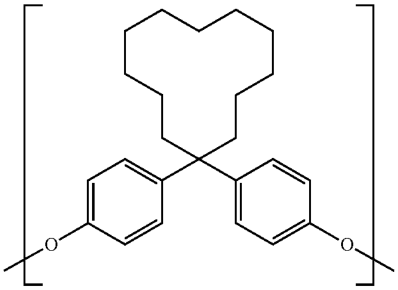
(B3-4)
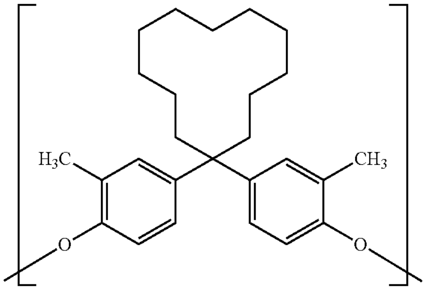
Hereinafter, diol units (B4-1) to (B4-7) are shown as specific examples of the diol unit (B4). The diol unit (B4) is not limited thereto.
(B4-1)
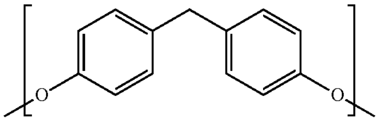
(B4-2)
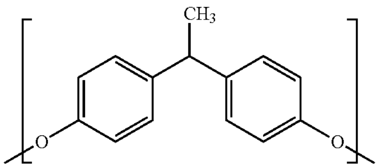

-continued
(B4-3)
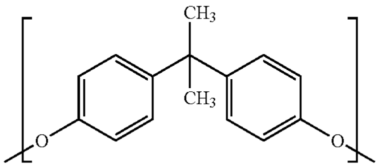
(B4-4)
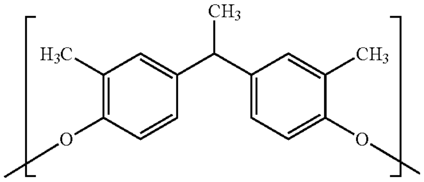
(B4-5)
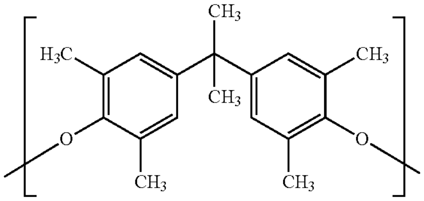
(B4-6)
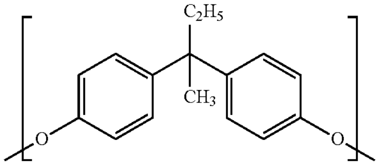
(B4-7)
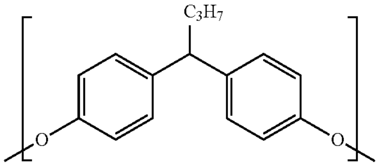
Hereinafter, diol units (B5-1) to (B5-6) are shown as specific examples of the diol unit (B5). The diol unit (B5) is not limited thereto.
(B5-1)
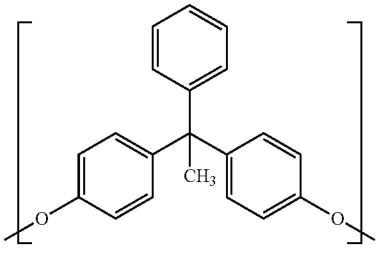
(B5-2)
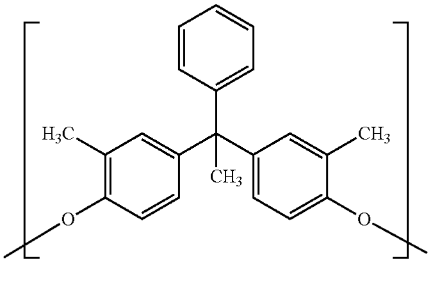
-continued
(B5-3)
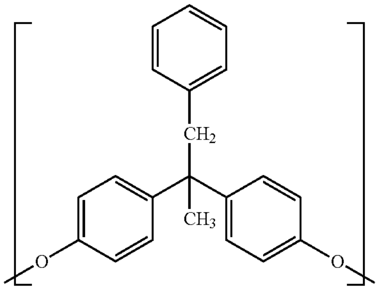
(B5-4)
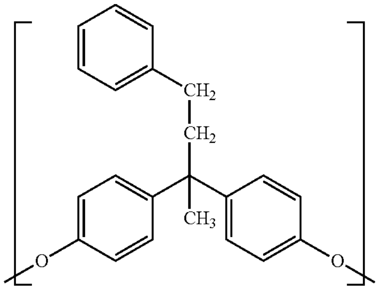
(B5-5)
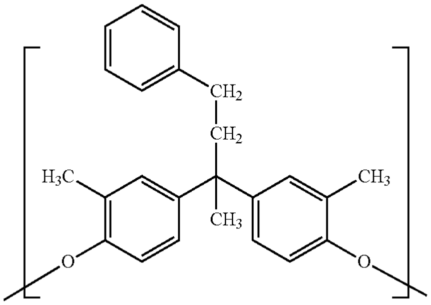
(B5-6)
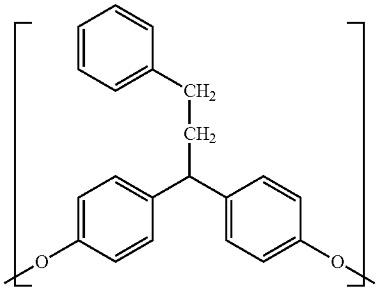
Hereinafter, diol units (B6-1) to (B6-4) are shown as specific examples of the diol unit (B6). The diol unit (B6) is not limited thereto.
(B6-1)
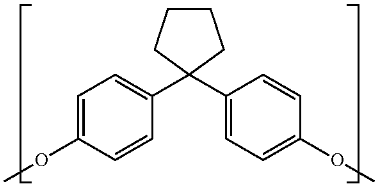

-continued (B6-2)

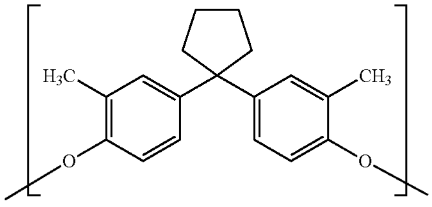

(B6-3)

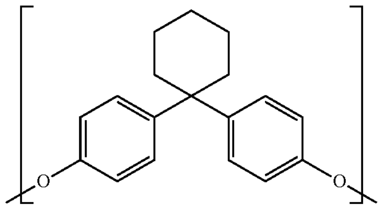

(B6-4)

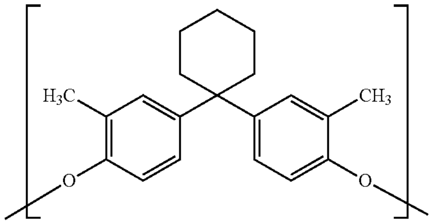

Hereinafter, diol units (B8-1) to (B8-3) are shown as specific examples of the diol unit (B8). The diol unit (B8) is not limited thereto.

(B8-1)

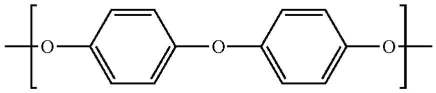

(B8-2)

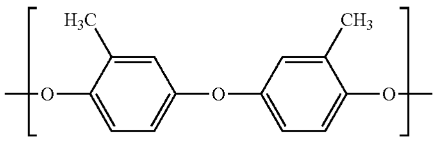

(B8-3)

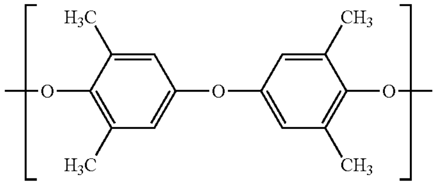

In a case where the polyester resin (1) has a diol unit (B), the mass proportion of the diol unit (B) in the mass of the polyester resin (1) is, for example, preferably 25% by mass or greater and 80% by mass or less, more preferably 30% by mass or greater and 75% by mass or less, and still more preferably 35% by mass or greater and 70% by mass or less.

The polyester resin (1) may have other diol units in addition to the constitutional unit containing biphenyl represented by Formula (1) and the diol unit (B). Examples of other diol units include aliphatic diol (such as ethylene glycol, diethylene glycol, triethylene glycol, propylene glycol, butanediol, hexanediol, and neopentyl glycol) units and alicyclic diol (such as cyclohexanediol, cyclohexane dimethanol, and hydrogenated bisphenol A) units. These diol units contained in the polyester resin (1) may be used alone or in combination of two or more kinds thereof.

A terminal of the polyester resin (1) may be sealed or modified with a terminal-sealing agent, a molecular weight modifier, or the like used in a case of the production. Examples of the terminal-sealing agent or the molecular weight modifier include monohydric phenol, monovalent acid chloride, monohydric alcohol, and monovalent carboxylic acid.

Examples of the monohydric phenol include phenol, o-cresol, m-cresol, p-cresol, o-ethylphenol, m-ethylphenol, p-ethylphenol, o-propylphenol, m-propylphenol, p-propylphenol, o-tert-butylphenol, m-tert-butylphenol, p-tert-butylphenol, pentylphenol, hexylphenol, octylphenol, nonylphenol, a 2,6-dimethylphenol derivative, a 2-methylphenol derivative, o-phenylphenol, m-phenylphenol, p-phenylphenol, o-methoxyphenol, m-methoxyphenol, p-methoxyphenol, 2,3,5-trimethylphenol, 2,3,6-trimethylphenol, 2,3-xylenol, 2,4-xylenol, 2,5-xylenol, 2,6-xylenol, 3,4-xylenol, 3,5-xylenol, 2-phenyl-2-(4-hydroxyphenyl) propane, 2-phenyl-2-(2-hydroxyphenyl)propane, and 2-phenyl-2-(3-hydroxyphenyl)propane.

Examples of the monovalent acid chloride include monofunctional acid halides such as benzoyl chloride, benzoic acid chloride, methanesulfonyl chloride, phenylchloroformate, acetic acid chloride, butyric acid chloride, octyl acid chloride, benzenesulfonyl chloride, benzenesulfinyl chloride, sulfinyl chloride, benzene phosphonyl chloride, and substituents thereof.

Examples of the monohydric alcohol include methanol, ethanol, n-propanol, isopropanol, n-butanol, 2-butanol, pentanol, hexanol, dodecyl alcohol, stearyl alcohol, benzyl alcohol, and phenethyl alcohol.

Examples of the monovalent carboxylic acid include acetic acid, propionic acid, octanoic acid, cyclohexanecarboxylic acid, benzoic acid, toluic acid, phenylacetic acid, p-tert-butylbenzoic acid, and p-methoxyphenylacetic acid.

The weight-average molecular weight of the polyester resin (1) is, for example, preferably 30,000 or greater and 300,000 or less, more preferably 40,000 or greater and 250,000 or less, and still more preferably 50,000 or greater and 200,000 or less.

The molecular weight of the polyester resin (1) is a molecular weight measured by gel permeation chromatography (GPC) in terms of polystyrene. The GPC is carried out by using tetrahydrofuran as an eluent.

The polyester resin (1) can be obtained by polycondensing a monomer that provides a constitutional unit containing biphenyl represented by Formula (1), a monomer that provides a dicarboxylic acid unit (A) and a monomer that provides a diol unit (B) as necessary, and other monomers as necessary, using a method of the related art. Examples of the method of polycondensing monomers include an interfacial polymerization method, a solution polymerization method, and a melt polymerization method. The interfacial polymerization method is a polymerization method of mixing a divalent carboxylic acid halide dissolved in an organic solvent that is incompatible with water and dihydric alcohol dissolved in an alkali aqueous solution to obtain polyester. Examples of documents related to the interfacial polymerization method include W. M. EARECKSON, J. Poly. Sci., XL399, 1959, and JP1965-1959B (JP S40-1959B). Since the interfacial polymerization method enables the reaction to proceed faster than the reaction carried out by the solution polymerization method and also enables suppression of hydrolysis of the divalent carboxylic acid halide, as a result, a high-molecular-weight polyester resin can be obtained.

Polycarbonate Resin (1)

In the present disclosure, a polycarbonate resin that has a constitutional unit containing biphenyl represented by Formula (1) is referred to as a polycarbonate resin (1).

Formula (1)

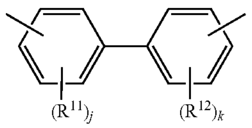

In Formula (1), j represents an integer of 0 or greater and 4 or less, j pieces of $R^{11}$'s each independently represent a methyl group or an ethyl group, k represents an integer of 0 or greater and 4 or less, and k pieces of $R^{11}$'s each independently represent a methyl group or an ethyl group.

j represents an integer of 0 or greater and 4 or less, for example, preferably an integer of 0 or greater and 3 or less, more preferably an integer of 0 or greater and 2 or less, still more preferably 0 or 1, and particularly preferably 0.

In a case where j represents an integer of 1 or greater, j pieces of $R^{11}$'s each independently represent a methyl group or an ethyl group and, for example, preferably a methyl group.

k represents an integer of 0 or greater and 4 or less, for example, preferably an integer of 0 or greater and 3 or less, more preferably an integer of 0 or greater and 2 or less, still more preferably 0 or 1, and particularly preferably 0.

In a case where k represents an integer of 1 or greater, k pieces of $R^{12}$'s each independently represent a methyl group or an ethyl group and, for example, preferably a methyl group.

From the viewpoint that the polycarbonate resin (1) has a constitutional unit containing biphenyl represented by Formula (1) in a molecule, for example, it is preferable that the polycarbonate resin (1) has a constitutional unit (1-C) represented by Formula (1-C).

Formula (1-C)

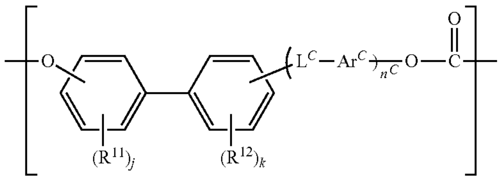

In Formula (1-C), j represents an integer of 0 or greater and 4 or less, j pieces of $R^{11}$'s each independently represent a methyl group or an ethyl group, k represents an integer of 0 or greater and 4 or less, k pieces of $R^{12}$'s each independently represent a methyl group or an ethyl group, $L^C$ represents a single bond or a divalent linking group, $Ar^C$ represents an aromatic ring that may have a substituent, and $n^C$ represents 0, 1, or 2.

j, k, $R^{11}$, and $R^{12}$ in Formula (1-C) each have the same definition as that for j, k, $R^{11}$, and $R^{12}$ in Formula (1), and the specific forms and the desired forms are also the same as described above.

In a case where $L^C$ represents a divalent linking group, examples of the divalent linking group include an oxygen atom, a sulfur atom, and —C($Rc^1$)($Rc^2$)-. Here, $Rc^1$ and $Rc^2$ each independently represent a hydrogen atom, an alkyl group having 1 or more and 10 or less carbon atoms, an aryl group having 6 or more and 12 or less carbon atoms, or an aralkyl group having 7 or more and 20 or less carbon atoms, and $Rc^1$ and $Rc^2$ may be bonded to each other to form a cyclic alkyl group.

The alkyl group having 1 or more and 10 or less carbon atoms as $Rc^1$ and $Rc^2$ may be linear, branched, or cyclic. The number of carbon atoms of the alkyl group is, for example, preferably 1 or more and 6 or less, more preferably 1 or more and 4 or less, and still more preferably 1 or 2.

The aryl group having 6 or more and 12 or less carbon atoms as $Rc^1$ and $Rc^2$ may be any of a monocycle or a polycycle. The number of carbon atoms of the aryl group is, for example, preferably 6 or more and 10 or less and more preferably 6.

The alkyl group in the aralkyl group having 7 or more and 20 or less carbon atoms as $Rc^1$ and $Rc^2$ may be any of linear, branched, or cyclic. The number of carbon atoms of the alkyl group in the aralkyl group having 7 or more and 20 or less carbon atoms is, for example, preferably 1 or more and 4 or less, more preferably 1 or more and 3 or less, and still more preferably 1 or 2.

The aryl group in the aralkyl group having 7 or more and 20 or less carbon atoms as $Rc^1$ and $Rc^2$ may be any of a monocycle or a polycycle. The number of carbon atoms of the aryl group is, for example, preferably 6 or more and 10 or less and more preferably 6.

The aromatic ring as $Ar^C$ may be any of a monocycle or a polycycle. Examples of the aromatic ring include a benzene ring, a naphthalene ring, an anthracene ring, and a phenanthrene ring. Among these, for example, a benzene ring and a naphthalene ring are preferable.

The hydrogen atom on the aromatic ring as $Ar^C$ may be substituted with an alkyl group, an aryl group, an aralkyl group, an alkoxy group, an aryloxy group, a halogen atom, or the like. As the substituent in a case where the aromatic ring as $Ar^C$ is substituted, for example, an alkyl group having 1 or more and 10 or less carbon atoms, an aryl group having 6 or more and 12 or less carbon atoms, and an alkoxy group having 1 or more and 6 or less carbon atoms are preferable.

It is preferable that the constitutional unit (1-C) represented by Formula (1-C) is, for example, a constitutional unit (11-C) represented by Formula (11-C).

Formula (11-C)

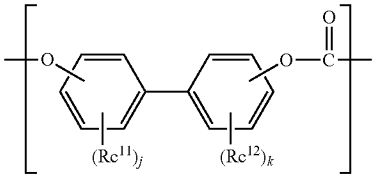

In Formula (11-C), j represents an integer of 0 or greater and 4 or less, j pieces of $R^{11}$'s each independently represent a methyl group or an ethyl group, k represents an integer of 0 or greater and 4 or less, and k pieces of $R^{12}$'s each independently represent a methyl group or an ethyl group.

j, k, $R^{11}$, and $R^{12}$ in Formula (11-C) each have the same definition as that for j, k, $R^{11}$, and $R^{12}$ in Formula (1), and the specific forms and the desired forms are also the same as described above.

Specific examples of the constitutional unit (1-C) include the following constitutional units (1-C1) to (1-C10). The constitutional unit (1-C) is not limited thereto.

(1-C1)

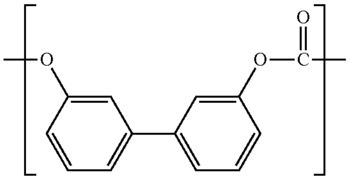

(1-C2)

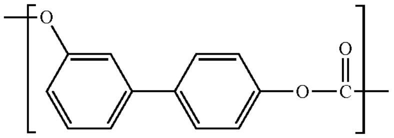

(1-C3)

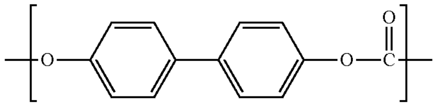

(1-C4)

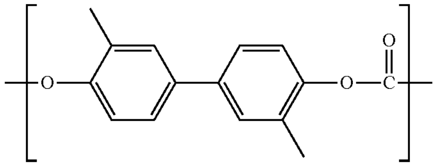

(1-C5)

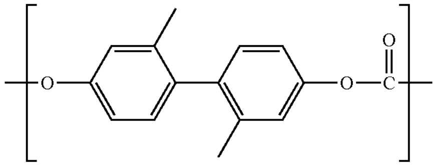

(1-C6)

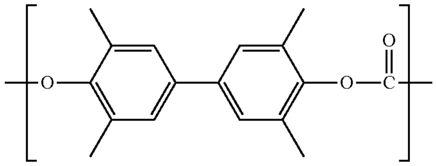

(1-C7)

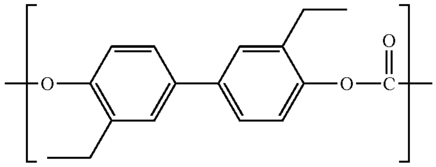

(1-C8)

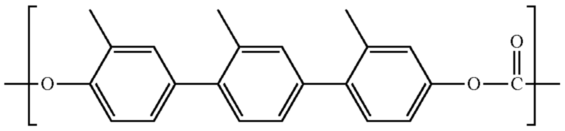

(1-C9)

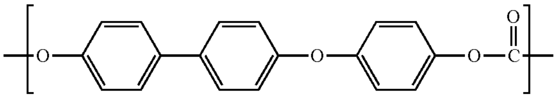

(1-C10)

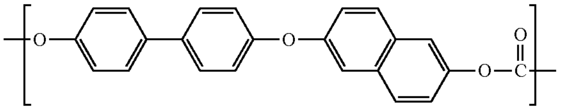

As the constitutional unit (1-C), for example, at least one selected from the group consisting of the constitutional units (1-C3) to (1-C7) is preferable, at least one selected from the group consisting of the constitutional unit (1-C3) to (1-C6) is more preferable, and the constitutional unit (1-C3) is still more preferable.

The polycarbonate resin (1) may have other constitutional units in addition to the constitutional unit containing biphenyl represented by Formula (1). Hereinafter, the constitutional unit other than the constitutional unit containing biphenyl represented by Formula (1) will be described.

The polycarbonate resin (1) may have at least one constitutional unit (C) selected from the group consisting of a constitutional unit (Ca1) represented by Formula (Ca1), a constitutional unit (Ca3) represented by Formula (Ca3), a constitutional unit (Ca4) represented by Formula (Ca4), a constitutional unit (Cb1) represented by Formula (Cb1), a constitutional unit (Cb2) represented by Formula (Cb2), a constitutional unit (Cb3) represented by Formula (Cb3), a constitutional unit (Cb4) represented by Formula (Cb4), a constitutional unit (Cb5) represented by Formula (Cb5), a constitutional unit (Cb6) represented by Formula (Cb6), and a constitutional unit (Cb8) represented by Formula (Cb8).

In a case where the polycarbonate resin (1) has a constitutional unit (C), the polycarbonate resin (1) may have one or two or more kinds of constitutional units (C).

It is preferable that the polycarbonate resin (1) has, for example, at least one selected from the group consisting of the constitutional unit (Cb1), the constitutional unit (Cb2), the constitutional unit (Cb3), the constitutional unit (Cb4), the constitutional unit (Cb5), the constitutional unit (Cb6), and the constitutional unit (Cb8) as the constitutional unit (C).

Formula (Ca1)

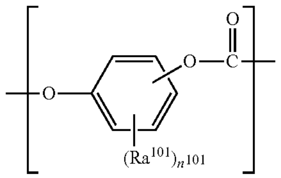

In Formula (Ca1), $n^{101}$ represents an integer of 0 or greater and 4 or less, and $n^{101}$ pieces of $Ra^{101}$'s each independently represent an alkyl group having 1 or more and 10 or less carbon atoms, an aryl group having 6 or more and 12 or less carbon atoms, or an alkoxy group having 1 or more and 6 or less carbon atoms.

$Ra^{101}$ and $n^{101}$ in Formula (Ca1) each have the same definition as that for $Ra^{101}$ and $n^{101}$ in Formula (A1), and the specific forms thereof are also the same as each other.

Formula (Ca3)

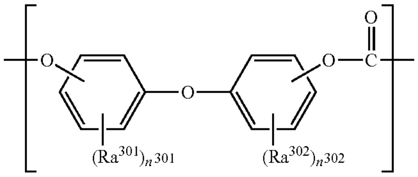

In Formula (Ca3), $n^{301}$ and $n^{302}$ each independently represent an integer of 0 or greater and 4 or less, and $n^{301}$ pieces of $Ra^{301}$'s and $n^{302}$ pieces of $Ra^{302}$'s each independently represent an alkyl group having 1 or more and 10 or less carbon atoms, an aryl group having 6 or more and 12 or less carbon atoms, or an alkoxy group having 1 or more and 6 or less carbon atoms.

$Ra^{301}$, $Ra^{302}$, $n^{301}$, and $n^{302}$ in Formula (Ca3) each have the same definition as that for $Ra^{301}$, $Ra^{302}$, $n^{301}$, and $n^{302}$ in Formula (A3), and the specific forms thereof are also the same as each other.

Formula (Ca4)

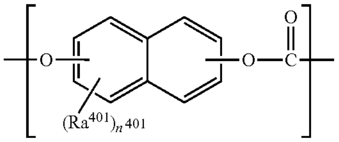

In Formula (Ca4), $n^{401}$ represents an integer of 0 or greater and 6 or less, and $n^{401}$ pieces of $Ra^{401}$'s each independently represent an alkyl group having 1 or more and 10 or less carbon atoms, an aryl group having 6 or more and 12 or less carbon atoms, or an alkoxy group having 1 or more and 6 or less carbon atoms.

$Ra^{401}$ and $n^{401}$ in Formula (Ca4) each have the same definition as that for $Ra^{401}$ and $n^{401}$ in Formula (A4), and the specific forms thereof are also the same as each other.

Formula (Cb1)

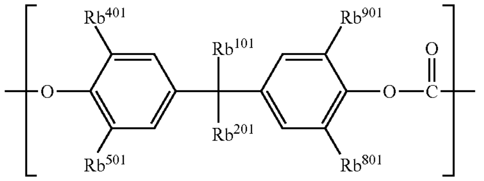

In Formula (Cb1), $Rb^{101}$ represents a branched alkyl group having 4 or more and 20 or less carbon atoms, $Rb^{201}$ represents a hydrogen atom or an alkyl group having 1 or more and 3 or less carbon atoms, and $Rb^{401}$, $Rb^{501}$, $Rb^{801}$, and $Rb^{901}$ each independently represent a hydrogen atom, an alkyl group having 1 or more and 4 or less carbon atoms, an alkoxy group having 1 or more and 6 or less carbon atoms, or a halogen atom.

$Rb^{101}$, $Rb^{201}$, $Rb^{401}$, $Rb^{501}$, $Rb^{801}$, and $Rb^{901}$ in Formula (Cb1) each have the same definition as that for $Rb^{101}$, $Rb^{201}$, $Rb^{401}$, $Rb^{501}$, $Rb^{801}$, and $Rb^{901}$ in Formula (B1), and the specific forms thereof are also the same as each other.

Formula (Cb2)

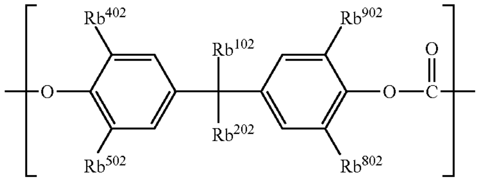

In Formula (Cb2), $Rb^{102}$ represents a linear alkyl group having 4 or more and 20 or less carbon atoms, $Rb^{202}$ represents a hydrogen atom or an alkyl group having 1 or more and 3 or less carbon atoms, and $Rb^{402}$, $Rb^{502}$, $Rb^{802}$, and $Rb^{902}$ each independently represent a hydrogen atom, an alkyl group having 1 or more and 4 or less carbon atoms, an alkoxy group having 1 or more and 6 or less carbon atoms, or a halogen atom.

$Rb^{102}$, $Rb^{202}$, $Rb^{402}$, $Rb^{502}$, $Rb^{802}$, and $Rb^{902}$ in Formula (Cb2) each have the same definition as that for $Rb^{102}$, $Rb^{202}$, $Rb^{402}$, $Rb^{502}$, $Rb^{802}$, and $Rb^{902}$ in Formula (B2), and the specific forms thereof are also the same as each other.

Formula (Cb3)

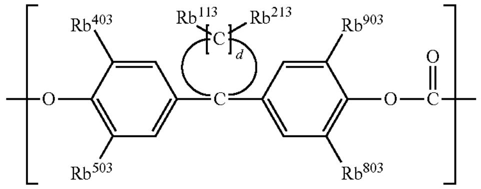

In Formula (Cb3), $Rb^{113}$ and $Rb^{213}$ each independently represent a hydrogen atom, a linear alkyl group having 1 or more and 3 or less carbon atoms, an alkoxy group having 1 or more and 4 or less carbon atoms, or a halogen atom, d represents an integer of 7 or greater and 15 or less, and $Rb^{403}$, $Rb^{503}$, $Rb^{803}$, and $Rb^{903}$ each independently represent a hydrogen atom, an alkyl group having 1 or more and 4 or less carbon atoms, an alkoxy group having 1 or more and 6 or less carbon atoms, or a halogen atom.

$Rb^{113}$, $Rb^{213}$, d, $Rb^{403}$, $Rb^{503}$, $Rb^{803}$, and $Rb^{903}$ in Formula (Cb3) each have the same definition as that for $Rb^{113}$, $Rb^{213}$, d, $Rb^{403}$, $Rb^{503}$, $Rb^{803}$, and $Rb^{903}$ in Formula (B3), and the specific forms thereof are also the same as each other.

Formula (Cb4)

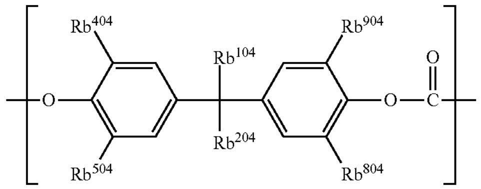

In Formula (Cb4), $Rb^{104}$ and $Rb^{204}$ each independently represent a hydrogen atom or an alkyl group having 1 or more and 3 or less carbon atoms, and $Rb^{404}$, $Rb^{504}$, $Rb^{804}$, and $Rb^{904}$ each independently represent a hydrogen atom, an alkyl group having 1 or more and 4 or less carbon atoms, an alkoxy group having 1 or more and 6 or less carbon atoms, or a halogen atom.

$Rb^{104}$, $Rb^{204}$, $Rb^{404}$, $Rb^{504}$, $Rb^{804}$, and $Rb^{904}$ in Formula (Cb4) each have the same definition as that for $Rb^{104}$, $Rb^{204}$, $Rb^{404}$, $Rb^{504}$, $Rb^{804}$ and $Rb^{904}$ in Formula (B4), and the specific forms thereof are also the same as each other.

Formula (Cb5)

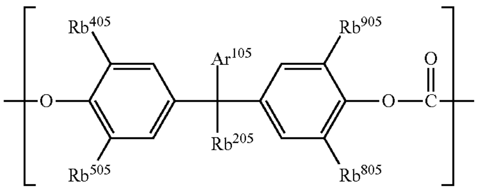

In Formula (Cb5), $Ar^{105}$ represents an aryl group having 6 or more and 12 or less carbon atoms or an aralkyl group having 7 or more and 20 or less carbon atoms, $Rb^{205}$ represents a hydrogen atom or an alkyl group having 1 or more and 3 or less carbon atoms, and $Rb^{405}$, $Rb^{505}$, $Rb^{805}$, and $Rb^{905}$ each independently represent a hydrogen atom, an alkyl group having 1 or more and 4 or less carbon atoms, an alkoxy group having 1 or more and 6 or less carbon atoms, or a halogen atom.

$Ar^{105}$, $Rb^{205}$, $Rb^{405}$, $Rb^{505}$, $Rb^{805}$, and $Rb^{905}$ in Formula (Cb5) each have the same definition as that for $Ar^{105}$, $Rb^{205}$, $Rb^{405}$, $Rb^{505}$, $Rb^{805}$, and $Rb^{905}$ in Formula (B5), and the specific forms thereof are also the same as each other.

Formula (Cb6)

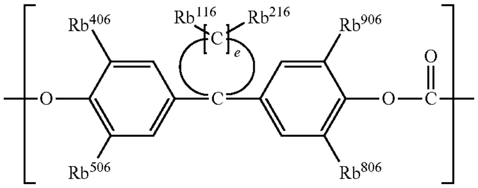

In Formula (Cb6), $Rb^{116}$ and $Rb^{216}$ each independently represent a hydrogen atom, a linear alkyl group having 1 or more and 3 or less carbon atoms, an alkoxy group having 1 or more and 4 or less carbon atoms, or a halogen atom, e represents an integer of 4 or greater and 6 or less, and $Rb^{406}$, $Rb^{506}$, $Rb^{806}$, and $Rb^{906}$ each independently represent a hydrogen atom, an alkyl group having 1 or more and 4 or less carbon atoms, an alkoxy group having 1 or more and 6 or less carbon atoms, or a halogen atom.

$Rb^{116}$, $Rb^{216}$, e, $Rb^{406}$, $Rb^{506}$, $Rb^{806}$, and $Rb^{906}$ in Formula (Cb6) each have the same definition as that for $Rb^{116}$, $Rb^{216}$, e, $Rb^{406}$, $Rb^{506}$, $Rb^{806}$, and $Rb^{906}$ in Formula (B6), and the specific forms thereof are also the same as each other.

Formula (Cb8)

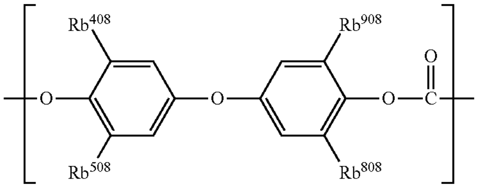

In Formula (Cb8), $Rb^{408}$, $Rb^{508}$, $Rb^{808}$, and $Rb^{908}$ each independently represent a hydrogen atom, an alkyl group having 1 or more and 4 or less carbon atoms, an alkoxy group having 1 or more and 6 or less carbon atoms, or a halogen atom.

$Rb^{408}$, $Rb^{508}$, $Rb^{808}$, and $Rb^{908}$ in Formula (Cb8) each have the same definition as that for $Rb^{408}$, $Rb^{508}$, $Rb^{808}$, and $Rb^{908}$ in Formula (B8), and the specific forms thereof are also the same as each other.

Hereinafter, constitutional units (Ca1-1) to (Ca1-9) are shown as specific examples of the constitutional unit (Ca1). The constitutional unit (Ca1) is not limited thereto.

(Ca1-1)

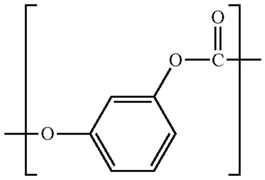

(Ca1-2)

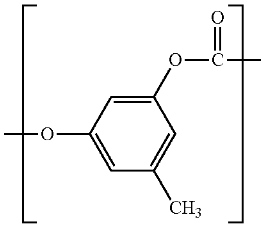

(Ca1-3)

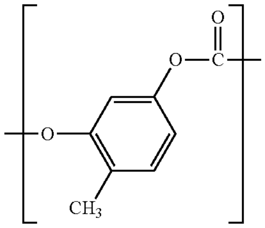

(Ca1-4)

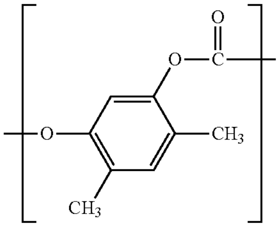

(Ca1-5)

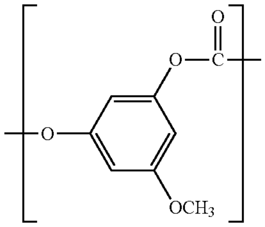

(Ca1-6)

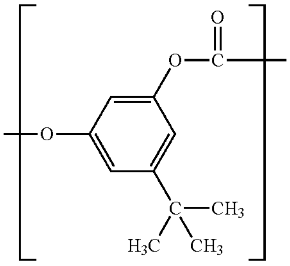

-continued (Ca1-7)

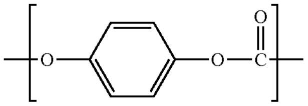

(Ca1-8)

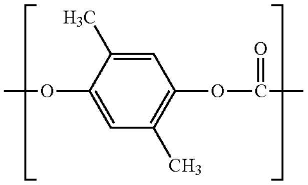

(Ca1-9)

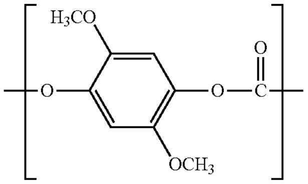

Hereinafter, constitutional units (Ca3-1) and (Ca3-2) are shown as specific examples of the constitutional unit (Ca3). The constitutional unit (Ca3) is not limited thereto.

(Ca3-1)

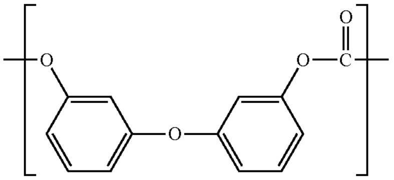

(Ca3-2)

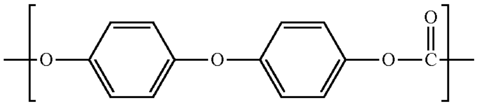

Hereinafter, constitutional units (Ca4-1) to (Ca4-3) are shown as specific examples of the constitutional units (Ca4). The constitutional unit (Ca4) is not limited thereto.

(Ca4-1)

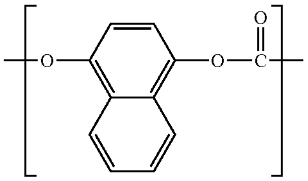

(Ca4-2)

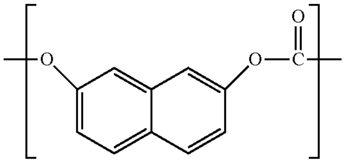

-continued (Ca4-3)

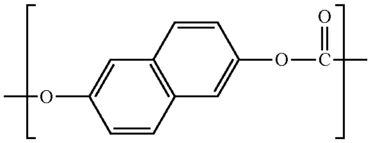

Hereinafter, constitutional units (Cb1-1) to (Cb1-6) are shown as specific examples of the constitutional unit (Cb1). The constitutional unit (Cb1) is not limited thereto.

(Cb1-1)

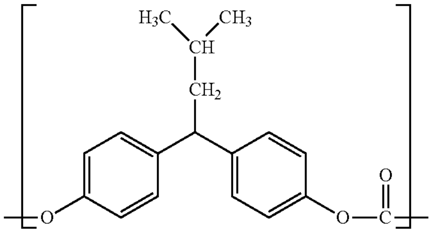

(Cb1-2)

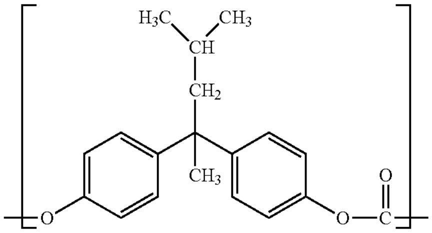

(Cb1-3)

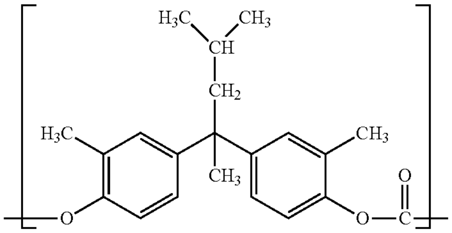

(Cb1-4)

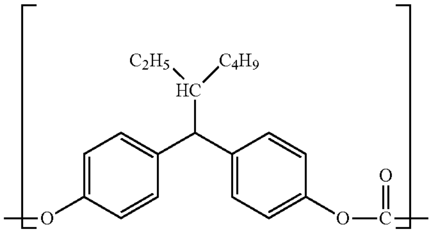

(Cb1-5)

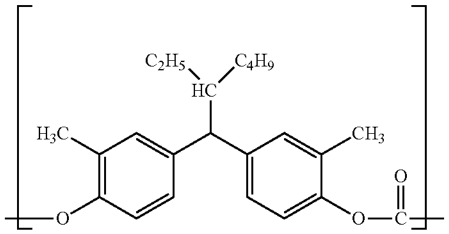

-continued (Cb1-6)

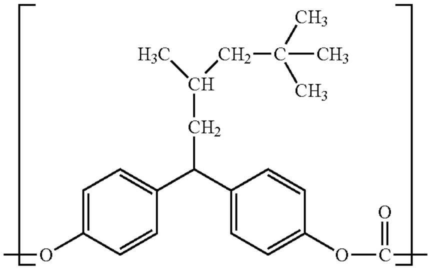

Hereinafter, constitutional units (Cb2-1) to (Cb2-11) are shown as specific examples of the constitutional unit (Cb2). The constitutional unit (Cb2) is not limited thereto.

(Cb2-1)

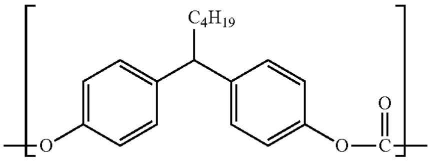

(Cb2-2)

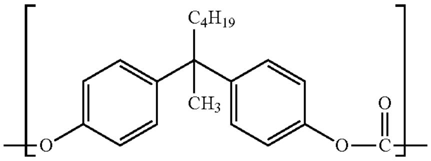

(Cb2-3)

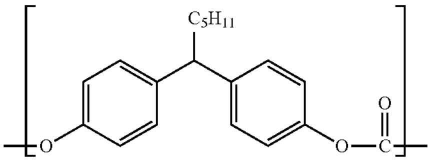

(Cb2-4)

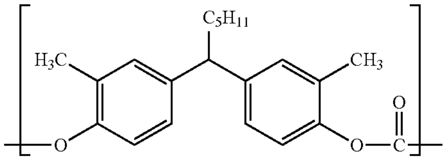

(Cb2-5)

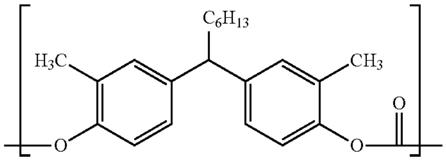

(Cb2-6)

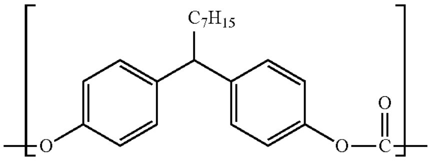

(Cb2-7)

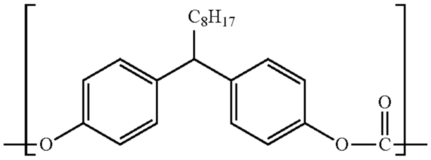

-continued (Cb2-8)

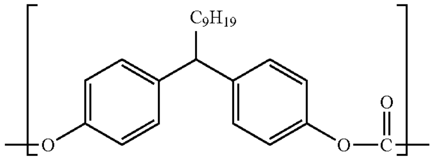

(Cb2-9)

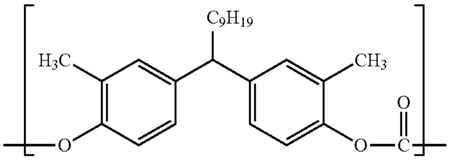

(Cb2-10)

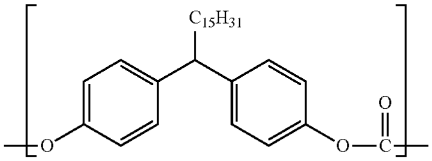

(Cb2-11)

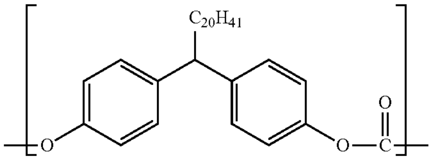

Hereinafter, constitutional units (Cb3-1) to (Cb3-4) are shown as specific examples of the constitutional unit (Cb3). The constitutional unit (Cb3) is not limited thereto.

(Cb3-1)

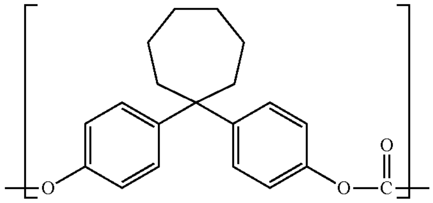

(Cb3-2)

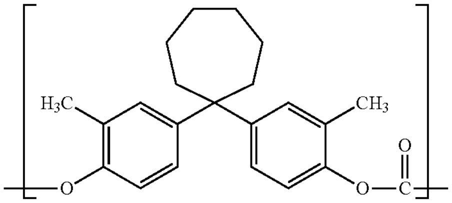

(Cb3-3)

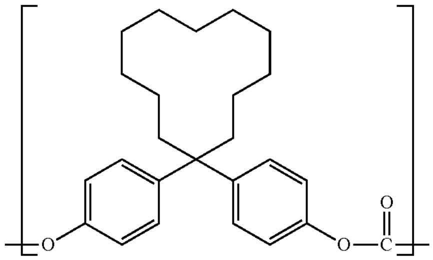

-continued (Cb3-4)

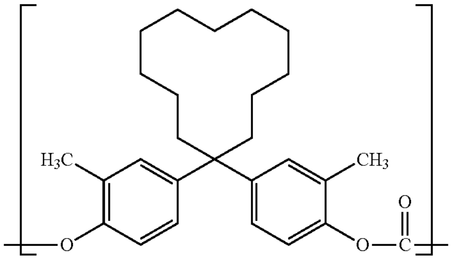

Hereinafter, constitutional units (Cb4-1) to (Cb4-7) are shown as specific examples of the constitutional units (Cb4). The constitutional unit (Cb4) is not limited thereto.

(Cb4-1)

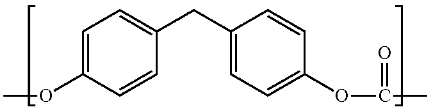

(Cb4-2)

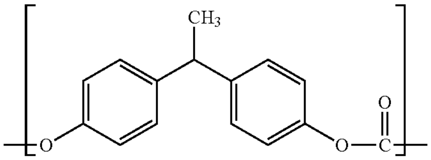

(Cb4-3)

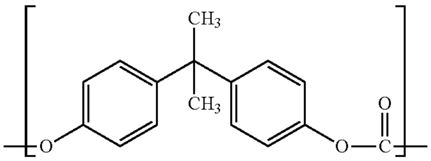

(Cb4-4)

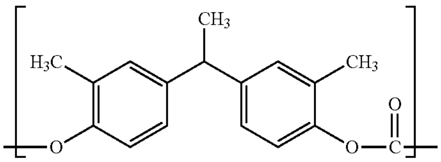

(Cb4-5)

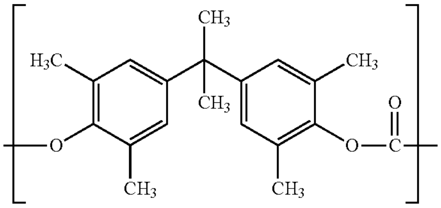

(Cb4-6)

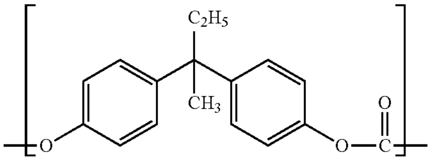

-continued (Cb4-7)

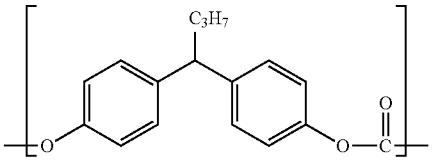

Hereinafter, constitutional units (Cb5-1) to (Cb5-6) are shown as specific examples of the constitutional units (Cb5). The constitutional unit (Cb5) is not limited thereto.

(Cb5-1)

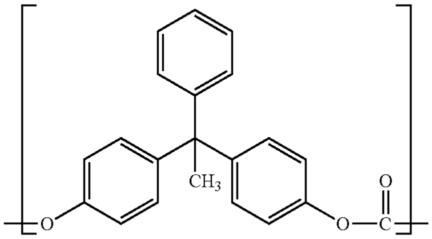

(Cb5-2)

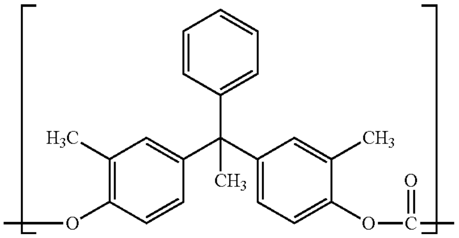

(Cb5-3)

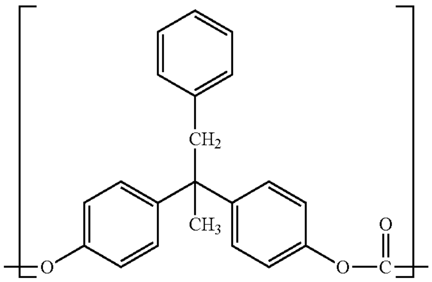

(Cb5-4)

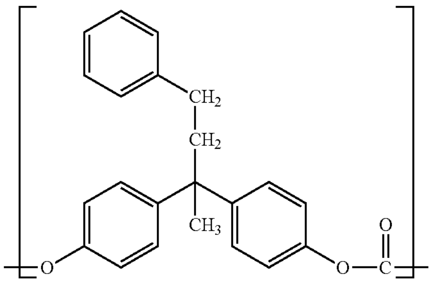

-continued (Cb5-5)

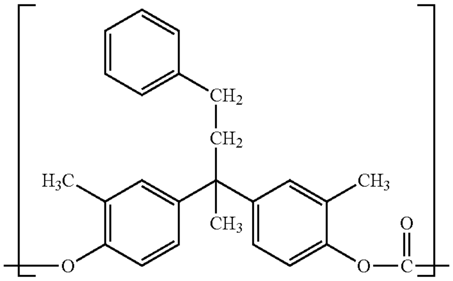

(Cb5-6)

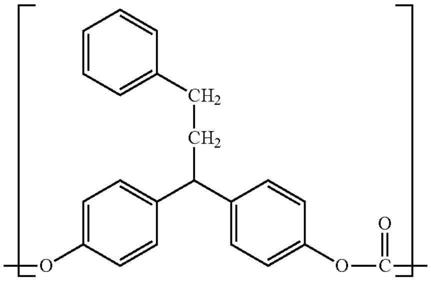

Hereinafter, constitutional units (Cb6-1) to (Cb6-4) are shown as specific examples of the constitutional units (Cb6). The constitutional unit (Cb6) is not limited thereto.

(Cb6-1)

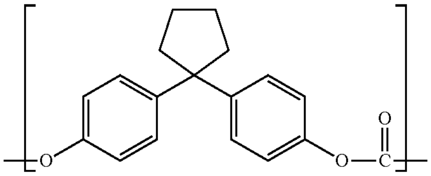

Cb6-2)

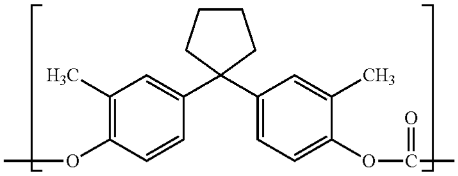

(Cb6-3)

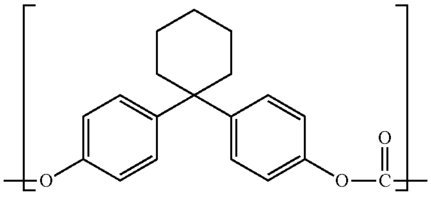

(Cb6-4)

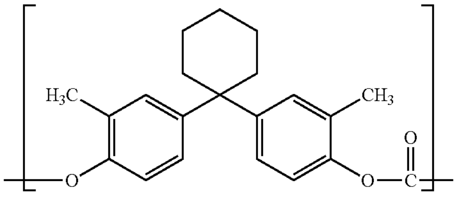

Hereinafter, constitutional units (Cb8-1) to (Cb8-3) are shown as specific examples of the constitutional unit (Cb8). The constitutional unit (Cb8) is not limited thereto.

(Cb8-1)

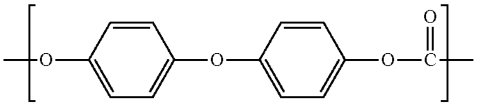

(Cb8-2)

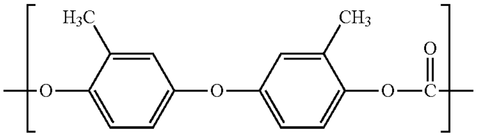

(Cb8-3)

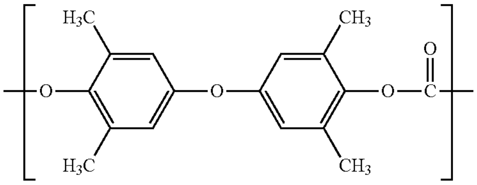

In a case where the polycarbonate resin (1) has a constitutional unit (C), the mass proportion of the constitutional unit (C) in the mass of the polycarbonate resin (1) is, for example, preferably 20% by mass or greater and 70% by mass or less, more preferably 30% by mass or greater and 60% by mass or less, and still more preferably 40% by mass or greater and 50% by mass or less.

The polycarbonate resin (1) may have other constitutional units in addition to the constitutional unit containing biphenyl represented by Formula (1) and the constitutional unit (C). Examples of other constitutional units include a constitutional unit derived from an aliphatic diol (such as ethylene glycol, diethylene glycol, triethylene glycol, propylene glycol, butanediol, hexanediol, or neopentyl glycol) and phosgene, and a constitutional unit derived from an alicyclic diol (such as cyclohexanediol, cyclohexane dimethanol, or hydrogenated bisphenol A) and phosgene. These constitutional units contained in the polycarbonate resin (1) may be used alone or two or more kinds thereof.

It is preferable that the terminals of the polycarbonate resin (1) are, for example, sealed or modified with a terminal-sealing agent or a molecular weight modifier used to produce the resin. As the terminal-sealing agent or the molecular weight modifier, for example, the terminal-sealing agent or the molecular weight modifier described above in the section of the polyester resin (1) is preferable.

The weight-average molecular weight of the polycarbonate resin (1) is, for example, preferably 35,000 or greater and 300,000 or less, more preferably 40,000 or greater and 250,000 or less, and still more preferably 50,000 or greater and 200,000 or less.

The molecular weight of the polycarbonate resin (1) is a molecular weight measured by gel permeation chromatography (GPC) in terms of polystyrene. The measurement according to GPC is performed by a method of the related art using, for example, tetrahydrofuran or chloroform as an eluent.

Examples of a method of producing the polycarbonate resin (1) include known polymerization methods (such as an interfacial polymerization method, a solution polymerization method, and a melt polymerization method). Specific examples of the polymerization reaction include a polymerization reaction in which a diol reacts with a carbonate precursor such as phosgene or carbonic acid diester. The constitutional unit of the polycarbonate resin (1) can be introduced into the polycarbonate resin, for example, by using a diol that provides the constitutional unit in the polymerization.

Aromatic Dicarboxylic Acid Represented by Formula (2)

The charge transport layer or the single layer type photosensitive layer of the photoreceptor according to the present exemplary embodiment contains an aromatic dicarboxylic acid represented by Formula (2). The charge transport layer or the single layer type photosensitive layer may contain one or two or more kinds of aromatic dicarboxylic acids represented by Formula (2).

Formula (2)

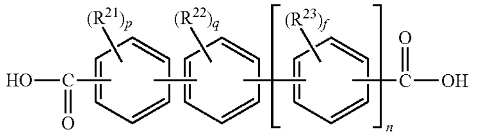

In Formula (2), p represents an integer of 0 or greater and 4 or less, p pieces of $R^{21}$'s each independently represent a methyl group or an ethyl group, q represents an integer of 0 or greater and 4 or less, q pieces of $R^{22}$'s each independently represent a methyl group or an ethyl group, r represents an integer of 0 or greater and 4 or less, r pieces of $R^{23}$'s each independently represent a methyl group or an ethyl group, and n represents 0 or 1.

p represents an integer of 0 or greater and 4 or less, for example, preferably an integer of 0 or greater and 3 or less, more preferably an integer of 0 or greater and 2 or less, still more preferably 0 or 1, and particularly preferably 0.

In a case where p represents an integer of 1 or greater, p pieces of $R^{21}$'s each independently represent a methyl group or an ethyl group and, for example, preferably a methyl group.

q represents an integer of 0 or greater and 4 or less, for example, preferably an integer of 0 or greater and 3 or less, more preferably an integer of 0 or greater and 2 or less, still more preferably 0 or 1, and particularly preferably 0.

In a case where q represents an integer of 1 or greater, q pieces of $R^{22}$'s each independently represent a methyl group or an ethyl group and, for example, preferably a methyl group.

r represents an integer of 0 or greater and 4 or less, for example, preferably an integer of 0 or greater and 3 or less, more preferably an integer of 0 or greater and 2 or less, still more preferably 0 or 1, and particularly preferably 0.

In a case where r represents an integer of 1 or greater, r pieces of $R^{23}$'s each independently represent a methyl group or an ethyl group and, for example, preferably a methyl group.

It is preferable that the aromatic dicarboxylic acid represented by Formula (2) is, for example, an aromatic dicarboxylic acid represented by Formula (21).

Formula (21)

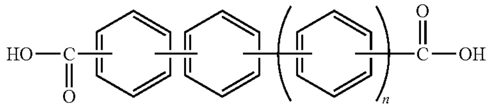

In Formula (21), n represents 0 or 1.

Specific examples of the aromatic dicarboxylic acid represented by Formula (2) include the following aromatic dicarboxylic acids (2-1) to (2-4).

(2-1)

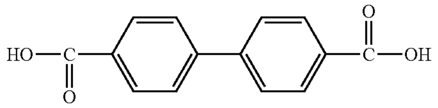

(2-2)

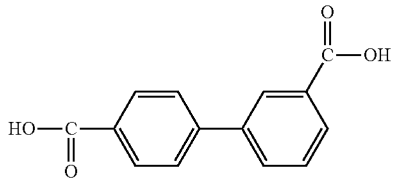

(2-3)

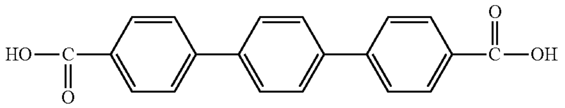

(2-4)

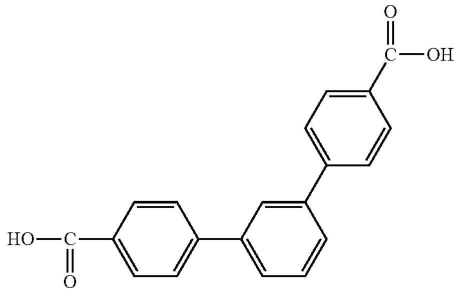

The aromatic dicarboxylic acid (2-1) is 4,4'-biphenyldicarboxylic acid.

The aromatic dicarboxylic acid (2-2) is 3,4'-biphenyldicarboxylic acid.

The aromatic dicarboxylic acid (2-3) is [p-terphenyl]-4,4"-dicarboxylic acid.

The aromatic dicarboxylic acid (2-4) is [m-terphenyl]-4,4"-dicarboxylic acid.

As the aromatic dicarboxylic acid represented by Formula (2), for example, at least one selected from the group consisting of the aromatic dicarboxylic acids (2-1), (2-2) and (2-3) is preferable, at least one of the aromatic dicarboxylic acid (2-1) or (2-2) is more preferable, and the aromatic dicarboxylic acid (2-1) is still more preferable.

Hereinafter, each layer of the photoreceptor will be described in detail.

Conductive Substrate

Examples of the conductive substrate include metal plates containing metals (such as aluminum, copper, zinc, chromium, nickel, molybdenum, vanadium, indium, gold, and platinum) or alloys (such as stainless steel), metal drums, metal belts, and the like. Further, examples of the conductive substrate include paper, a resin film, a belt, and the like obtained by being coated, vapor-deposited or laminated with a conductive compound (such as a conductive polymer or indium oxide), a metal (such as aluminum, palladium, or gold) or an alloy. Here, the term "conductive" denotes that the volume resistivity is less than $1\times10^{13}$ Ωcm.

In a case where the electrophotographic photoreceptor is used in a laser printer, for example, it is preferable that the surface of the conductive substrate is roughened such that a centerline average roughness Ra thereof is 0.04 μm or greater and 0.5 μm or less for the purpose of suppressing interference fringes from occurring in a case of irradiation with laser beams. In a case where incoherent light is used as a light source, roughening of the surface to prevent interference fringes is not particularly necessary, and it is appropriate for longer life because occurrence of defects due to the unevenness of the surface of the conductive substrate is suppressed.

Examples of the roughening method include wet honing performed by suspending an abrasive in water and spraying the suspension to the conductive substrate, centerless grinding performed by pressure-welding the conductive substrate against a rotating grindstone and continuously grinding the conductive substrate, and an anodizing treatment.

Examples of the roughening method also include a method of dispersing conductive or semi-conductive powder in a resin without roughening the surface of the conductive substrate to form a layer on the surface of the conductive substrate, and performing roughening using the particles dispersed in the layer.

The roughening treatment performed by anodization is a treatment of forming an oxide film on the surface of the conductive substrate by carrying out anodization in an electrolytic solution using a conductive substrate made of a metal (for example, aluminum) as an anode. Examples of the electrolytic solution include a sulfuric acid solution and an oxalic acid solution. However, a porous anodized film formed by anodization is chemically active in a natural state, is easily contaminated, and has a large resistance fluctuation depending on the environment. Therefore, for example, it is preferable that a sealing treatment is performed on the porous anodized film so that the fine pores of the oxide film are closed by volume expansion due to a hydration reaction in pressurized steam or boiling water (a metal salt such as nickel may be added thereto) for a change into a more stable a hydrous oxide.

The film thickness of the anodized film is, for example, preferably 0.3 μm or greater and 15 μm or less. In a case where the film thickness is in the above-described range, the barrier properties against injection tend to be exhibited, and an increase in the residual potential due to repeated use tends to be suppressed.

The conductive substrate may be subjected to a treatment with an acidic treatment liquid or a boehmite treatment.

The treatment with an acidic treatment liquid is carried out, for example, as follows. First, an acidic treatment liquid containing phosphoric acid, chromic acid, and hydrofluoric acid is prepared. In the blending ratio of phosphoric acid, chromic acid, and hydrofluoric acid to the acidic treatment liquid, for example, the concentration of the phosphoric acid is 10% by mass or greater and 11% by mass or less, the concentration of the chromic acid is 3% by mass or greater and 5% by mass or less, and the concentration of the hydrofluoric acid is 0.5% by mass or greater and 2% by mass or less, and the concentration of all these acids may be 13.5% by mass or greater and 18% by mass or less. The treatment temperature is, for example, preferably 42° C. or higher and 48° C. or lower. The film thickness of the coating film is, for example, preferably 0.3 μm or greater and 15 μm or less.

The boehmite treatment is carried out, for example, by immersing the conductive substrate in pure water at 90° C. or higher and 100° C. or lower for 5 minutes to 60 minutes or by bringing the conductive substrate into contact with heated steam at 90° C. or higher and 120° C. or lower for 5 minutes to 60 minutes. The film thickness of the coating film is, for example, preferably 0.1 μm or greater and 5 μm or less. This coating film may be further subjected to the anodizing treatment using an electrolytic solution having low film solubility, such as adipic acid, boric acid, a borate, a phosphate, a phthalate, a maleate, a benzoate, a tartrate, or a citrate.

Undercoat Layer

The undercoat layer is, for example, a layer containing inorganic particles and a binder resin.

Examples of the inorganic particles include inorganic particles having a powder resistance (volume resistivity) of $1\times10^2$ Ωcm or greater and $1\times10^{11}$ Ωcm or less.

Among these, as the inorganic particles having the above-described resistance value, for example, metal oxide particles such as tin oxide particles, titanium oxide particles, zinc oxide particles, and zirconium oxide particles may be used, and zinc oxide particles are particularly preferable.

The specific surface area of the inorganic particles measured by the BET method may be, for example, 10 $m^2/g$ or greater.

The volume average particle diameter of the inorganic particles may be, for example, 50 nm or greater and 2,000 nm or less (for example, preferably 60 nm or greater and 1,000 nm or less).

The content of the inorganic particles is, for example, preferably 10% by mass or greater and 80% by mass or less and more preferably 40% by mass or greater and 80% by mass or less with respect to the amount of the binder resin.

The inorganic particles may be subjected to a surface treatment. As the inorganic particles, inorganic particles subjected to different surface treatments or inorganic particles having different particle diameters may be used in the form of a mixture of two or more kinds thereof.

Examples of the surface treatment agent include a silane coupling agent, a titanate-based coupling agent, an aluminum-based coupling agent, and a surfactant. In particular, for example, a silane coupling agent is preferable, and a silane coupling agent containing an amino group is more preferable.

Examples of the silane coupling agent containing an amino group include 3-aminopropyltriethoxysilane, N-2-(aminoethyl)-3-aminopropyltrimethoxysilane, N-2-(aminoethyl)-3-aminopropylmethyldimethoxysilane, and N,N-bis (2-hydroxyethyl)-3-aminopropyltriethoxysilane, but are not limited thereto.

The silane coupling agent may be used in the form of a mixture of two or more kinds thereof. For example, a silane coupling agent containing an amino group and another silane coupling agent may be used in combination. Examples of other silane coupling agents include vinyltrimethoxysilane, 3-methacryloxypropyl-tris(2-methoxyethoxy)silane, 2-(3,4-epoxycyclohexyl)ethyltrimethoxysilane, 3-glycidoxypropyltrimethoxysilane, vinyltriacetoxysilane, 3-mercaptopropyltrimethoxysilane, 3-aminopropyltriethoxysilane, N-2-(aminoethyl)-3-aminopropyltrimethoxysilane, N-2-(aminoethyl)-3-aminopropylmethyldimethoxysilane, N,N-bis(2-hydroxyethyl)-3-aminopropyltriethoxysilane, and 3-chloropropyltrimethoxysilane, but are not limited thereto.

The surface treatment method using a surface treatment agent may be any method as long as the method is a known method, and any of a dry method or a wet method may be used.

The treatment amount of the surface treatment agent is, for example, preferably 0.5% by mass or greater and 10% by mass or less with respect to the amount of the inorganic particles.

Here, the undercoat layer may contain an electron-accepting compound (acceptor compound) together with the inorganic particles, for example, from the viewpoint of enhancing the long-term stability of the electrical properties and the carrier blocking properties.

Examples of the electron-accepting compound include electron-transporting substances, for example, a quinone-based compound such as chloranil or bromanil; a tetracyanoquinodimethane-based compound; a fluorenone compound such as 2,4,7-trinitrofluorenone or 2,4,5,7-tetranitro-9-fluorenone; an oxadiazole-based compound such as 2-(4-biphenyl)-5-(4-t-butylphenyl)-1,3,4-oxadiazole, 2,5-bis(4-naphthyl)-1,3,4-oxadiazole, or 2,5-bis(4-diethylaminophenyl)-1,3,4-oxadiazole; a xanthone-based compound; a thiophene compound; a diphenoquinone compound such as 3,3',5,5'-tetra-t-butyldiphenoquinone; a benzophenone compound; and an anthraquinone compound.

In particular, as the electron-accepting compound, for example, a compound having an anthraquinone structure is preferable. As the compound having an anthraquinone structure, for example, a hydroxyanthraquinone compound, an aminoanthraquinone compound, or an aminohydroxyanthraquinone compound is preferable, and specifically, for example, anthraquinone, alizarin, quinizarin, anthrarufin, or purpurin is preferable.

The electron-accepting compound may be contained in the undercoat layer in a state of being dispersed with inorganic particles or in a state of being attached to the surface of each inorganic particle.

Examples of the method of attaching the electron-accepting compound to the surface of the inorganic particle include a dry method and a wet method.

The dry method is, for example, a method of attaching the electron-accepting compound to the surface of each inorganic particle by adding the electron-accepting compound dropwise to inorganic particles directly or by dissolving the electron-accepting compound in an organic solvent while stirring the inorganic particles with a mixer having a large shearing force and spraying the mixture together with dry air or nitrogen gas. The electron-accepting compound may be added dropwise or sprayed, for example, at a temperature lower than or equal to the boiling point of the solvent. After the dropwise addition or the spraying of the electron-accepting compound, the compound may be further baked at 100° C. or higher. The baking is not particularly limited as long as the temperature and the time are adjusted such that the electrophotographic characteristics can be obtained.

The wet method is, for example, a method of attaching the electron-accepting compound to the surface of each inorganic particle by adding the electron-accepting compound to inorganic particles while dispersing the inorganic particles in a solvent using a stirrer, ultrasonic waves, a sand mill, an attritor, or a ball mill, stirring or dispersing the mixture, and removing the solvent. The solvent removing method is carried out by, for example, filtration or distillation so that the solvent is distilled off. After removal of the solvent, the mixture may be further baked at 100° C. or higher. The baking is not particularly limited as long as the temperature and the time are adjusted such that the electrophotographic characteristics can be obtained. In the wet method, the moisture contained in the inorganic particles may be removed before the electron-accepting compound is added, and examples thereof include a method of removing the moisture while stirring and heating the moisture in a solvent and a method of removing the moisture by azeotropically boiling the moisture with a solvent.

The electron-accepting compound may be attached to the surface before or after the inorganic particles are subjected to a surface treatment with a surface treatment agent or simultaneously with the surface treatment performed on the inorganic particles with a surface treatment agent.

The content of the electron-accepting compound may be, for example, 0.01% by mass or greater and 20% by mass or less and preferably 0.01% by mass or greater and 10% by mass or less with respect to the amount of the inorganic particles.

Examples of the binder resin used for the undercoat layer include known polymer compounds such as an acetal resin (such as polyvinyl butyral), a polyvinyl alcohol resin, a polyvinyl acetal resin, a casein resin, a polyamide resin, a cellulose resin, gelatin, a polyurethane resin, a polyester resin, an unsaturated polyester resin, a methacrylic resin, an acrylic resin, a polyvinyl chloride resin, a polyvinyl acetate resin, a vinyl chloride-vinyl acetate-maleic anhydride resin, a silicone resin, a silicone-alkyd resin, a urea resin, a phenol resin, a phenol-formaldehyde resin, a melamine resin, a urethane resin, an alkyd resin, and an epoxy resin, a zirconium chelate compound, a titanium chelate compound, an aluminum chelate compound, a titanium alkoxide compound, an organic titanium compound, and known materials such as a silane coupling agent.

Examples of the binder resin used for the undercoat layer include a charge-transporting resin containing a charge-transporting group, and a conductive resin (such as polyaniline).

Among these, as the binder resin used for the undercoat layer, for example, a resin insoluble in a coating solvent of the upper layer is preferable, and a resin obtained by reaction between a curing agent and at least one resin selected from the group consisting of a thermosetting resin such as a urea resin, a phenol resin, a phenol-formaldehyde resin, a melamine resin, a urethane resin, an unsaturated polyester resin, an alkyd resin, or an epoxy resin; a polyamide resin, a polyester resin, a polyether resin, a methacrylic resin, an acrylic resin, a polyvinyl alcohol resin, and a polyvinyl acetal resin is particularly preferable.

In a case where these binder resins are used in combination of two or more kinds thereof, the mixing ratio thereof is set as necessary.

The undercoat layer may contain various additives for improving the electrical properties, the environmental stability, and the image quality.

Examples of the additives include known materials, for example, an electron-transporting pigment such as a polycyclic condensed pigment or an azo-based pigment, a zirconium chelate compound, a titanium chelate compound, an aluminum chelate compound, a titanium alkoxide compound, an organic titanium compound, and a silane coupling agent. The silane coupling agent is used for a surface treatment of the inorganic particles as described above, but may be further added to the undercoat layer as an additive.

Examples of the silane coupling agent serving as an additive include vinyltrimethoxysilane, 3-methacryloxypropyl-tris(2-methoxyethoxy)silane, 2-(3,4-epoxycyclohexyl)ethyltrimethoxysilane, 3-glycidoxypropyltrimethoxysilane, vinyltriacetoxysilane, 3-mercaptopropyltrimethoxysilane, 3-aminopropyltriethoxysilane, N-2-(aminoethyl)-3-aminopropyltrimethoxysilane, N-2-(aminoethyl)-3-aminopropylmethyldimethoxysilane, N,N-bis(2-hydroxyethyl)-3-aminopropyltriethoxysilane, and 3-chloropropyltrimethoxysilane.

Examples of the zirconium chelate compound include zirconium butoxide, ethyl zirconium acetoacetate, zirconium triethanolamine, acetylacetonate zirconium butoxide, ethyl zirconium butoxide acetoacetate, zirconium acetate, zirconium oxalate, zirconium lactate, zirconium phosphonate, zirconium octanoate, zirconium naphthenate, zirconium laurate, zirconium stearate, zirconium isostearate, zirconium butoxide methacrylate, stearate zirconium butoxide, and isostearate zirconium butoxide.

Examples of the titanium chelate compound include tetraisopropyl titanate, tetranormal butyl titanate, a butyl titanate dimer, tetra(2-ethylhexyl) titanate, titanium acetylacetonate, polytitanium acetylacetonate, titanium octylene glycolate, titanium lactate ammonium salt, titanium lactate, titanium lactate ethyl ester, titanium triethanol aminate, and polyhydroxy titanium stearate.

Examples of the aluminum chelate compound include aluminum isopropylate, monobutoxyaluminum diisopropylate, aluminum butyrate, diethylacetoacetate aluminum diisopropylate, and aluminum tris(ethylacetoacetate).

These additives may be used alone or in the form of a mixture or a polycondensate of a plurality of compounds.

The undercoat layer may have, for example, a Vickers hardness of 35 or greater.

The surface roughness (ten-point average roughness) of the undercoat layer may be adjusted, for example, to ½ from 1/(4n) (n represents a refractive index of an upper layer) of a laser wavelength λ for exposure to be used to suppress moire fringes.

Resin particles or the like may be added to the undercoat layer to adjust the surface roughness. Examples of the resin particles include silicone resin particles and crosslinked polymethyl methacrylate resin particles. Further, the surface of the undercoat layer may be polished to adjust the surface roughness. Examples of the polishing method include buff polishing, a sandblast treatment, wet honing, and a grinding treatment.

The formation of the undercoat layer is not particularly limited, and a known forming method is used. For example, a coating film of a coating solution for forming an undercoat layer in which the above-described components are added to a solvent is formed, and the coating film is dried and, as necessary, heated.

Examples of the solvent for preparing the coating solution for forming an undercoat layer include known organic solvents such as an alcohol-based solvent, an aromatic hydrocarbon solvent, a halogenated hydrocarbon solvent, a ketone-based solvent, a ketone alcohol-based solvent, an ether-based solvent, and an ester-based solvent.

Specific examples of these solvents include typical organic solvents such as methanol, ethanol, n-propanol, iso-propanol, n-butanol, benzyl alcohol, methyl cellosolve, ethyl cellosolve, acetone, methyl ethyl ketone, cyclohexanone, methyl acetate, ethyl acetate, n-butyl acetate, dioxane, tetrahydrofuran, methylene chloride, chloroform, chlorobenzene, and toluene.

Examples of the method of dispersing the inorganic particles in a case of preparing the coating solution for forming an undercoat layer include known methods such as a roll mill, a ball mill, a vibration ball mill, an attritor, a sand mill, a colloid mill, and a paint shaker.

Examples of the method of coating the conductive substrate with the coating solution for forming an undercoat layer include typical coating methods such as a blade coating method, a wire bar coating method, a spray coating method, a dip coating method, a bead coating method, an air knife coating method, and a curtain coating method.

The average thickness of the undercoat layer is, for example, preferably 10 μm or greater and 40 μm or less, more preferably 15 μm or greater and 35 μm or less, and still more preferably 20 μm or greater and 30 μm or less.

Interlayer

An interlayer may be further provided between the undercoat layer and the photosensitive layer.

The interlayer is, for example, a layer containing a resin. Examples of the resin used for the interlayer include a polymer compound, for example, an acetal resin (such as polyvinyl butyral), a polyvinyl alcohol resin, a polyvinyl acetal resin, a casein resin, a polyamide resin, a cellulose resin, gelatin, a polyurethane resin, a polyester resin, a methacrylic resin, an acrylic resin, a polyvinyl chloride resin, a polyvinyl acetate resin, a vinyl chloride-vinyl acetate-maleic anhydride resin, a silicone resin, a silicone-alkyd resin, a phenol-formaldehyde resin, or a melamine resin.

The interlayer may be a layer containing an organometallic compound. Examples of the organometallic compound used for the interlayer include an organometallic compound containing metal atoms such as zirconium, titanium, aluminum, manganese, and silicon.

The compounds used for the interlayer may be used alone or in the form of a mixture or a polycondensate of a plurality of compounds.

Among these, it is preferable that the interlayer is, for example, a layer containing an organometallic compound having a zirconium atom or a silicon atom.

The formation of the interlayer is not particularly limited, and a known forming method is used. For example, a coating film of a coating solution for forming an interlayer in which the above-described components are added to a solvent is formed, and the coating film is dried and, as necessary, heated.

Examples of the coating method of forming the interlayer include typical coating methods such as a dip coating method, a push-up coating method, a wire bar coating method, a spray coating method, a blade coating method, an air knife coating method, and a curtain coating method.

The thickness of the interlayer is set to be, for example, preferably in a range of 0.1 μm or greater and 3 μm or less. The interlayer may be used as the undercoat layer.

Charge Generation Layer

The charge generation layer is, for example, a layer containing a charge generation material and a binder resin. Further, the charge generation layer may be a deposition layer of the charge generation material. The deposition layer of the charge generation material is, for example, appropriate in a case where an incoherent light source such as a light emitting diode (LED) or an organic electro-luminescence (EL) image array is used.

Examples of the charge generation material include an azo pigment such as bisazo or trisazo; a fused ring aromatic pigment such as dibromoanthanthrone; a perylene pigment; a pyrrolopyrrole pigment; a phthalocyanine pigment; zinc oxide; and trigonal selenium.

Among these, for example, a metal phthalocyanine pigment or a metal-free phthalocyanine pigment is preferably used as the charge generation material in order to deal with laser exposure in a near infrared region. Specifically, for example, hydroxygallium phthalocyanine, chlorogallium phthalocyanine, dichloro-tin phthalocyanine, and titanyl phthalocyanine are more preferable.

On the other hand, for example, a fused ring aromatic pigment such as dibromoanthanthrone, a thioindigo-based pigment, a porphyrazine compound, zinc oxide, trigonal selenium, or a bisazo pigment is preferable as the charge generation material in order to deal with laser exposure in a near ultraviolet region.

The above-described charge generation material may also be used even in a case where an incoherent light source such as an LED or an organic EL image array having a center wavelength of light emission at 450 nm or greater and 780 nm or less is used, but from the viewpoint of the resolution, the field intensity in the photosensitive layer is increased, and a decrease in charge due to injection of a charge from the substrate, that is, image defects referred to as so-called black spots are likely to occur in a case where a thin film having a thickness of 20 μm or less is used as the photosensitive layer. The above-described tendency is evident in a case where a p-type semiconductor such as trigonal selenium or a phthalocyanine pigment is used as the charge generation material that is likely to generate a dark current.

On the other hand, in a case where an n-type semiconductor such as a fused ring aromatic pigment, a perylene pigment, or an azo pigment is used as the charge generation material, a dark current is unlikely to be generated, and image defects referred to as black spots can be suppressed even in a case where a thin film is used as the photosensitive layer. The n-type is determined by the polarity of the flowing photocurrent using a typically used time-of-flight method, and a material in which electrons more easily flow as carriers than positive holes is determined as the n-type.

The binder resin used for the charge generation layer is selected from a wide range of insulating resins, and the binder resin may be selected from organic photoconductive polymers such as poly-N-vinylcarbazole, polyvinylanthracene, polyvinylpyrene, and polysilane.

Examples of the binder resin include a polyvinyl butyral resin, a polyarylate resin (a polycondensate of bisphenols and aromatic divalent carboxylic acid), a polycarbonate resin, a polyester resin, a phenoxy resin, a vinyl chloride-vinyl acetate copolymer, a polyamide resin, an acrylic resin, a polyacrylamide resin, a polyvinylpyridine resin, a cellulose resin, a urethane resin, an epoxy resin, casein, a polyvinyl alcohol resin, and a polyvinylpyrrolidone resin. Here, the term "insulating" denotes that the volume resistivity is $1\times10^{13}$ Ωcm or greater.

These binder resins may be used alone or in the form of a mixture of two or more kinds thereof.

The blending ratio between the charge generation material and the binder resin is, for example, preferably in a range of 10:1 to 1:10 in terms of the mass ratio.

The charge generation layer may also contain other known additives.

The formation of the charge generation layer is not particularly limited, and a known forming method is used. For example, a coating film of a coating solution for forming a charge generation layer in which the above-described components are added to a solvent is formed, and the coating film is dried and, as necessary, heated. The charge generation layer may be formed by vapor deposition of the charge generation material. The formation of the charge generation layer by vapor deposition is, for example, particularly appropriate in a case where a fused ring aromatic pigment or a perylene pigment is used as the charge generation material.

Examples of the solvent for preparing the coating solution for forming a charge generation layer include methanol, ethanol, n-propanol, n-butanol, benzyl alcohol, methyl cellosolve, ethyl cellosolve, acetone, methyl ethyl ketone, cyclohexanone, methyl acetate, n-butyl acetate, dioxane, tetrahydrofuran, methylene chloride, chloroform, chlorobenzene, and toluene. These solvents are used alone or in the form of a mixture of two or more kinds thereof.

As a method of dispersing particles (for example, the charge generation material) in the coating solution for forming a charge generation layer, for example, a media disperser such as a ball mill, a vibration ball mill, an attritor, a sand mill, or a horizontal sand mill, or a medialess disperser such as a stirrer, an ultrasonic disperser, a roll mill, or a high-pressure homogenizer is used. Examples of the high-pressure homogenizer include a collision type homogenizer in which a dispersion liquid is dispersed by a liquid-liquid collision or a liquid-wall collision in a high-pressure state, and a penetration type homogenizer in which a dispersion liquid is dispersed by penetrating the liquid through a fine flow path in a high-pressure state.

During the dispersion, it is effective to set the average particle diameter of the charge generation material in the coating solution for forming a charge generation layer to 0.5 μm or less, for example, preferably 0.3 μm or less, and more preferably 0.15 μm or less.

Examples of the method of coating the undercoat layer (or the interlayer) with the coating solution for forming a charge generation layer include typical methods such as a blade coating method, a wire bar coating method, a spray coating method, a dip coating method, a bead coating method, an air knife coating method, and a curtain coating method.

The thickness of the charge generation layer is set to, for example, preferably 0.1 μm or greater and 5.0 μm or less and more preferably 0.2 μm or greater and 2.0 μm or less.

Charge Transport Layer

The charge transport layer is, for example, a layer containing a charge transport material and a binder resin. The charge transport layer may be a layer containing a polymer charge transport material.

Examples of the charge transport material include a quinone-based compound such as p-benzoquinone, chloranil, bromanil, or anthraquinone; a tetracyanoquinodimethane-based compound; a fluorenone compound such as 2,4,7-trinitrofluorenone; a xanthone-based compound; a benzophenone-based compound; a cyanovinyl-based compound; and an electron-transporting compound such as an ethylene-based compound. Examples of the charge transport material include a positive hole-transporting compound such as a triarylamine-based compound, a benzidine-based compound, an arylalkane-based compound, an aryl-substituted ethylene-based compound, a stilbene-based compound, an anthracene-based compound, or a hydrazone-based compound. These charge transport materials may be used alone or in combination of two or more kinds thereof, but are not limited thereto.

Examples of the polymer charge transport material include known chemical substances having charge transport properties, such as poly-N-vinylcarbazole and polysilane. For example, a polyester-based polymer charge transport material is preferable. The polymer charge transport material may be used alone or in combination with a binder resin.

Examples of the charge transport material or the polymer charge transport material include a polycyclic aromatic compound, an aromatic nitro compound, an aromatic amine compound, a heterocyclic compound, a hydrazone compound, a styryl compound, an enamine compound, a benzidine compound, a triarylamine compound (particularly, a triphenylamine compound), a diamine compound, an oxadiazole compound, a carbazole compound, an organic polysilane compound, a pyrazoline compound, an indole compound, an oxazole compound, an isoxazole compound, a thiazole compound, a thiadiazole compound, an imidazole compound, a pyrazole compound, a triazole compound, a cyano compound, a benzofuran compound, an aniline compound, a butadiene compound, and a resin containing a group derived from any of these substances. Specific examples thereof include compounds described in paragraphs 0078 to 0080 of JP2021-117377A, paragraphs 0046 to 0048 of JP2019-035900A, paragraphs 0052 and 0053 of JP2019-012141A, paragraphs 0122 to 0134 of JP2021-071565A, paragraphs 0101 to 0110 of JP2021-015223A, paragraph 0116 of JP2013-097300A, paragraphs 0309 to 0316 of WO2019/070003A, paragraphs 0103 to 0107 of JP2018-159087A, and paragraphs 0102 to 0113 of JP2021-148818A.

From the viewpoint of the charge mobility, it is preferable that the charge transport material contains, for example, at least one selected from the group consisting of a chemical substance (D1) represented by Formula (D1), a chemical substance (D2) represented by Formula (D2), a chemical substance (D3) represented by Formula (D3), and a chemical substance (D4) represented by Formula (D4).

Formula (D1)

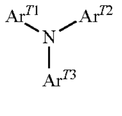

In Formula (D1), $Ar^{T1}$, $Ar^{T2}$, and $Ar^{T3}$ each independently represent an aryl group, $—C_6H_4—C(R^{T4})═C(R^{T5})(R^{T6})$ or $—C_6H_4—CH═CH—CH═C(R^{T7})(R^{T8})$. $R^{T4}$, $R^{T5}$, $R^{T6}$, $R^{T7}$, and $R^{T8}$ each independently represent a hydrogen atom, an alkyl group, or an aryl group. In a case where $R^{T5}$ and $R^{T6}$ represent an aryl group, the aryl groups may be linked via a divalent group of $—C(R^{51})(R^{52})—$ and/or $—C(R^{61})═C(R^{62})—$. $R^{51}$, $R^{52}$, $R^{61}$, and $R^{62}$ each independently represent a hydrogen atom or an alkyl group having 1 or more and 3 or less carbon atoms.

The group in Formula (D1) may be substituted with a halogen atom, an alkyl group having 1 or more and 5 or less carbon atoms, an alkoxy group having 1 or more and 5 or less carbon atoms, or a substituted amino group substituted with an alkyl group having 1 or more and 3 or less carbon atoms.

From the viewpoint of the charge mobility, as the chemical substance (D1), for example, a chemical substance containing at least one of an aryl group or $—C_6H_4—CH═CH—CH═C(R^{T7})(R^{T8})$ is preferable, and a chemical substance (D'1) represented by Formula (D'1) is more preferable.

Formula (D'1)

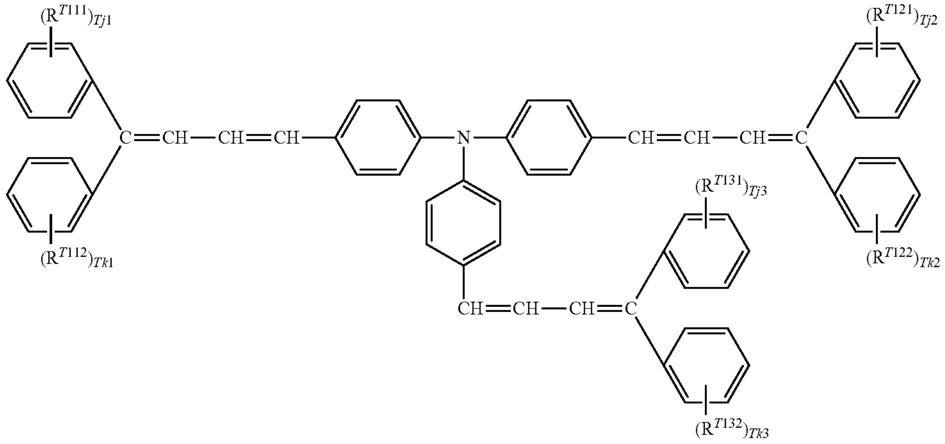

In Formula (D' 1), $R^{T111}$, $R^{T112}$, $R^{T121}$, $R^{T122}$, $R^{T131}$, and $R^{T132}$ each independently represent a hydrogen atom, a halogen atom, an alkyl group (for example, preferably an alkyl group having 1 or more and 3 or less carbon atoms), an alkoxy group (for example, preferably an alkoxy group having 1 or more and 3 or less carbon atoms), a phenyl group, or a phenoxy group. Tj1, Tj2, Tj3, Tk1, Tk2, and Tk3 each independently represent 0, 1, or 2.

Formula (D2)

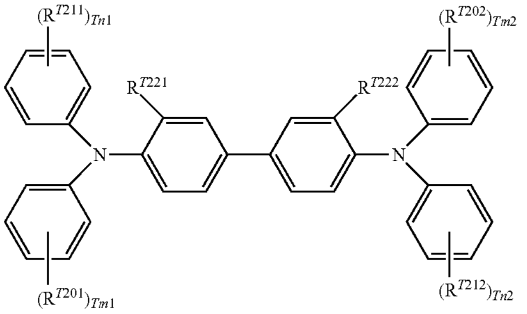

In Formula (D2), $R^{T201}$, $R^{T202}$, $R^{T211}$, and $R^{T212}$ each independently represent a halogen atom, an alkyl group having 1 or more and 5 or less carbon atoms, an alkoxy group having 1 or more and 5 or less carbon atoms, an amino group substituted with an alkyl group having 1 or 2 carbon atoms, an aryl group, $—C(R^{T21})═C(R^{T22})(R^{T23})$, or $—CH═CH—CH═C(R^{T24})(R^{T25})$. $R^{T21}$, $R^{T22}$, $R^{T23}$, $R^{T24}$, and $R^{T25}$ each independently represent a hydrogen atom, an alkyl group, or an aryl group. $R^{T221}$ and $R^{T222}$ each independently represent a hydrogen atom, a halogen atom, an alkyl group having 1 or more and 5 or less carbon atoms, or an alkoxy group having 1 or more and 5 or less carbon atoms. Tm1, Tm2, Tn1, and Tn2 each independently represent 0, 1, or 2.

The group in Formula (D2) may be substituted with a halogen atom, an alkyl group having 1 or more and 5 or less carbon atoms, an alkoxy group having 1 or more and 5 or less carbon atoms, or a substituted amino group substituted with an alkyl group having 1 or more and 3 or less carbon atoms.

From the viewpoint of the charge mobility, as the chemical substance (D2), for example, a chemical substance containing at least one of an alkyl group, an aryl group, or $—CH{=}CH—CH{=}C(R^{T24})(R^{T25})$ is preferable, and a chemical substance containing two of an alkyl group, an aryl group, or $—CH{=}CH—CH{=}C(R^{T24})(R^{T25})$ is more preferable.

Formula (D3)

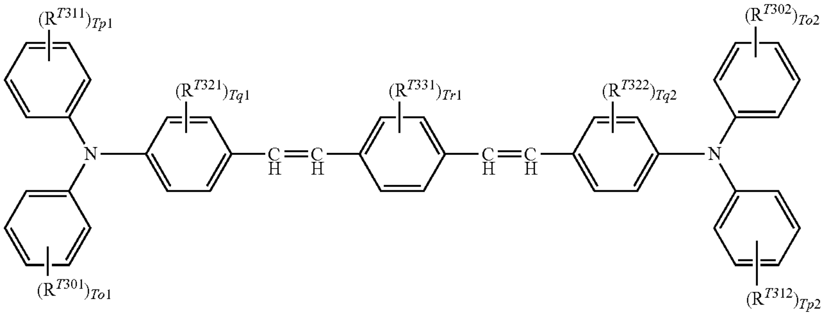

In Formula (D3), $R^{T301}$, $R^{T302}$, $R^{T311}$, and $R^{T312}$ each independently represent a halogen atom, an alkyl group having 1 or more and 5 or less carbon atoms, an alkoxy group having 1 or more and 5 or less carbon atoms, an amino group substituted with an alkyl group having 1 or 2 carbon atoms, an aryl group, $—C(R^{T31}){=}C(R^{T32})(R^{T33})$, or $—CH{=}CH—CH{=}C(R^{T34})(R^{T35})$. $R^{T31}$, $R^{T32}$, $R^{T33}$, $R^{T34}$, and $R^{T35}$ each independently represent a hydrogen atom, an alkyl group, or an aryl group. $R^{T321}$, $R^{T322}$, and $R^{T331}$ each independently represent a hydrogen atom, a halogen atom, an alkyl group having 1 or more and 5 or less carbon atoms, or an alkoxy group having 1 or more and 5 or less carbon atoms. To1, To2, Tp1, Tp2, Tq1, Tq2, and Tr1 each independently represent 0, 1, or 2.

The group in Formula (D3) may be substituted with a halogen atom, an alkyl group having 1 or more and 5 or less carbon atoms, an alkoxy group having 1 or more and 5 or less carbon atoms, or a substituted amino group substituted with an alkyl group having 1 or more and 3 or less carbon atoms.

Formula (D4)

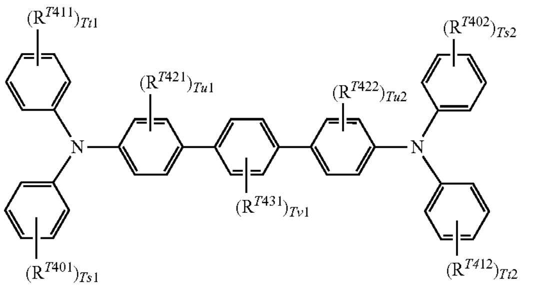

In Formula (D4), $R^{T401}$, $R^{T402}$, $R^{T411}$ and $R^{T412}$ each independently represent a halogen atom, an alkyl group having 1 or more and 5 or less carbon atoms, an alkoxy group having 1 or more and 5 or less carbon atoms, an amino group substituted with an alkyl group having 1 or 2 carbon atoms, an aryl group, $—C(R^{T41}){=}C(R^{T42})(R^{T43})$, or $—CH{=}CH—CH{=}C(R^{T44})(R^{T45})$. $R^{T41}$, $R^{T42}$, $R^{T43}$, $R^{T44}$, and $R^{T45}$ each independently represent a hydrogen atom, an alkyl group, or an aryl group. $R^{T421}$, $R^{T422}$, and $R^{T431}$ each independently represent a hydrogen atom, a halogen atom, an alkyl group having 1 or more and 5 or less carbon atoms, or an alkoxy group having 1 or more and 5 or less carbon atoms. Ts1, Ts2, Tt1, Tt2, Tu1, Tu2, and Tv1 each independently represent 0, 1, or 2.

The group in Formula (D4) may be substituted with a halogen atom, an alkyl group having 1 or more and 5 or less carbon atoms, an alkoxy group having 1 or more and 5 or less carbon atoms, or a substituted amino group substituted with an alkyl group having 1 or more and 3 or less carbon atoms.

The content of the charge transport material contained in the charge transport layer is, for example, preferably 20% by mass or greater and 70% by mass or less with respect to the total mass of the charge transport layer.

The charge transport layer contains at least the polyester resin (1) and/or the polycarbonate resin (1) as the binder resin.

In a case where the charge transport layer contains the polyester resin (1) as the binder resin, the proportion of the polyester resin (1) in the total amount of the binder resin contained in the charge transport layer is, for example, preferably 60% by mass or greater, more preferably 70% by mass or greater, still more preferably 80% by mass or greater, and particularly preferably 90% by mass or greater. In a case where the polyester resin (1) is preferable as other resins used in combination.

In a case where the charge transport layer contains the polyester resin (1) and the polycarbonate resin (1) as the binder resin, the mass ratio of the polyester resin (1) to the polycarbonate resin (1) (polyester resin (1):polycarbonate resin (1)) is, for example, preferably 95:5 to 40:60.

The charge transport layer may contain other binder resins in addition to the polyester resin (1) and the polycarbonate resin (1). Examples of other binder resins include a polyester resin other than the polyester resin (1), a polycarbonate resin other than the polycarbonate resin (1), a methacrylic resin, an acrylic resin, a polyvinyl chloride resin, a polyvinylidene chloride resin, a polystyrene resin, a polyvinyl acetate resin, a styrene-butadiene copolymer, a vinylidene chloride-acrylonitrile copolymer, a vinyl chloride-vinyl acetate copolymer, a vinyl chloride-vinyl acetate-maleic anhydride copolymer, a silicone resin, a silicone alkyd resin, a phenol-formaldehyde resin, a styrene-alkyd resin, poly-N-vinylcarbazole, and polysilane. These binder resins may be used alone or in combination of two or more kinds thereof.

The charge transport layer may also contain other known additives. Examples of the additives include an antioxidant, a leveling agent, an antifoaming agent, a filler, and a viscosity adjuster.

The formation of the charge transport layer is not particularly limited, and a known forming method is used. For example, a coating film of a coating solution for forming a charge transport layer in which the above-described components are added to a solvent is formed, and the coating film is dried and, as necessary, heated.

Examples of the solvent for preparing the coating solution for forming a charge transport layer include typical organic solvents, for example, aromatic hydrocarbons such as benzene, toluene, xylene, and chlorobenzene; ketones such as acetone and 2-butanone; halogenated aliphatic hydrocarbons such as methylene chloride, chloroform, and ethylene chloride; and cyclic or linear ethers such as tetrahydrofuran and ethyl ether. These solvents are used alone or in the form of a mixture of two or more kinds thereof.

Examples of the coating method of coating the charge generation layer with the coating solution for forming a charge transport layer include typical methods such as a blade coating method, a wire bar coating method, a spray coating method, a dip coating method, a bead coating method, an air knife coating method, and a curtain coating method.

The average thickness of the charge transport layer is, for example, preferably 25 μm or greater and 50 μm or less, more preferably 28 μm or greater and 45 μm or less, and still more preferably 30 μm or greater and 40 μm or less.

Single Layer Type Photosensitive Layer

The single layer type photosensitive layer (charge generation/charge transport layer) is a layer containing a charge generation material, a charge transport material, a binder resin, and as necessary, other additives. These materials are the same as the materials described in the sections of the charge generation layer and the charge transport layer.

The single layer type photosensitive layer contains at least the polyester resin (1) and/or the polycarbonate resin (1) as the binder resin.

In a case where the single layer type photosensitive layer contains the polyester resin (1) as the binder resin, the proportion of the polyester resin (1) in the total amount of the binder resin contained in the single layer type photosensitive layer is, for example, preferably 60% by mass or greater, more preferably 70% by mass or greater, still more preferably 80% by mass or greater, and particularly preferably 90% by mass or greater. In a case where the polyester resin (1) is used in combination with other resins, for example, a polycarbonate resin (1) is preferable as other resins used in combination.

In a case where the single layer type photosensitive layer contains the polyester resin (1) and the polycarbonate resin (1) as the binder resin, the mass ratio of the polyester resin (1) to the polycarbonate resin (1) (polyester resin (1): polycarbonate resin (1)) is, for example, preferably 95:5 to 40:60.

The content of the charge generation material in the single layer type photosensitive layer may be, for example, 0.1% by mass or greater and 10% by mass or less and preferably 0.8% by mass or greater and 5% by mass or less with respect to the total solid content.

The content of the charge transport material contained in the single layer type photosensitive layer may be, for example, 40% by mass or greater and 60% by mass or less with respect to the total solid content.

The method of forming the single layer type photosensitive layer is the same as the method of forming the charge generation layer or the charge transport layer.

The average thickness of the single layer type photosensitive layer is, for example, preferably 25 μm or greater and 50 μm or less, more preferably 28 μm or greater and 45 μm or less, and still more preferably 30 μm or greater and 40 μm or less.

Protective Layer

A protective layer is provided on the photosensitive layer as necessary. The protective layer is provided, for example, for the purpose of preventing a chemical change in the photosensitive layer during charging and further improving the mechanical strength of the photosensitive layer.

Therefore, for example, a layer formed of a cured film (crosslinked film) may be applied to the protective layer. Examples of these layers include the layers described in the items 1) and 2) below.

1) A layer formed of a cured film of a composition containing a reactive group-containing charge transport material having a reactive group and a charge-transporting skeleton in an identical molecule (that is, a layer containing a polymer or a crosslinked body of the reactive group-containing charge transport material)
2) A layer formed of a cured film of a composition containing a non-reactive charge transport material and a reactive group-containing non-charge transport material containing a reactive group without having a charge-transporting skeleton (that is, a layer containing the non-reactive charge transport material and a polymer or crosslinked body of the reactive group-containing non-charge transport material)

Examples of the reactive group of the reactive group-containing charge transport material include known reactive groups such as a chain polymerizable group, an epoxy group, —OH, —OR [here, R represents an alkyl group], $—NH_2$, —SH, —COOH, and $—SiR^{Q1}_{3-Qn}(OR^{Q2})_{Qn}$ [here, $R^{Q1}$ represents a hydrogen atom, an alkyl group, or a substituted or unsubstituted aryl group, $R^{Q2}$ represents a hydrogen atom, an alkyl group, or a trialkylsilyl group, and Qn represents an integer of 1 to 3].

The chain polymerizable group is not particularly limited as long as the group is a functional group capable of radical polymerization and is, for example, a functional group containing a group having at least a carbon double bond. Specific examples thereof include a vinyl group, a vinyl ether group, a vinyl thioether group, a phenyl vinyl group, a vinyl phenyl group, an acryloyl group, a methacryloyl group, and a group containing at least one selected from derivatives thereof. Among these, from the viewpoint that the reactivity is excellent, for example, a vinyl group, a phenylvinyl group, a vinylphenyl group, an acryloyl group, a methacryloyl group, and a group containing at least one selected from derivatives thereof are preferable as the chain polymerizable group.

The charge-transporting skeleton of the reactive group-containing charge transport material is not particularly limited as long as the skeleton is a known structure in the electrophotographic photoreceptor, and examples thereof include a structure conjugated with a nitrogen atom, which is a skeleton derived from a nitrogen-containing positive hole-transporting compound such as a triarylamine-based compound, a benzidine-based compound, or a hydrazone-based compound. Among these, for example, a triarylamine skeleton is preferable.

The reactive group-containing charge transport material having the reactive group and the charge-transporting skeleton, the non-reactive charge transport material, and the reactive group-containing non-charge transport material may be selected from known materials.

The protective layer may also contain other known additives.

The formation of the protective layer is not particularly limited, and a known forming method is used. For example, a coating film of a coating solution for forming a protective layer in which the above-described components are added to a solvent is formed, and the coating film is dried and, as necessary, subjected to a curing treatment such as heating.

Examples of the solvent for preparing the coating solution for forming a protective layer include an aromatic solvent such as toluene or xylene; a ketone-based solvent such as methyl ethyl ketone, methyl isobutyl ketone, or cyclohexanone; an ester-based solvent such as ethyl acetate or butyl acetate; an ether-based solvent such as tetrahydrofuran or dioxane; a cellosolve-based solvent such as ethylene glycol monomethyl ether; and an alcohol-based solvent such as isopropyl alcohol or butanol. These solvents are used alone or in the form of a mixture of two or more kinds thereof.

The coating solution for forming a protective layer may be a solvent-less coating solution.

Examples of the method of coating the photosensitive layer (such as the charge transport layer) with the coating solution for forming a protective layer include typical coating methods such as a dip coating method, a push-up coating method, a wire bar coating method, a spray coating method, a blade coating method, an air knife coating method, and a curtain coating method.

The thickness of the protective layer is set to, for example, preferably 1 μm or greater and 20 μm or less and more preferably 2 μm or greater and 10 μm or less.

Image Forming Apparatus and Process Cartridge

An image forming apparatus according to the present exemplary embodiment includes the electrophotographic photoreceptor, a charging device that charges a surface of the electrophotographic photoreceptor, an electrostatic latent image forming device that forms an electrostatic latent image on the charged surface of the electrophotographic photoreceptor, a developing device that develops the electrostatic latent image formed on the surface of the electrophotographic photoreceptor with a developer containing a toner to form a toner image, and a transfer device that transfers the toner image to a surface of a recording medium. Further, the electrophotographic photoreceptor according to the present exemplary embodiment is employed as the electrophotographic photoreceptor.

As the image forming apparatus according to the present exemplary embodiment, a known image forming apparatus such as an apparatus including a fixing device that fixes the toner image transferred to the surface of a recording medium; a direct transfer type apparatus that transfers the toner image formed on the surface of the electrophotographic photoreceptor directly to the recording medium; an intermediate transfer type apparatus that primarily transfers the toner image formed on the surface of the electrophotographic photoreceptor to the surface of the intermediate transfer member and secondarily transfers the toner image transferred to the surface of the intermediate transfer member to the surface of the recording medium; an apparatus including a cleaning device that cleans the surface of the electrophotographic photoreceptor after the transfer of the toner image and before the charging; an apparatus including a destaticizing device that destaticizes the surface of the electrophotographic photoreceptor by irradiating the surface with destaticizing light after the transfer of the toner image and before the charging; or an apparatus including an electrophotographic photoreceptor heating member for increasing the temperature of the electrophotographic photoreceptor and decreasing the relative temperature is employed.

In a case of the intermediate transfer type apparatus, the transfer device is, for example, configured to include an intermediate transfer member having a surface onto which the toner image is transferred, a primary transfer device primarily transferring the toner image formed on the surface of the electrophotographic photoreceptor to the surface of the intermediate transfer member, and a secondary transfer device secondarily transferring the toner image transferred to the surface of the intermediate transfer member to the surface of the recording medium.

The image forming apparatus according to the present exemplary embodiment may be any of a dry development type image forming apparatus or a wet development type (development type using a liquid developer) image forming apparatus.

In the image forming apparatus according to the present exemplary embodiment, for example, the portion including the electrophotographic photoreceptor may have a cartridge structure (process cartridge) that is attachable to and detachable from the image forming apparatus. As the process cartridge, for example, a process cartridge including the electrophotographic photoreceptor according to the present exemplary embodiment is preferably used. The process cartridge may include, for example, at least one selected from the group consisting of a charging device, an electrostatic latent image forming device, a developing device, and a transfer device in addition to the electrophotographic photoreceptor.

Hereinafter, an example of the image forming apparatus according to the present exemplary embodiment will be described, but the present exemplary embodiment is not limited thereto. Further, main parts shown in the figures will be described, but description of other parts will not be provided.

Figure 3:
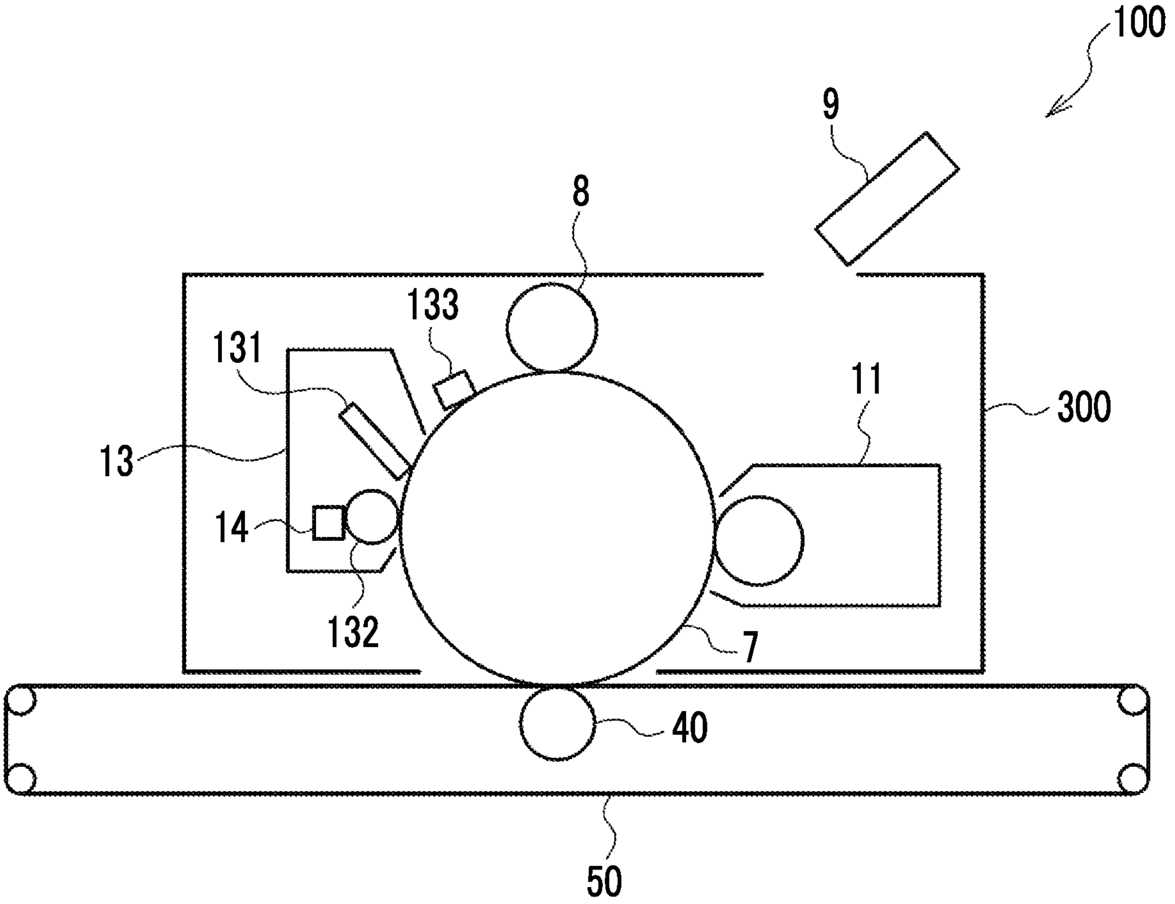
FIG. 3 is a schematic configuration view showing an example of an image forming apparatus according to the present exemplary embodiment.

FIG. 3 is a schematic configuration view showing an example of an image forming apparatus according to the present exemplary embodiment.

As shown in FIG. 3, an image forming apparatus 100 according to the present exemplary embodiment includes a process cartridge 300 including an electrophotographic photoreceptor 7, an exposure device 9 (an example of an electrostatic latent image forming device), a transfer device 40 (primary transfer device), and an intermediate transfer member 50. In the image forming apparatus 100, the exposure device 9 is disposed at a position that can be exposed to the electrophotographic photoreceptor 7 from an opening portion of the process cartridge 300, the transfer device 40 is disposed at a position that faces the electrophotographic photoreceptor 7 via the intermediate transfer member 50, and the intermediate transfer member 50 is disposed such that a part of the intermediate transfer member 50 is in contact with the electrophotographic photoreceptor 7. Although not shown, the image forming apparatus also includes a secondary transfer device that transfers the toner image transferred to the intermediate transfer member 50 to a recording medium (for example, paper). The intermediate transfer member 50, the transfer device 40 (primary transfer device), and the secondary transfer device (not shown) correspond to an example of the transfer device.

The process cartridge 300 in FIG. 3 integrally supports the electrophotographic photoreceptor 7, a charging device 8 (an example of the charging device), a developing device 11 (an example of the developing device), and a cleaning device 13 (an example of the cleaning device) in a housing. The cleaning device 13 has a cleaning blade (an example of the cleaning member) 131, and the cleaning blade 131 is disposed to come into contact with the surface of the electrophotographic photoreceptor 7. The cleaning member may be a conductive or insulating fibrous member instead of the aspect of the cleaning blade 131, and may be used alone or in combination with the cleaning blade 131.

FIG. 3 shows an example of an image forming apparatus including a fibrous member 132 (roll shape) that supplies a lubricant 14 to the surface of the electrophotographic photoreceptor 7 and a fibrous member 133 (flat brush shape) that assists cleaning, but these are disposed as necessary.

Hereinafter, each configuration of the image forming apparatus according to the present exemplary embodiment will be described.

Charging Device

As the charging device 8, for example, a contact type charger formed of a conductive or semi-conductive charging roller, a charging brush, a charging film, a charging rubber blade, a charging tube, or the like is used. Further, a known charger such as a non-contact type roller charger, or a scorotron charger or a corotron charger using corona discharge is also used.

Exposure Device

Examples of the exposure device 9 include an optical system device that exposes the surface of the electrophotographic photoreceptor 7 to light such as a semiconductor laser beam, LED light, and liquid crystal shutter light in a predetermined image pattern. The wavelength of the light source is within the spectral sensitivity region of the electrophotographic photoreceptor. As the wavelength of a semiconductor laser, near infrared, which has an oscillation wavelength in the vicinity of 780 nm, is mostly used. However, the wavelength is not limited thereto, and a laser having an oscillation wavelength of approximately 600 nm or a laser having an oscillation wavelength of 400 nm or greater and 450 nm or less as a blue laser may also be used. Further, a surface emission type laser light source capable of outputting a multi-beam is also effective for forming a color image.

Developing Device

Examples of the developing device 11 include a typical developing device that performs development in contact or non-contact with the developer. The developing device 11 is not particularly limited as long as the developing device has the above-described functions, and is selected depending on the purpose thereof. Examples of the developing device include known developing machines having a function of attaching a one-component developer or a two-component developer to the electrophotographic photoreceptor 7 using a brush, a roller, or the like. Among these, for example, a developing device formed of a developing roller having a surface on which a developer is held is preferably used.

The developer used in the developing device 11 may be a one-component developer containing only a toner or a two-component developer containing a toner and a carrier. Further, the developer may be magnetic or non-magnetic. Known developers are employed as these developers.

Cleaning Device

As the cleaning device 13, a cleaning blade type device including the cleaning blade 131 is used. In addition to the cleaning blade type device, a fur brush cleaning type device or a simultaneous development cleaning type device may be employed.

Transfer Device

Examples of the transfer device 40 include a known transfer charger such as a contact type transfer charger using a belt, a roller, a film, or a rubber blade, a scorotron transfer charger, or a corotron transfer charger using corona discharge.

Intermediate Transfer Member

As the intermediate transfer member 50, a belt-like intermediate transfer member (intermediate transfer belt) containing semi-conductive polyimide, polyamide-imide, polycarbonate, polyarylate, polyester, rubber, or the like is used. Further, as the form of the intermediate transfer member, a drum-like intermediate transfer member may be used in addition to the belt-like intermediate transfer member.

Figure 4:
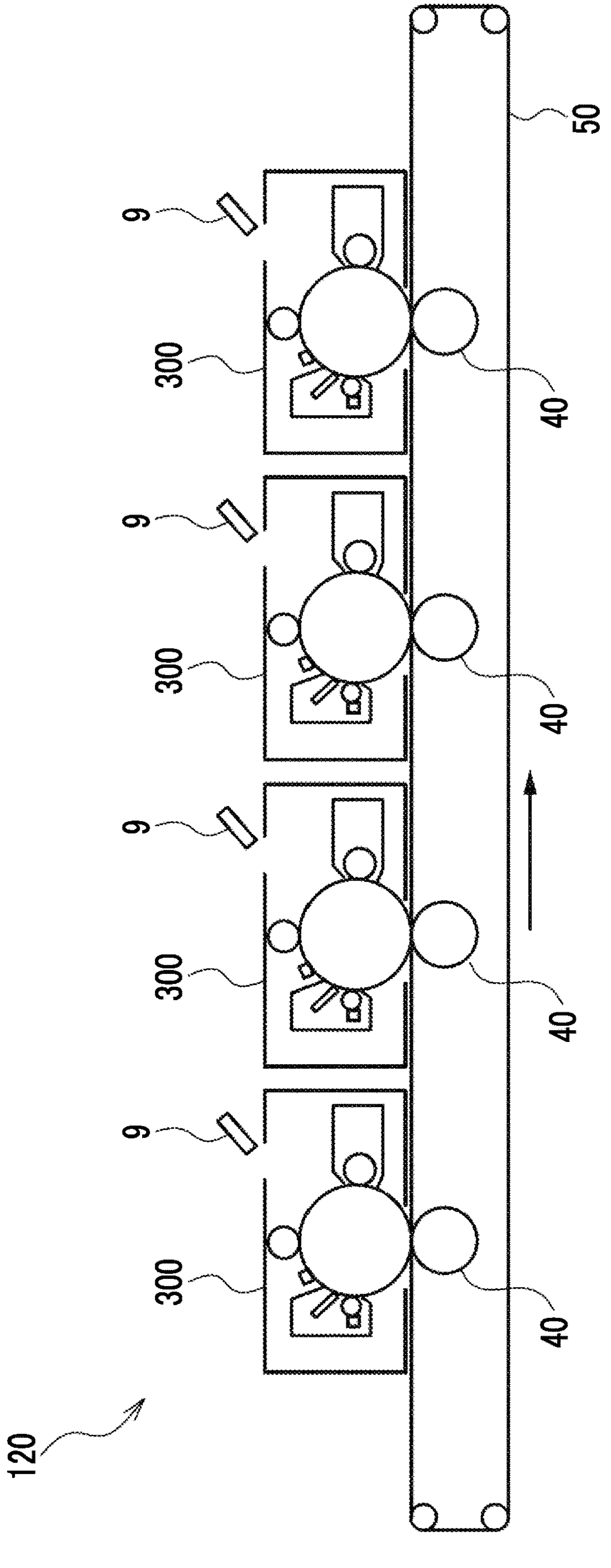
FIG. 4 is a schematic configuration view showing another example of an image forming apparatus according to the present exemplary embodiment.

FIG. 4 is a schematic configuration view showing an example of an image forming apparatus according to the present exemplary embodiment.

An image forming apparatus 120 shown in FIG. 4 is a tandem type multicolor image forming apparatus on which four process cartridges 300 are mounted. The image forming apparatus 120 is formed such that four process cartridges 300 are arranged in parallel on the intermediate transfer member 50, and one electrophotographic photoreceptor is used for each color. The image forming apparatus 120 has the same configuration as the image forming apparatus 100 except that the image forming apparatus 120 is of a tandem type.

EXAMPLES

Hereinafter, exemplary embodiments of the invention will be described in detail based on examples, but the exemplary embodiments of the invention are not limited to the examples.

In the following description, "parts" and "%" are on a mass basis unless otherwise specified.

In the following description, the synthesis, the treatment, the production, and the like are carried out at room temperature (25° C.±3° C.) unless otherwise specified.

Synthesis of Polyester Resin

Synthesis of Polyester Resin (PE-1-1)

43.12 g of 4,4'-(1,3-dimethylbutylidene)diphenol and 33.06 g of triethylamine are added to a reaction container equipped with a stirrer, and 280 mL of methylene chloride is added thereto to prepare a solution. 45.32 g of 4,4'-biphenyldicarbonyl chloride (HPLC purity: 99.6%) is added, in a state of powder, to the solution while being stirred at a temperature of 13° C. After completion of the addition, the polymerization reaction is allowed to proceed by stirring the solution for 5 hours in a nitrogen atmosphere. Further, the solution after the polymerization is subjected to the following purification treatment.

The obtained solution is diluted with 300 ml of tetrahydrofuran, and methanol is poured into the solution to precipitate the polyester resin. The precipitated resin is separated by filtration, washed with methanol, and dried at 50° C. The obtained polyester resin is redissolved in 300 ml of tetrahydrofuran, and the mixture is poured into methanol to reprecipitate the polyester resin. The precipitated resin is separated by filtration, washed with methanol, and dried at 50° C., thereby obtaining 65.2 g of a polyester resin (PE-1-1).

In a case where the polyester resin (PE-1-1) is analyzed by HPLC, the polyester resin (PE-1-1-) contains 15 ppm of the aromatic dicarboxylic acid represented by Formula (2).

Synthesis of Polyester Resin (PE-1-2)

The polyester resin (PE-1-1) is dissolved in tetrahydrofuran, and the mixture is poured into methanol to reprecipitate the polyester resin. The mixture is stirred in this state for 2 hours, and the precipitated polyester resin is separated by filtration and dried at 50° C., thereby obtaining a polyester resin. The same operation as described above is performed once more on this polyester resin, thereby obtaining a polyester resin (PE-1-2).

In a case where the polyester resin (PE-1-2) is analyzed by HPLC, the polyester resin contains 3.0 ppm of the aromatic dicarboxylic acid represented by Formula (2).

Synthesis of Polyester Resin (PE-1-3)

The polyester resin (PE-1-1) is dissolved in tetrahydrofuran, and the mixture is poured into methanol to reprecipitate the polyester resin. The mixture is stirred in this state for 2 hours, and the precipitated polyester resin is separated by filtration and dried at 50° C., thereby obtaining a polyester resin. The same operation as described above is performed twice more on this polyester resin, thereby obtaining a polyester resin (PE-1-3).

In a case where the polyester resin (PE-1-3) is analyzed by HPLC, the polyester resin contains 0.02 ppm of the aromatic dicarboxylic acid represented by Formula (2).

Synthesis of Polyester Resin (PE-1-4)

43.12 g of 4,4'-(1,3-dimethylbutylidene)diphenol and 33.06 g of triethylamine are added to a reaction container equipped with a stirrer, and 280 mL of methylene chloride is added thereto to prepare a solution. 45.32 g of 4,4'-biphenyldicarbonyl chloride (HPLC purity: 99.6%) is added, in a state of powder, to the solution while being stirred at a temperature of 13° C. After completion of the addition, the polymerization reaction is allowed to proceed by stirring the solution for 2 hours in a nitrogen atmosphere. Further, the solution after the polymerization is subjected to the following purification treatment.

The obtained solution is diluted with 500 ml of methylene chloride and continuously stirred for 2 hours. Next, acetic acid is added to the solution until the solution is neutral, and continuously stirred for 30 minutes. Next, stirring is stopped, the solution is allowed to stand so that the aqueous layer and the organic layer are separated from each other, and the aqueous layer is removed. The obtained organic layer is washed 3 times with 800 ml of water. Methanol is poured to the washed organic layer to precipitate the polyester resin. The precipitated resin is separated by filtration, washed with methanol, and dried at 50° C., thereby obtaining 64.0 g of a polyester resin (PE-1-4).

In a case where the polyester resin (PE-1-4) is analyzed by HPLC, the polyester resin contains 1500 ppm of the aromatic dicarboxylic acid represented by Formula (2).

Synthesis of Polyester Resin (PE-x-y)

A polyester resin (PE-x-y) listed in Table 1 is synthesized in the same manner as that for the polyester resin (PE-1-1), (PE-1-2), (PE-1-3), or (PE-1-4) except that the kind of the monomer subjected to the polymerization reaction is changed. Here, x represents an integer of 2 to 7, and y represents an integer of 1 to 4.

The polyester resin (PE-x-1) is a polyester resin obtained by performing the same purification treatment as the purification treatment for the polyester resin (PE-1-1).

The polyester resin (PE-x-2) is a polyester resin obtained by performing the same purification treatment as the purification treatment for the polyester resin (PE-1-2).

The polyester resin (PE-x-3) is a polyester resin obtained by performing the same purification treatment as the purification treatment for the polyester resin (PE-1-3).

The polyester resin (PE-x-4) is a polyester resin obtained by performing the same purification treatment as the purification treatment for the polyester resin (PE-1-4).

Synthesis of Polyester Resin for Comparison

Polyester resins (PE-X1) to (PE-X7) listed in Table 1 are synthesized in the same manner as that for the polyester resin (PE-1-1) except that the kind of the monomer subjected to the polymerization reaction is changed.

1-A3 and the like listed in Table 1 are specific examples of the dicarboxylic acid unit (1-A) described above.

A3-2 and the like listed in Table 1 are specific examples of the dicarboxylic acid unit (A) described above.

B1-2 and the like listed in Table 1 are specific examples of the diol unit (B) described above.

In a case where two kinds of dicarboxylic acid units are present, the compositional ratio (mol %) is also listed in Table 1.

TABLE 1

| Polyester resin No. | Dicarboxylic acid unit (1-A) No. | Dicarboxylic acid unit (A) No. | Diol unit (B) No. |
|---|---|---|---|
| PE-1-1 | 1-A3 | — | B1-2 |
| PE-1-2 | | | |
| PE-1-3 | | | |
| PE-1-4 | | | |
| PE-2-1 | 1-A3 | — | B6-4 |
| PE-2-2 | | | |
| PE-2-3 | | | |
| PE-2-4 | | | |
| PE-3-1 | 1-A4 | — | B4-2 |
| PE-3-2 | | | |
| PE-3-3 | | | |
| PE-3-4 | | | |
| PE-4-1 | 1-A9 | — | B3-3 |
| PE-4-2 | | | |
| PE-4-3 | | | |
| PE-4-4 | | | |
| PE-5-1 | 1-A8 | — | B2-8 |
| PE-5-2 | | | |
| PE-5-3 | | | |
| PE-5-4 | | | |
| PE-6-1 | 1-A3 | A3-2 | B1-2 |
| PE-6-2 | [40 mol %] | [10 mol %] | |
| PE-6-3 | | | |
| PE-6-4 | | | |
| PE-7-1 | 1-A3 | A1-7 | B2-8 |
| PE-7-2 | [25 mol %] | [25 mol %] | |
| PE-7-3 | | | |
| PE-7-4 | | | |
| PE-X1 | — | A3-2 | B1-2 |
| PE-X2 | — | A1-7 | B1-2 |
| PE-X3 | — | A3-2 | B6-4 |
| PE-X4 | — | A4-3 | B6-4 |
| PE-X5 | — | A1-7[25 mol %]<br>A1-1[25 mol %] | B6-4 |
| PE-X6 | — | A3-2 | B4-2 |
| PE-X7 | — | A3-2 | B4-3 |

Synthesis of Polycarbonate Resin

Synthesis of Polycarbonate Resin for Present Exemplary Embodiment

Each of polycarbonate resins (PC-1) to (PC-4) listed in Table 2 is synthesized by reacting diphenol with phosgene.

Synthesis of Polycarbonate Resin for Comparison

Each of polycarbonate resins (PC-X1) and (PC-X2) listed in Table 2 is synthesized by reacting diphenol with phosgene.

1-C3 and the like listed in Table 2 are specific examples of the constitutional unit (1-C) described above.

Cb6-3 and the like listed in Table 2 are specific examples of the constitutional unit (C) described above.

In a case where two kinds of constitutional units are present, the compositional ratio (mol %) is also listed in Table 2.

TABLE 2

| Polycarbonate resin No. | Constitutional unit (1-C) No. | Constitutional unit (Ca) No. | Constitutional unit (Cb) No. |
|---|---|---|---|
| PC-1 | 1-C3 [25 mol %] | — | Cb6-3 [75 mol %] |
| PC-2 | 1-C4 [50 mol %] | — | Cb6-3 [50 mol %] |
| PC-3 | 1-C3 [40 mol %] | — | Cb6-4 [60 mol %] |
| PC-4 | 1-C6 [50 mol %] | — | Cb6-3 [50 mol %] |
| PC-X1 | — | Ca3-2 [50 mol %] | Cb6-3 [50 mol %] |
| PC-X2 | — | — | Cb6-3 |

Production of Photoreceptor Including Lamination Type Photosensitive Layer

Example S1

Formation of Undercoat Layer 100 parts of zinc oxide (average particle diameter of 70 nm, specific surface area of 15 $m^2/g$, manufactured by Tayca Corporation) is stirred and mixed with 500 parts of toluene, 1.3 parts of a silane coupling agent (trade name: KBM603, manufactured by Shin-Etsu Chemical Co., Ltd., N-2-(aminoethyl)-3-aminopropyltrimethoxysilane) is added thereto, and the mixture is stirred for 2 hours. Thereafter, toluene is distilled off under reduced pressure and baked at 120° C. for 3 hours to obtain zinc oxide subjected to a surface treatment with a silane coupling agent.

110 parts of the surface-treated zinc oxide is stirred and mixed with 500 parts of tetrahydrofuran, a solution obtained by dissolving 0.6 part of alizarin in 50 parts of tetrahydrofuran is added thereto, and the mixture is stirred at 50° C. for 5 hours. Thereafter, the solid content is separated by filtration by carrying out filtration under reduced pressure and dried at 60° C. under reduced pressure, thereby obtaining zinc oxide with alizarin.

100 parts of a solution obtained by dissolving 60 parts of the zinc oxide with alizarin, 13.5 parts of a curing agent (blocked isocyanate, trade name: SUMIDUR 3175, manufactured by Sumitomo Bayer Urethane Co., Ltd.), and 15 parts of a butyral resin (trade name: S-LEC BM-1, manufactured by Sekisui Chemical Co., Ltd.) in 68 parts of methyl ethyl ketone is mixed with 5 parts of methyl ethyl ketone, and the solution is dispersed in a sand mill for 2 hours using glass beads with a diameter of 1 mmφ, thereby obtaining a dispersion liquid. 0.005 part of dioctyltin dilaurate as a catalyst and 4 parts of silicone resin particles (trade name: TOSPEARL 145, manufactured by Momentive Performance Materials Inc.) are added to the dispersion liquid, thereby obtaining a coating solution for forming an undercoat layer. An outer peripheral surface of a conductive substrate (an aluminum cylindrical tube with an outer diameter of 30 mm, a length of 365 mm, and a thickness of 1.6 mm) is coated with the coating solution for forming an undercoat layer by a dip coating method, and dried and cured at 185° C. for 35 minutes, thereby forming an undercoat layer. The average thickness of the undercoat layer is 25 μm.

Formation of Charge Generation Layer

A mixture of 15 parts of hydroxygallium phthalocyanine as a charge generation substance (Bragg angle (2θ±0.2°) of the X-ray diffraction spectrum using Cuka characteristic X-ray has diffraction peaks at positions at least of 7.5°, 9.9°, 12.5, 16.3°, 18.6°, 25.1°, and 28.3°), 10 parts of a vinyl chloride-vinyl acetate copolymer resin (trade name: VMCH, Nippon Unicar Company Limited) as a binder resin, and 200 parts of n-butyl acetate is dispersed in a sand mill for 4 hours using glass beads having a diameter of 1 mm. 175 parts of n-butyl acetate and 180 parts of methyl ethyl ketone are added to the dispersion liquid, and the mixture is stirred, thereby obtaining a coating solution for forming a charge generation layer. The undercoat layer is immersed in and coated with the coating solution for forming a charge generation layer and dried at room temperature (25° C.±3° C.) to form a charge generation layer having an average thickness of 0.25 μm.

Formation of Charge Transport Layer

| | |
|---|---|
| Binder resin: polyester resin (PE-1-1) | 60 parts |
| Charge transport material: CTM-1 | 40 parts |

The above-described materials are dissolved or dispersed in a mixed solvent of 550 parts of tetrahydrofuran and 50 parts of toluene to obtain a coating solution for forming a charge transport layer. The charge generation layer is immersed in and coated with the coating solution for forming a charge transport layer, and dried at a temperature of 150° C. for 40 minutes to form a charge transport layer having an average thickness of 32 μm.

CTM-1

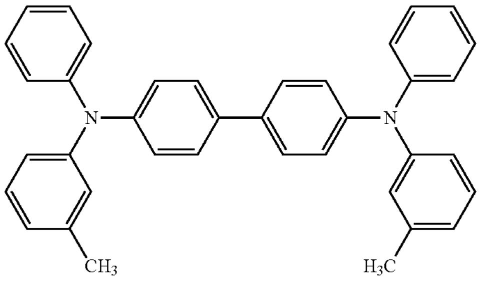

Examples S2 to S59 and Comparative Examples SC1 to SC20

Each photoreceptor is prepared in the same manner as in Example S1 except that the kind of the polyester resin or the polycarbonate resin is changed to the kind of the resin listed in Tables 3 (Tables 3-1 to 3-3) and the aromatic dicarboxylic acid represented by Formula (2) is added in the amount listed in Tables 3 (Tables 3-1 to 3-3) in the formation of the charge transport layer.

Production of Photoreceptor Including Single Layer Type Photosensitive Layer

Example T1

Formation of Photosensitive Layer

| | |
|---|---|
| Binder resin: polyester resin (PE-1-1) | 45 parts |
| Charge generation material: V type hydroxygallium phthalocyanine (having diffraction peaks at least at positions where Bragg angles (2θ ± 0.2°) of the X-ray diffraction spectrum using Cukα characteristic X-ray are 7.3°, 16.0°, 24.9°, and 28.0°) | 1.0 parts |
| Electron transport material: ETM-1 | 9 parts |
| Charge transport material: CTM-1 | 45 parts |

The above-described materials are dissolved or dispersed in a mixed solvent of 175 parts of tetrahydrofuran and 75 parts of toluene, and the solution is subjected to a dispersion treatment for 4 hours with a sand mill using glass beads having a diameter of 1 mm, thereby obtaining a coating solution for forming a photosensitive layer. An outer peripheral surface of a conductive substrate (an aluminum cylindrical tube with an outer diameter of 30 mm, a length of 365 mm, and a thickness of 1.6 mm) is coated with the coating solution for forming a photosensitive layer by a dip coating method, and dried at a temperature of 150° C. for 60 minutes, thereby forming a single layer type photosensitive layer having an average thickness of 36 μm.

ETM-1

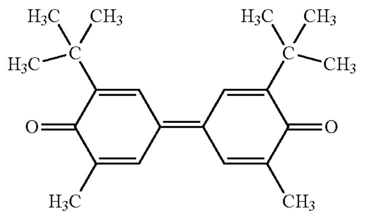

CTM-1

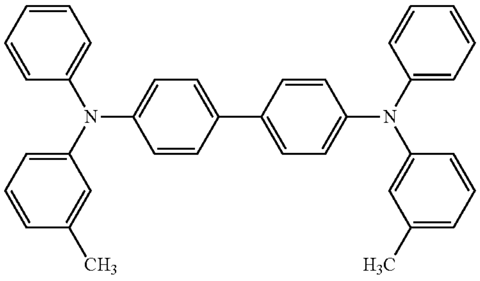

Examples T2 to T6 and Comparative Examples TC1 to TC4

Each photoreceptor is prepared in the same manner as in Example T1 except that the kind of the polyester resin or the polycarbonate resin is changed to the kind of the resin listed in Table 4 and the aromatic dicarboxylic acid represented by Formula (2) is added in the amount listed in Table 4.

Performance Evaluation of Photoreceptor

Each photoreceptor of the examples or the comparative examples is mounted on an electrophotographic image forming apparatus Apeos C7070 (manufactured by FUJIFILM Business Innovation Corporation).

Abrasion Resistance

Full-surface halftone images (images with a density of 30%) of a yellow color, a magenta color, a cyan color, and a black color are continuously output onto A3 size plain paper such that 10000 sheets of images of each color, that is, a total of 40000 sheets of images are output, under a low-temperature and low-humidity environment of a temperature of 10° C. and a relative humidity of 15%. The average thickness (nm) of the charge transport layer or the single layer type photosensitive layer is measured before and after the image formation, and a difference in the average thickness before and after the image formation is defined as the amount of abrasion (nm). PERMASCOPE (manufactured by Fischer Instruments K.K.) is used as a film thickness measuring device. The amount of abrasion is classified as follows. The results are listed in Tables 3 (3-1 to 3-3) and Table 4.

A: The amount of abrasion is less than 800 nm

B: The amount of abrasion is 800 nm or greater and less than 1600 nm

C: The amount of abrasion is 1600 nm or greater and less than 2400 nm

D: The amount of abrasion is 2400 nm or greater

Fogging 00 sheets of full-surface solid images (images with a density of 100%) of a black color are continuously output onto A3 size plain paper under a high-temperature and high-humidity environment of a temperature of 28° C. and a relative humidity of 85%. Next, one sheet of A3 size plain paper is allowed to pass through (that is, one sheet is output without an image), and this one sheet is visually observed and classified as follows. The results are listed in Tables 3 (3-1 to 3-3) and Table 4.

A: No fogging is observed.

B: Fogging is observed, but is acceptable in practical use.

C: Fogging is observed and is not acceptable in practical use.

TABLE 3-1

| | Polyester resin | | Polycarbonate resin | | Mixing ratio of polyester and polycarbonate | Aromatic dicarboxylic acid represented by Formula (2) | | Content of charge transport layer | Performance evaluation of photoreceptor | |
|---|---|---|---|---|---|---|---|---|---|---|
| | Resin No. | Constitutional unit containing biphenyl | Resin No. | Constitutional unit containing biphenyl | Mass ratio | No. — | Addition amount $\times 10^{-4}$ parts | ppm | Abrasion resistance | Fogging |
| Comparative Example SC1 | PE-X1 | — | | — | 100:0 | — | 0 | 0 | C | A |

TABLE 3-1-continued

| | Polyester resin | | Polycarbonate resin | | Mixing ratio of polyester and polycarbonate | Aromatic dicarboxylic acid represented by Formula (2) | | Content of charge transport layer | Performance evaluation of photoreceptor | |
|---|---|---|---|---|---|---|---|---|---|---|
| | Resin No. | Constitutional unit containing biphenyl | Resin No. | Constitutional unit containing biphenyl | Mass ratio | No. — | Addition amount $\times 10^{-4}$ parts | ppm | Abrasion resistance | Fogging |
| Comparative Example SC2 | PE-X2 | — | | | | — | 0 | 0 | D | C |
| Comparative Example SC3 | PE-X3 | — | | | | — | 0 | 0 | C | A |
| Comparative Example SC4 | PE-X4 | — | | | | — | 0 | 0 | C | B |
| Comparative Example SC5 | PE-X5 | — | | | | — | 0 | 0 | D | C |
| Comparative Example SC6 | PE-X6 | — | | | | — | 0 | 0 | C | A |
| Comparative Example SC7 | PE-X7 | — | | | | — | 0 | 0 | C | A |
| Example S1 | PE-1-1 | 1-A3 | | — | 100:0 | — | 0 | 9 | A | A |
| Example S2 | PE-1-2 | | | | | — | 0 | 2 | A | A |
| Comparative Example SC8 | PE-1-3 | | | | | — | 0 | <0.1 | C | A |
| Example S3 | | | | | | (2-1) | 50 | 50 | A | A |
| Example S4 | | | | | | (2-1) | 150 | 150 | A | A |
| Example S5 | | | | | | (2-1) | 500 | 500 | A | B |
| Example S6 | | | | | | (2-2) | 50 | 50 | A | A |
| Example S7 | | | | | | (2-3) | 50 | 50 | A | A |
| Example S8 | PE-1-4 | | | | | — | 0 | 900 | B | B |
| Example S9 | PE-2-1 | 1-A3 | | — | 100:0 | — | 0 | 9 | A | A |
| Example S10 | PE-2-2 | | | | | — | 0 | 2 | A | A |
| Comparative Example SC9 | PE-2-3 | | | | | — | 0 | <0.1 | C | A |
| Example S11 | | | | | | (2-1) | 50 | 50 | A | A |
| Example S12 | | | | | | (2-1) | 150 | 150 | B | A |
| Example S13 | | | | | | (2-1) | 500 | 500 | B | B |
| Example S14 | PE-2-4 | | | | | — | 0 | 900 | B | B |
| Example S15 | PE-3-1 | 1-A4 | | — | 100:0 | — | 0 | 8 | A | A |
| Example S16 | PE-3-2 | | | | | — | 0 | 2 | A | B |
| Comparative Example SC10 | | | | | | — | 0 | <0.1 | C | A |
| Example S17 | PE-3-3 | | | | | (2-1) | 50 | 50 | A | A |
| Example S18 | | | | | | (2-1) | 150 | 150 | A | A |
| Example S19 | | | | | | (2-1) | 500 | 500 | B | A |
| Example S20 | PE-3-4 | | | | | — | 0 | 950 | B | B |

TABLE 3-2

| | Polyester resin | | Polycarbonate resin | | Mixing ratio of polyester and polycarbonate | Aromatic dicarboxylic acid represented by Formula (2) | | Content of charge transport layer | Performance evaluation of photoreceptor | |
|---|---|---|---|---|---|---|---|---|---|---|
| | Resin No. | Constitutional unit containing biphenyl | Resin No. | Constitutional unit containing biphenyl | Mass ratio | No. — | Addition amount $\times 10^{-4}$ parts | ppm | Abrasion resistance | Fogging |
| Example S21 | PE-4-1 | 1-A9 | | — | 100:0 | — | 0 | 25 | A | A |
| Example S22 | PE-4-2 | | | | | — | 0 | 8 | A | B |
| Comparative Example SC11 | PE-4-3 | | | | | — | 0 | <0.1 | C | A |
| Example S23 | | | | | | (2-1) | 50 | 50 | A | A |
| Example S24 | | | | | | (2-1) | 150 | 150 | A | A |
| Example S25 | | | | | | (2-1) | 500 | 500 | B | A |
| Example S26 | PE-4-4 | | | | | — | 0 | 950 | B | B |
| Example S27 | PE-5-1 | 1-A8 | | — | 100:0 | — | 0 | 45 | B | A |
| Example S28 | PE-5-2 | | | | | — | 0 | 15 | B | B |
| Comparative Example SC12 | PE-5-3 | | | | | — | 0 | <0.1 | C | A |

TABLE 3-2-continued

| | Polyester resin | | Polycarbonate resin | | Mixing ratio of polyester and polycarbonate | Aromatic dicarboxylic acid represented by Formula (2) | | Content of charge transport layer | Performance evaluation of photoreceptor | |
|---|---|---|---|---|---|---|---|---|---|---|
| | Resin No. | Constitutional unit containing biphenyl | Resin No. | Constitutional unit containing biphenyl | Mass ratio | No. — | Addition amount $\times 10^{-4}$ parts | ppm | Abrasion resistance | Fogging |
| Example S29 | | | | | | (2-1) | 50 | 50 | A | A |
| Example S30 | | | | | | (2-1) | 150 | 150 | B | A |
| Example S31 | | | | | | (2-1) | 500 | 500 | B | A |
| Example S32 | PE-5-4 | | | | | — | 0 | 950 | B | B |
| Example S33 | PE-6-1 | 1-A3 | — | | 100:0 | — | 0 | 10 | A | A |
| Example S34 | PE-6-2 | | | | | — | 0 | 2 | A | A |
| Comparative Example SC13 | PE-6-3 | | | | | — | 0 | <0.1 | C | A |
| Example S35 | | | | | | (2-1) | 50 | 50 | A | A |
| Example S36 | | | | | | (2-1) | 150 | 150 | B | A |
| Example S37 | | | | | | (2-1) | 500 | 500 | B | B |
| Example S38 | PE-6-4 | | | | | — | 0 | 900 | B | B |
| Example S39 | PE-7-1 | 1-A3 | — | | 100:0 | — | 0 | 3 | A | A |
| Example S40 | PE-7-2 | | | | | — | 0 | 1 | A | A |
| Comparative Example SC14 | PE-7-3 | | | | | — | 0 | <0.1 | C | A |
| Example S41 | | | | | | (2-1) | 50 | 50 | A | A |
| Example S42 | | | | | | (2-1) | 150 | 150 | B | A |
| Example S43 | | | | | | (2-1) | 500 | 500 | B | B |
| Example S44 | PE-7-4 | | | | | — | 0 | 900 | B | B |

TABLE 3-3

| | Polyester resin | | Polycarbonate resin | | Mixing ratio of polyester and polycarbonate | Aromatic dicarboxylic acid represented by Formula (2) | | Content of charge transport layer | Performance evaluation of photoreceptor | |
|---|---|---|---|---|---|---|---|---|---|---|
| | Resin No. | Constitutional unit containing biphenyl | Resin No. | Constitutional unit containing biphenyl | Mass ratio | No. — | Addition amount $\times 10^{-4}$ parts | ppm | Abrasion resistance | Fogging |
| Example S45 | PE-1-3 | 1-A3 | PC-1 | 1-C3 | 95:5 | (2-1) | 100 | 100 | A | A |
| Example S46 | | | | | 70:30 | (2-1) | 100 | 100 | A | A |
| Example S47 | | | | | 40:60 | (2-1) | 100 | 100 | B | A |
| Comparative Example SC15 | | — | PC-X1 | — | 0:100 | — | 0 | 0 | C | A |
| Comparative Example SC16 | | — | PC-X2 | — | 0:100 | — | 0 | 0 | D | A |
| Comparative Example SC17 | | — | PC-1 | 1-C3 | 0:100 | — | 0 | 0 | C | A |
| Example S48 | | | | | 0:100 | (2-1) | 5 | 5 | B | A |
| Example S49 | | | | | | (2-1) | 100 | 100 | B | B |
| Example S50 | | | | | | (2-1) | 500 | 500 | B | A |
| Comparative Example SC18 | | — | PC-2 | 1-C4 | 0:100 | — | 0 | 0 | C | A |
| Example S51 | | | | | 0:100 | (2-1) | 5 | 5 | B | A |
| Example S52 | | | | | | (2-1) | 100 | 100 | B | A |
| Example S53 | | | | | | (2-1) | 500 | 500 | B | A |
| Comparative Example SC19 | | — | PC-3 | 1-C3 | 0:100 | — | 0 | 0 | C | A |
| Example S54 | | | | | 0:100 | (2-1) | 5 | 5 | B | A |
| Example S55 | | | | | | (2-1) | 100 | 100 | B | B |
| Example S56 | | | | | | (2-1) | 500 | 500 | B | A |
| Comparative Example SC20 | | — | PC-4 | 1-C6 | 0:100 | — | 0 | 0 | D | A |
| Example S57 | | | | | 0:100 | (2-1) | 5 | 5 | C | A |
| Example S58 | | | | | | (2-1) | 100 | 100 | B | A |
| Example S59 | | | | | | (2-1) | 500 | 500 | B | A |

TABLE 4

| | Polyester resin | | Polycarbonate resin | | Aromatic dicarboxylic acid represented by Formula (2) | | Content of charge transport layer | Performance evaluation of photoreceptor | |
|---|---|---|---|---|---|---|---|---|---|
| | Resin No. | Constitutional unit containing biphenyl | Resin No. | Constitutional unit containing biphenyl | No. — | Addition amount $\times 10^{-4}$ parts | ppm | Abrasion resistance | Fogging |
| Comparative Example TC1 | PE-X1 | — | | — | — | 0 | 0 | D | A |
| Example T1 | PE-1-1 | 1-A3 | | | — | 0 | 7 | B | A |
| Example T2 | PE-1-2 | | | | — | 0 | 1.5 | B | A |
| Comparative Example TC2 | PE-1-3 | | | | — | 0 | <0.1 | C | A |
| Example T3 | | | | | (2-1) | 250 | 250 | B | A |
| Example T4 | | | | | (2-1) | 500 | 500 | B | B |
| Example T5 | PE-1-4 | | | | — | 0 | 680 | B | B |
| Comparative Example TC3 | | — | PC-X1 | — | — | 0 | 0 | D | A |
| Comparative Example TC4 | | | PC-1 | 1-C3 | — | 0 | 0 | C | A |
| Example T6 | | | PC-1 | 1-C3 | (2-1) | 100 | 100 | B | A |

The electrophotographic photoreceptor, the process cartridge, and the image forming apparatus of the present disclosure include the following aspects. Each formula is the same as the formula having the same number described below.

(((1)))

An electrophotographic photoreceptor comprising:

a conductive substrate; and a lamination type photosensitive layer disposed on the conductive substrate and including a charge generation layer and a charge transport layer, wherein the charge transport layer contains a charge transport material, at least one of a polyester resin or a polycarbonate resin that has a constitutional unit containing biphenyl represented by Formula (1), and an aromatic dicarboxylic acid represented by Formula (2).

(((2)))

The electrophotographic photoreceptor according to (((1))), wherein a mass proportion of the aromatic dicarboxylic acid in a total mass of the charge transport layer is 0.1 ppm or greater and 1,000 ppm or less.

(((3)))

The electrophotographic photoreceptor according to (((1))) or (((2))), wherein the polyester resin has at least one of a dicarboxylic acid unit (1-A) represented by Formula (1-A) or a diol unit (1-B) represented by Formula (1-B), and the polycarbonate resin has a constitutional unit (1-C) represented by Formula (1-C).

(((4)))

The electrophotographic photoreceptor according to any one of (((1))) to (((3))), wherein the charge transport layer contains the polyester resin, and the polyester resin has at least one selected from the group consisting of a dicarboxylic acid unit (A1) represented by Formula (A1), a dicarboxylic acid unit (A3) represented by Formula (A3), and a dicarboxylic acid unit (A4) represented by Formula (A4).

(((5)))

The electrophotographic photoreceptor according to any one of (((1))) to (((4))), wherein the charge transport layer contains the polyester resin, and the polyester resin has at least one selected from the group consisting of a diol unit (B1) represented by Formula (B1), a diol unit (B2) represented by Formula (B2), a diol unit (B3) represented by Formula (B3), a diol unit (B4) represented by Formula (B4), a diol unit (B5) represented by Formula (B5), a diol unit (B6) represented by Formula (B6), and a diol unit (B8) represented by Formula (B8).

(((6)))

The electrophotographic photoreceptor according to any one of (((1))) to (((5))), wherein the charge transport layer contains the polycarbonate resin, and the polycarbonate resin has at least one selected from the group consisting of a constitutional unit (Ca1) represented by Formula (Ca1), a constitutional unit (Ca3) represented by Formula (Ca3), a constitutional unit (Ca4) represented by Formula (Ca4), a constitutional unit (Cb1) represented by Formula (Cb1), a constitutional unit (Cb2) represented by Formula (Cb2), a constitutional unit (Cb3) represented by Formula (Cb3), a constitutional unit (Cb4) represented by Formula (Cb4), a constitutional unit (Cb5) represented by Formula (Cb5), a constitutional unit (Cb6) represented by Formula (Cb6), and a constitutional unit (Cb8) represented by Formula (Cb8).

(((7)))

An electrophotographic photoreceptor comprising:

a conductive substrate; and a single layer type photosensitive layer disposed on the conductive substrate, wherein the single layer type photosensitive layer contains a charge transport material, at least one of a polyester resin or a polycarbonate resin that has a constitutional unit containing biphenyl represented by Formula (1), and an aromatic dicarboxylic acid represented by Formula (2).

(((8)))

The electrophotographic photoreceptor according to (((7))), wherein a mass proportion of the aromatic dicarboxylic acid in a total mass of the single layer type photosensitive layer is 0.4 ppm or greater and 1,000 ppm or less.

(((9)))

The electrophotographic photoreceptor according to (((7))) or (((8))), wherein the polyester resin has at least one of a dicarboxylic acid unit (1-A) represented by Formula (1-A) or a diol unit (1-B) represented by Formula (1-B), and the polycarbonate resin has a constitutional unit (1-C) represented by Formula (1-C).

(((10)))

The electrophotographic photoreceptor according to any one of (((7))) to (((9))), wherein the single layer type photosensitive layer contains the polyester resin, and the polyester resin has at least one selected from the group consisting of a dicarboxylic acid unit (A1) represented by Formula (A1), a dicarboxylic acid unit (A3) represented by Formula (A3), and a dicarboxylic acid unit (A4) represented by Formula (A4).

(((11)))

The electrophotographic photoreceptor according to any one of (((7))) to (((10))), wherein the single layer type photosensitive layer contains the polyester resin, and the polyester resin has at least one selected from the group consisting of a diol unit (B1) represented by Formula (B1), a diol unit (B2) represented by Formula (B2), a diol unit (B3) represented by Formula (B3), a diol unit (B4) represented by Formula (B4), a diol unit (B5) represented by Formula (B5), a diol unit (B6) represented by Formula (B6), and a diol unit (B8) represented by Formula (B8).

(((12)))

The electrophotographic photoreceptor according to any one of (((7))) to (((11))), wherein the single layer type photosensitive layer contains the polycarbonate resin, and the polycarbonate resin has at least one selected from the group consisting of a constitutional unit (Ca1) represented by Formula (Ca1), a constitutional unit (Ca3) represented by Formula (Ca3), a constitutional unit (Ca4) represented by Formula (Ca4), a constitutional unit (Cb1) represented by Formula (Cb1), a constitutional unit (Cb2) represented by Formula (Cb2), a constitutional unit (Cb3) represented by Formula (Cb3), a constitutional unit (Cb4) represented by Formula (Cb4), a constitutional unit (Cb5) represented by Formula (Cb5), a constitutional unit (Cb6) represented by Formula (Cb6), and a constitutional unit (Cb8) represented by Formula (Cb8).

(((13)))

A process cartridge comprising:

the electrophotographic photoreceptor according to any one of (((1))) to (((12))), wherein the process cartridge is attachable to and detachable from an image forming apparatus.

(((14)))

An image forming apparatus comprising:

the electrophotographic photoreceptor according to any one of (((1))) to (((12)));

a charging device that charges a surface of the electrophotographic photoreceptor;

an electrostatic latent image forming device that forms an electrostatic latent image on the charged surface of the electrophotographic photoreceptor;

a developing device that develops the electrostatic latent image formed on the surface of the electrophotographic photoreceptor with a developer containing a toner to form a toner image; and a transfer device that transfers the toner image to a surface of a recording medium.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An electrophotographic photoreceptor comprising:

a conductive substrate; and a lamination type photosensitive layer disposed on the conductive substrate and including a charge generation layer and a charge transport layer, wherein the charge transport layer contains a charge transport material, at least one of a polyester resin or a polycarbonate resin that has a constitutional unit containing biphenyl represented by Formula (1), and an aromatic dicarboxylic acid represented by Formula (2), Formula (1)

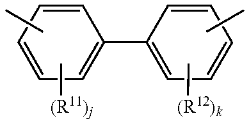

Formula (2)

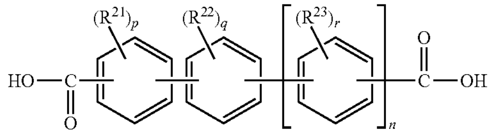

in Formula (1), j represents an integer of 0 or greater and 4 or less, and when j is an integer greater than zero, each $R^{11}$ independently represents a methyl group or an ethyl group, k represents an integer of 0 or greater and 4 or less, and when k is an integer greater than zero, each $R^{12}$ independently represents a methyl group or an ethyl group, in Formula (2), p represents an integer of 0 or greater and 4 or less, and p is an integer greater than zero, each $R^{21}$ independently represents a methyl group or an ethyl group, q represents an integer of 0 or greater and 4 or less, and when q is an integer greater than zero, each $R^{22}$ independently represents a methyl group or an ethyl group, r represents an integer of 0 or greater and 4 or less, and when r is an integer greater than zero, each $R^{23}$ independently represents a methyl group or an ethyl group, and n represents 0 or 1.

2. The electrophotographic photoreceptor according to claim 1, wherein a mass proportion of the aromatic dicarboxylic acid in a total mass of the charge transport layer is 0.1 ppm or greater and 1,000 ppm or less.

3. The electrophotographic photoreceptor according to claim 1, wherein the polyester resin has at least one of a dicarboxylic acid unit (1-A) represented by Formula (1-A) or a diol unit (1-B) represented by Formula (1-B), and the polycarbonate resin has a constitutional unit (1-C) represented by Formula (1-C), Formula (1-A)

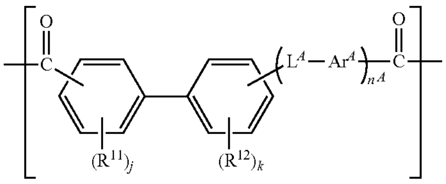

Formula (1-B)

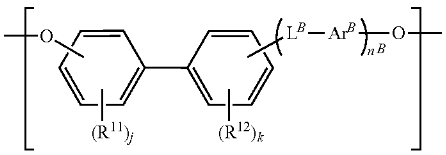

Formula (1-C)

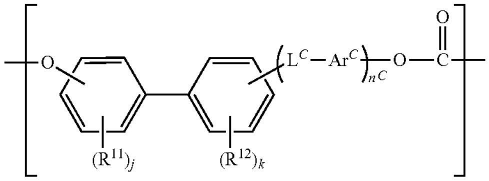

in Formula (1-A), j represents an integer of 0 or greater and 4 or less, and when j is an integer greater than zero, each $R^{11}$ independently represents a methyl group or an ethyl group, k represents an integer of 0 or greater and 4 or less, and when k is an integer greater than zero, each $R^{12}$ independently represents a methyl group or an ethyl group, $L^A$ represents a single bond or a divalent linking group, $Ar^A$ represents an aromatic ring that may have a substituent, and $n^A$ represents 0, 1, or 2, in Formula (1-B), j represents an integer of 0 or greater and 4 or less, and when j is an integer greater than zero, each $R^{11}$ independently represents a methyl group or an ethyl group, k represents an integer of 0 or greater and 4 or less, and when k is an integer greater than zero, each $R^{12}$ independently represents a methyl group or an ethyl group, $L^B$ represents a single bond or a divalent linking group, $Ar^B$ represents an aromatic ring that may have a substituent, and n represents 0, 1, or 2, in Formula (1-C), j represents an integer of 0 or greater and 4 or less, and when i is an integer greater than zero, each $R^{11}$ independently represents a methyl group or an ethyl group, k represents an integer of 0 or greater and 4 or less, and when k is an integer greater than zero, each $R^{12}$ independently represents a methyl group or an ethyl group, $L^C$ represents a single bond or a divalent linking group, $Ar^C$ represents an aromatic ring that may have a substituent, and $n^C$ represents 0, 1, or 2.

4. The electrophotographic photoreceptor according to claim 3, wherein the charge transport layer contains the polyester resin, and the polyester resin has at least one selected from the group consisting of a dicarboxylic acid unit (A1) represented by Formula (A1), a dicarboxylic acid unit (A3) represented by Formula (A3), and a dicarboxylic acid unit (A4) represented by Formula (A4), Formula (A1)

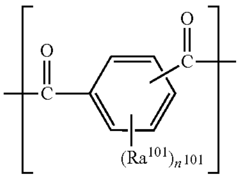

Formula (A3)

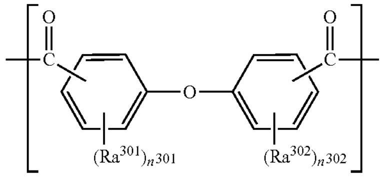

Formula (A4)

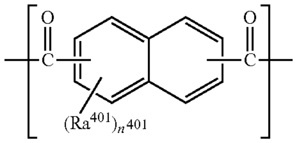

in Formula (A1), $n^{101}$ represents an integer of 0 or greater and 4 or less, and when $n^{101}$ is an integer greater than zero, each $Ra^{101}$ independently represents an alkyl group having 1 or more and 10 or less carbon atoms, an aryl group having 6 or more and 12 or less carbon atoms, or an alkoxy group having 1 or more and 6 or less carbon atoms, in Formula (A3), $n^{301}$ and $n^{302}$ each independently represent an integer of 0 or greater and 4 or less, and when $n^{301}$ is an integer greater than zero, each $Ra^{301}$, and when $n^{302}$ is an integer greater than zero, each $Ra^{302}$, independently represents an alkyl group having 1 or more and 10 or less carbon atoms, an aryl group having 6 or more and 12 or less carbon atoms, or an alkoxy group having 1 or more and 6 or less carbon atoms, in Formula (A4), $n^{401}$ represents an integer of 0 or greater and 6 or less, and when $n^{401}$ is an integer greater than zero, each $Ra^{401}$ independently represent an alkyl group having 1 or more and 10 or less carbon atoms, an aryl group having 6 or more and 12 or less carbon atoms, or an alkoxy group having 1 or more and 6 or less carbon atoms.

5. The electrophotographic photoreceptor according to claim 3, wherein the charge transport layer contains the polyester resin, and the polyester resin has at least one selected from the group consisting of a diol unit (B1) represented by Formula (B1), a diol unit (B2) represented by Formula (B2), a diol unit (B3) represented by Formula (B3), a diol unit (B4) represented by Formula (B4), a diol unit (B5) represented by Formula (B5), a diol unit (B6) represented by Formula (B6), and a diol unit (B8) represented by Formula (B8), Formula (B1)

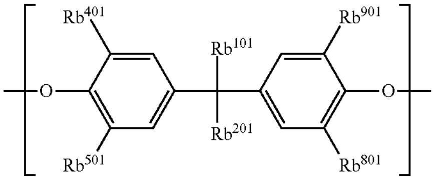

Formula (B2)

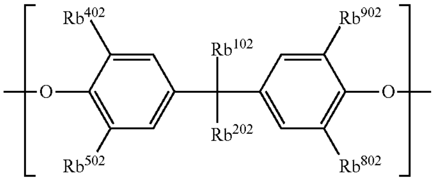

Formula (B3)

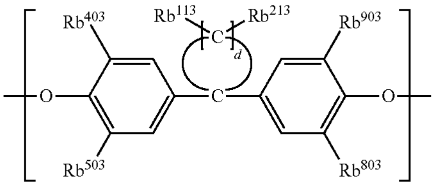

Formula (B4)

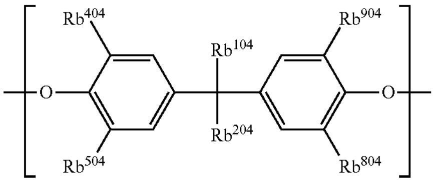

Formula (B5)

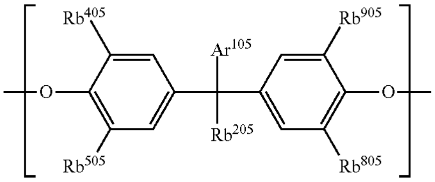

Formula (B6)

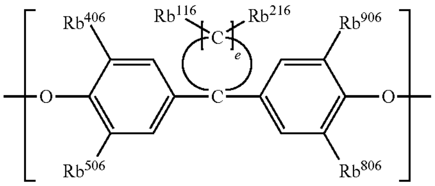

Formula (B8)

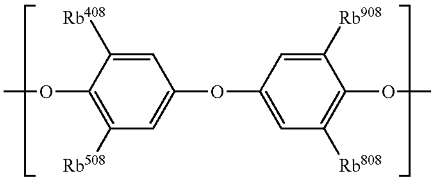

in Formula (B1), $Rb^{101}$ represents a branched alkyl group having 4 or more and 20 or less carbon atoms, $Rb^{201}$ represents a hydrogen atom or an alkyl group having 1 or more and 3 or less carbon atoms, and $Rb^{401}$, $Rb^{501}$, $Rb^{801}$, and $Rb^{901}$ each independently represent a hydrogen atom, an alkyl group having 1 or more and 4 or less carbon atoms, an alkoxy group having 1 or more and 6 or less carbon atoms, or a halogen atom, in Formula (B2), $Rb^{102}$ represents a linear alkyl group having 4 or more and 20 or less carbon atoms, $Rb^{202}$ represents a hydrogen atom or an alkyl group having 1 or more and 3 or less carbon atoms, and $Rb^{402}$, $Rb^{502}$, $Rb^{802}$, and $Rb^{902}$ each independently represent a hydrogen atom, an alkyl group having 1 or more and 4 or less carbon atoms, an alkoxy group having 1 or more and 6 or less carbon atoms, or a halogen atom, in Formula (B3), $Rb^{113}$ and $Rb^{213}$ each independently represent a hydrogen atom, a linear alkyl group having 1 or more and 3 or less carbon atoms, an alkoxy group having 1 or more and 4 or less carbon atoms, or a halogen atom, d represents an integer of 7 or greater and 15 or less, and $Rb^{403}$, $Rb^{503}$, $Rb^{803}$, and $Rb^{903}$ each independently represent a hydrogen atom, an alkyl group having 1 or more and 4 or less carbon atoms, an alkoxy group having 1 or more and 6 or less carbon atoms, or a halogen atom, in Formula (B4), $Rb^{104}$ and $Rb^{204}$ each independently represent a hydrogen atom, an alkyl group having 1 or more and 3 or less carbon atoms, and $Rb^{404}$, $Rb^{504}$, $Rb^{804}$, and $Rb^{904}$ each independently represent a hydrogen atom, an alkyl group having 1 or more and 4 or less carbon atoms, an alkoxy group having 1 or more and 6 or less carbon atoms, or a halogen atom, in Formula (B5), $Ar^{105}$ represents an aryl group having 6 or more and 12 or less carbon atoms or an aralkyl group having 7 or more and 20 or less carbon atoms, $Rb^{205}$ represents a hydrogen atom or an alkyl group having 1 or more and 3 or less carbon atoms, and $Rb^{405}$, $Rb^{505}$, $Rb^{805}$, and $Rb^{905}$ each independently represent a hydrogen atom, an alkyl group having 1 or more and 4 or less carbon atoms, an alkoxy group having 1 or more and 6 or less carbon atoms, or a halogen atom, in Formula (B6), $Rb^{116}$ and $Rb^{216}$ each independently represent a hydrogen atom, a linear alkyl group having 1 or more and 3 or less carbon atoms, an alkoxy group having 1 or more and 4 or less carbon atoms, or a halogen atom, e represents an integer of 4 or greater and 6 or less, and $Rb^{406}$, $Rb^{506}$, $Rb^{806}$, and $Rb^{906}$ each independently represent a hydrogen atom, an alkyl group having 1 or more and 4 or less carbon atoms, an alkoxy group having 1 or more and 6 or less carbon atoms, or a halogen atom, in Formula (B8), $Rb^{408}$, $Rb^{508}$, $Rb^{808}$, and $Rb^{908}$ each independently represent a hydrogen atom, an alkyl group having 1 or more and 4 or less carbon atoms, an alkoxy group having 1 or more and 6 or less carbon atoms, or a halogen atom.

6. The electrophotographic photoreceptor according to claim 3, wherein the charge transport layer contains the polycarbonate resin, and the polycarbonate resin has at least one selected from the group consisting of a constitutional unit (Ca1) represented by Formula (Ca1), a constitutional unit (Ca3) represented by Formula (Ca3), a constitutional unit (Ca4) represented by Formula (Ca4), a constitutional unit (Cb1) represented by Formula (Cb1), a constitutional unit (Cb2) represented by Formula (Cb2), a constitutional unit (Cb3) represented by Formula (Cb3), a constitutional unit (Cb4) represented by Formula (Cb4), a constitutional unit (Cb5) represented by Formula (Cb5), a constitutional unit (Cb6) represented by Formula (Cb6), and a constitutional unit (Cb8) represented by Formula (Cb8), Formula (Ca1)

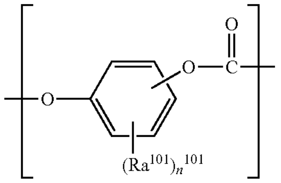

Formula (Ca3)

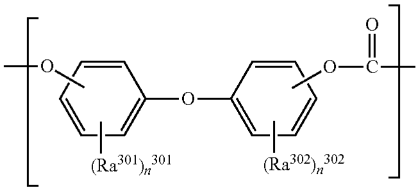

Formula (Ca4)

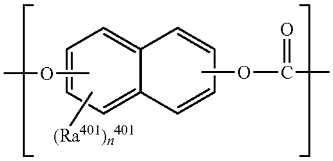

Formula (Cb1)

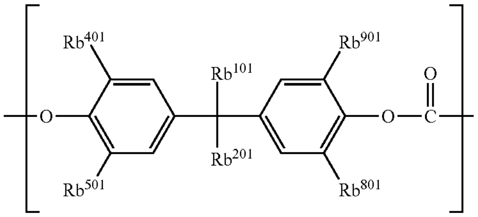

Formula (Cb2)

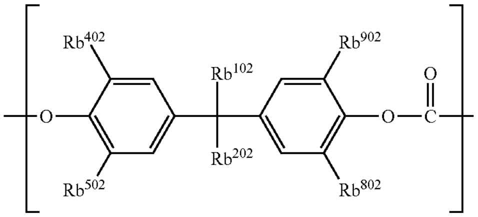

Formula (Cb3)

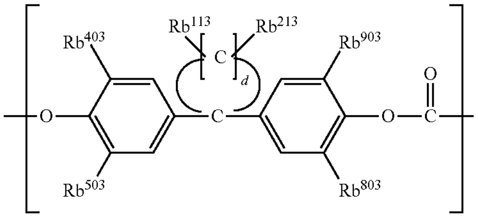

Formula (Cb4)

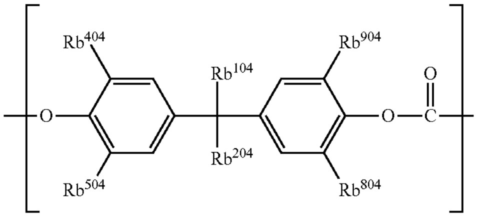

-continued

Formula (Cb5)

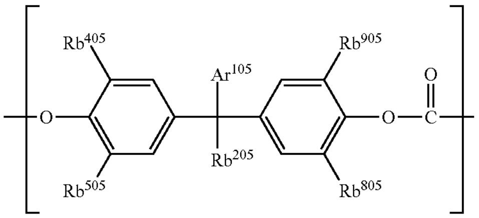

Formula (Cb6)

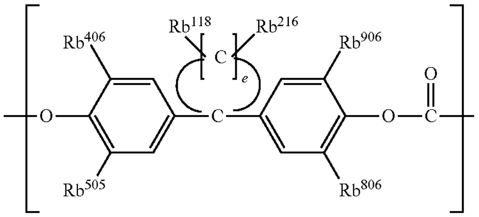

Formula (Cb8)

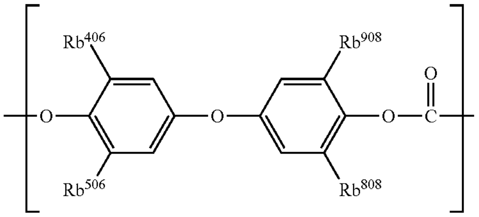

in Formula (Ca1), $n^{101}$ represents an integer of 0 or greater and 4 or less, and when $n^{101}$ is an integer greater than zero, each $Ra^{101}$ independently represents an alkyl group having 1 or more and 10 or less carbon atoms, an aryl group having 6 or more and 12 or less carbon atoms, or an alkoxy group having 1 or more and 6 or less carbon atoms, in Formula (Ca3), $n^{301}$ and $n^{302}$ each independently represent an integer of 0 or greater and 4 or less, and when $n^{301}$ is an integer greater than zero, each $Ra^{301}$, and when $n^{302}$ is an integer greater than zero, each $Ra^{302}$, independently represents an alkyl group having 1 or more and 10 or less carbon atoms, an aryl group having 6 or more and 12 or less carbon atoms, or an alkoxy group having 1 or more and 6 or less carbon atoms, in Formula (Ca4), $n^{401}$ represents an integer of 0 or greater and 6 or less, and when $n^{401}$ is an integer greater than zero, each $Ra^{401}$ independently represents an alkyl group having 1 or more and 10 or less carbon atoms, an aryl group having 6 or more and 12 or less carbon atoms, or an alkoxy group having 1 or more and 6 or less carbon atoms, in Formula (Cb1), $Rb^{101}$ represents a branched alkyl group having 4 or more and 20 or less carbon atoms, $Rb^{201}$ represents a hydrogen atom or an alkyl group having 1 or more and 3 or less carbon atoms, and $Rb^{401}$, $Rb^{501}$, $Rb^{801}$, and $Rb^{901}$ each independently represent a hydrogen atom, an alkyl group having 1 or more and 4 or less carbon atoms, an alkoxy group having 1 or more and 6 or less carbon atoms, or a halogen atom, in Formula (Cb2), $Rb^{102}$ represents a linear alkyl group having 4 or more and 20 or less carbon atoms, $Rb^{202}$ represents a hydrogen atom or an alkyl group having 1 or more and 3 or less carbon atoms, and $Rb^{402}$, $Rb^{502}$, $Rb^{802}$, and $Rb^{902}$ each independently represent a hydrogen atom, an alkyl group having 1 or more and 4 or less carbon atoms, an alkoxy group having 1 or more and 6 or less carbon atoms, or a halogen atom, in Formula (Cb3), $Rb^{113}$ and $Rb^{213}$ each independently represent a hydrogen atom, a linear alkyl group having 1 or more and 3 or less carbon atoms, an alkoxy group having 1 or more and 4 or less carbon atoms, or a halogen atom, d represents an integer of 7 or greater and 15 or less, and $Rb^{403}$, $Rb^{503}$, $Rb^{803}$, and $Rb^{903}$ each independently represent a hydrogen atom, an alkyl group having 1 or more and 4 or less carbon atoms, an alkoxy group having 1 or more and 6 or less carbon atoms, or a halogen atom, in Formula (Cb4), $Rb^{104}$ and $Rb^{204}$ each independently represent a hydrogen atom or an alkyl group having 1 or more and 3 or less carbon atoms, and $Rb^{404}$, $Rb^{504}$, $Rb^{804}$, and $Rb^{904}$ each independently represent a hydrogen atom, an alkyl group having 1 or more and 4 or less carbon atoms, an alkoxy group having 1 or more and 6 or less carbon atoms, or a halogen atom, in Formula (Cb5), $Ar^{105}$ represents an aryl group having 6 or more and 12 or less carbon atoms or an aralkyl group having 7 or more and 20 or less carbon atoms, $Rb^{205}$ represents a hydrogen atom or an alkyl group having 1 or more and 3 or less carbon atoms, and $Rb^{405}$, $Rb^{505}$, $Rb^{805}$, and $Rb^{905}$ each independently represent a hydrogen atom, an alkyl group having 1 or more and 4 or less carbon atoms, an alkoxy group having 1 or more and 6 or less carbon atoms, or a halogen atom, in Formula (Cb6), $Rb^{116}$ and $Rb^{216}$ each independently represent a hydrogen atom, a linear alkyl group having 1 or more and 3 or less carbon atoms, an alkoxy group having 1 or more and 4 or less carbon atoms, or a halogen atom, e represents an integer of 4 or greater and 6 or less, and $Rb^{406}$, $Rb^{506}$, $Rb^{806}$, and $Rb^{906}$ each independently represent a hydrogen atom, an alkyl group having 1 or more and 4 or less carbon atoms, an alkoxy group having 1 or more and 6 or less carbon atoms, or a halogen atom, in Formula (Cb8), $Rb^{408}$, $Rb^{508}$, $Rb^{808}$, and $Rb^{908}$ each independently represent a hydrogen atom, an alkyl group having 1 or more and 4 or less carbon atoms, an alkoxy group having 1 or more and 6 or less carbon atoms, or a halogen atom.

7. An electrophotographic photoreceptor comprising:

a conductive substrate; and a single layer type photosensitive layer disposed on the conductive substrate, wherein the single layer type photosensitive layer contains a charge transport material, at least one of a polyester resin or a polycarbonate resin that has a constitutional unit containing biphenyl represented by Formula (1), and an aromatic dicarboxylic acid represented by Formula (2), Formula (1)

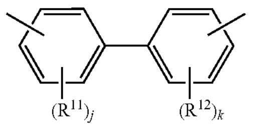

-continued

Formula (2)

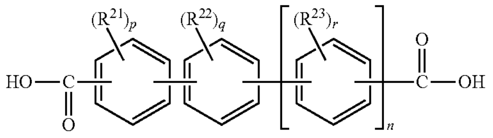

in Formula (1), j represents an integer of 0 or greater and 4 or less, and when j is an integer greater than zero, each $R^{11}$ independently represents a methyl group or an ethyl group, k represents an integer of 0 or greater and 4 or less, and when k is an integer greater than zero, each $R^{12}$ independently represents a methyl group or an ethyl group, in Formula (2), p represents an integer of 0 or greater and 4 or less, and when p is an integer greater than zero, each $R^{21}$ independently represents a methyl group or an ethyl group, q represents an integer of 0 or greater and 4 or less, and when q is an integer greater than zero, each $R^{22}$ independently represents a methyl group or an ethyl group, r represents an integer of 0 or greater and 4 or less, and when r is an integer greater than zero, each $R^{23}$ independently represents a methyl group or an ethyl group, and n represents 0 or 1.

8. The electrophotographic photoreceptor according to claim 7, wherein a mass proportion of the aromatic dicarboxylic acid in a total mass of the single layer type photosensitive layer is 0.4 ppm or greater and 1,000 ppm or less.

9. The electrophotographic photoreceptor according to claim 7, wherein the polyester resin has at least one of a dicarboxylic acid unit (1-A) represented by Formula (1-A) or a diol unit (1-B) represented by Formula (1-B), and the polycarbonate resin has a constitutional unit (1-C) represented by Formula (1-C), Formula (1-A)

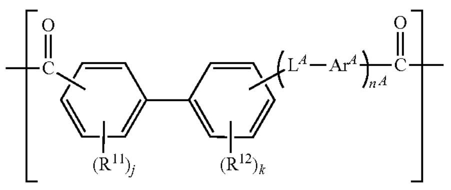

Formula (1-B)

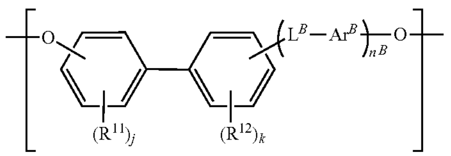

Formula (1-C)

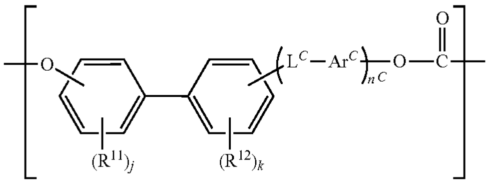

in Formula (1-A), j represents an integer of 0 or greater and 4 or less, and when j is an integer greater than zero, each $R^{11}$ independently represents a methyl group or an ethyl group, k represents an integer of 0 or greater and 4 or less, and when k is an integer greater than zero, each $R^{12}$ independently represents a methyl group or an ethyl group, $L^A$ represents a single bond or a divalent linking group, $Ar^A$ represents an aromatic ring that may have a substituent, and $n^A$ represents 0, 1, or 2, in Formula (1-B), j represents an integer of 0 or greater and 4 or less, and when j is an integer greater than zero, each $R^{11}$ independently represents a methyl group or an ethyl group, k represents an integer of 0 or greater and 4 or less, and when k is an integer greater than zero, each $R^{12}$ independently represents a methyl group or an ethyl group, $L^B$ represents a single bond or a divalent linking group, $Ar^B$ represents an aromatic ring that may have a substituent, and $n^B$ represents 0, 1, or 2, in Formula (1-C), j represents an integer of 0 or greater and 4 or less, and when i is an integer greater than zero, each $R^{11}$ independently represents a methyl group or an ethyl group, k represents an integer of 0 or greater and 4 or less, and when k is an integer greater than zero, each $R^{12}$ independently represents a methyl group or an ethyl group, $L^C$ represents a single bond or a divalent linking group, $Ar^C$ represents an aromatic ring that may have a substituent, and $n^C$ represents 0, 1, or 2.

10. The electrophotographic photoreceptor according to claim 9, wherein the single layer type photosensitive layer contains the polyester resin, and the polyester resin has at least one selected from the group consisting of a dicarboxylic acid unit (A1) represented by Formula (A1), a dicarboxylic acid unit (A3) represented by Formula (A3), and a dicarboxylic acid unit (A4) represented by Formula (A4), Formula (A1)

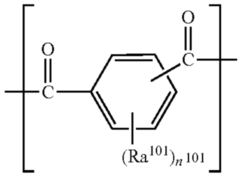

Formula (A3)

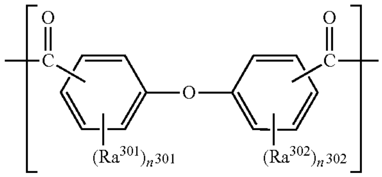

Formula (A4)

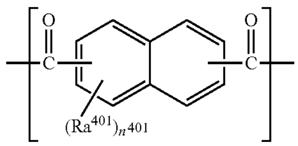

in Formula (A1), $n^{101}$ represents an integer of 0 or greater and 4 or less, and when $n^{101}$ is an integer greater than zero, each $Ra^{101}$ independently represents an alkyl group having 1 or more and 10 or less carbon atoms, an aryl group having 6 or more and 12 or less carbon atoms, or an alkoxy group having 1 or more and 6 or less carbon atoms, in Formula (A3), $n^{301}$ and $n^{302}$ each independently represent an integer of 0 or greater and 4 or less, and when $n^{301}$ is an integer greater than zero, each $Ra^{301}$, and when $n^{302}$ is an integer greater than zero, each $Ra^{302}$ independently represents an alkyl group having 1 or more and 10 or less carbon atoms, an aryl group having 6 or more and 12 or less carbon atoms, or an alkoxy group having 1 or more and 6 or less carbon atoms, in Formula (A4), $n^{401}$ represents an integer of 0 or greater and 6 or less, and independently represents an alkyl group having 1 or more and 10 or less carbon atoms, an aryl group having 6 or more and 12 or less carbon atoms, or an alkoxy group having 1 or more and 6 or less carbon atoms.

11. The electrophotographic photoreceptor according to claim 9, wherein the single layer type photosensitive layer contains the polyester resin, and the polyester resin has at least one selected from the group consisting of a diol unit (B1) represented by Formula (B1), a diol unit (B2) represented by Formula (B2), a diol unit (B3) represented by Formula (B3), a diol unit (B4) represented by Formula (B4), a diol unit (B5) represented by Formula (B5), a diol unit (B6) represented by Formula (B6), and a diol unit (B8) represented by Formula (B8), Formula (B1)

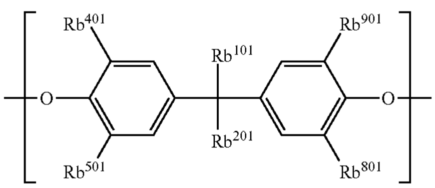

Formula (B2)

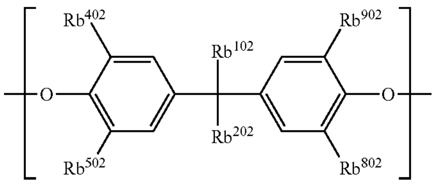

Formula (B3)

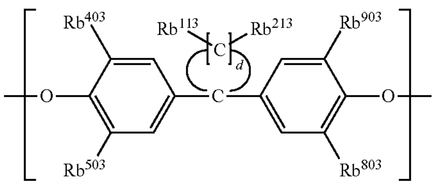

Formula (B4)

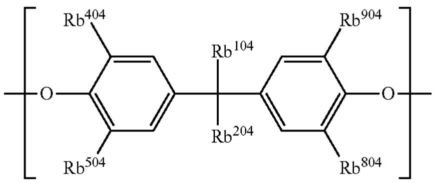

-continued

Formula (B5)

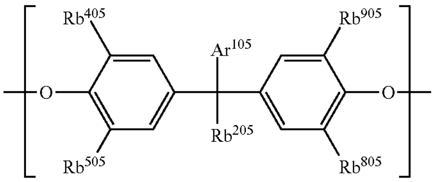

Formula (B6)

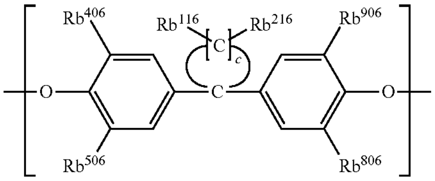

Formula (B8)

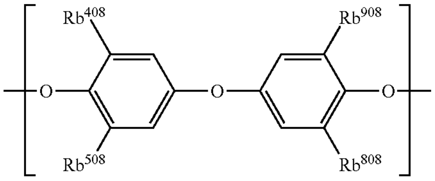

in Formula (B1), $Rb^{101}$ represents a branched alkyl group having 4 or more and 20 or less carbon atoms, $Rb^{201}$ represents a hydrogen atom or an alkyl group having 1 or more and 3 or less carbon atoms, and $Rb^{401}$, $Rb^{501}$, $Rb^{801}$, and $Rb^{901}$ each independently represent a hydrogen atom, an alkyl group having 1 or more and 4 or less carbon atoms, an alkoxy group having 1 or more and 6 or less carbon atoms, or a halogen atom, in Formula (B2), $Rb^{102}$ represents a linear alkyl group having 4 or more and 20 or less carbon atoms, $Rb^{202}$ represents a hydrogen atom or an alkyl group having 1 or more and 3 or less carbon atoms, and $Rb^{402}$, $Rb^{502}$, $Rb^{802}$, and $Rb^{902}$ each independently represent a hydrogen atom, an alkyl group having 1 or more and 4 or less carbon atoms, an alkoxy group having 1 or more and 6 or less carbon atoms, or a halogen atom, in Formula (B3), $Rb^{113}$ and $Rb^{213}$ each independently represent a hydrogen atom, a linear alkyl group having 1 or more and 3 or less carbon atoms, an alkoxy group having 1 or more and 4 or less carbon atoms, or a halogen atom, d represents an integer of 7 or greater and 15 or less, and $Rb^{403}$, $Rb^{503}$, $Rb^{803}$, and $Rb^{903}$ each independently represent a hydrogen atom, an alkyl group having 1 or more and 4 or less carbon atoms, an alkoxy group having 1 or more and 6 or less carbon atoms, or a halogen atom, in Formula (B4), $Rb^{104}$ and $Rb^{204}$ each independently represent a hydrogen atom, an alkyl group having 1 or more and 3 or less carbon atoms, and $Rb^{404}$, $Rb^{504}$, $Rb^{804}$, and $Rb^{904}$ each independently represent a hydrogen atom, an alkyl group having 1 or more and 4 or less carbon atoms, an alkoxy group having 1 or more and 6 or less carbon atoms, or a halogen atom, in Formula (B5), $Ar^{105}$ represents an aryl group having 6 or more and 12 or less carbon atoms or an aralkyl group having 7 or more and 20 or less carbon atoms, $Rb^{205}$ represents a hydrogen atom or an alkyl group having 1 or more and 3 or less carbon atoms, and $Rb^{405}$, $Rb^{505}$, $Rb^{805}$, and $Rb^{905}$ each independently represent a hydrogen atom, an alkyl group having 1 or more and 4 or less carbon atoms, an alkoxy group having 1 or more and 6 or less carbon atoms, or a halogen atom, in Formula (B6), $Rb^{116}$ and $Rb^{216}$ each independently represent a hydrogen atom, a linear alkyl group having 1 or more and 3 or less carbon atoms, an alkoxy group having 1 or more and 4 or less carbon atoms, or a halogen atom, e represents an integer of 4 or greater and 6 or less, and $Rb^{406}$, $Rb^{506}$, $Rb^{806}$, and $Rb^{906}$ each independently represent a hydrogen atom, an alkyl group having 1 or more and 4 or less carbon atoms, an alkoxy group having 1 or more and 6 or less carbon atoms, or a halogen atom, in Formula (B8), $Rb^{408}$, $Rb^{508}$, $Rb^{808}$, and $Rb^{908}$ each independently represent a hydrogen atom, an alkyl group having 1 or more and 4 or less carbon atoms, an alkoxy group having 1 or more and 6 or less carbon atoms, or a halogen atom.

12. The electrophotographic photoreceptor according to claim 9, wherein the single layer type photosensitive layer contains the polycarbonate resin, and the polycarbonate resin has at least one selected from the group consisting of a constitutional unit (Ca1) represented by Formula (Ca1), a constitutional unit (Ca3) represented by Formula (Ca3), a constitutional unit (Ca4) represented by Formula (Ca4), a constitutional unit (Cb1) represented by Formula (Cb1), a constitutional unit (Cb2) represented by Formula (Cb2), a constitutional unit (Cb3) represented by Formula (Cb3), a constitutional unit (Cb4) represented by Formula (Cb4), a constitutional unit (Cb5) represented by Formula (Cb5), a constitutional unit (Cb6) represented by Formula (Cb6), and a constitutional unit (Cb8) represented by Formula (Cb8), Formula (Ca1)

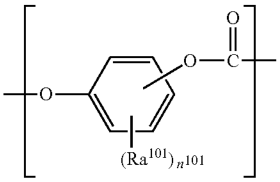

Formula (Ca3)

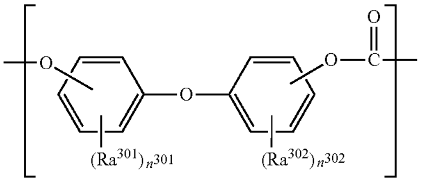

Formula (Ca4)

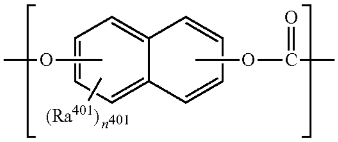

Formula (Cb1)

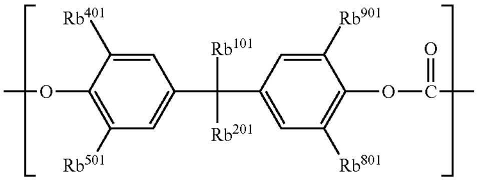

-continued

Formula (Cb2)

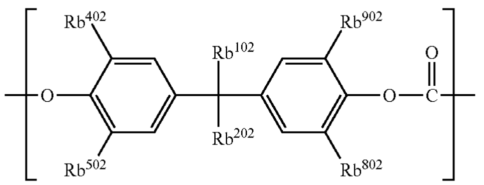

Formula (Cb3)

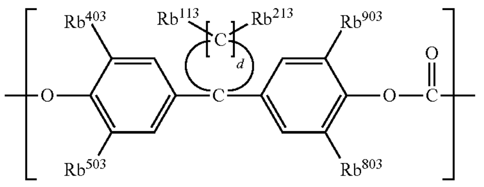

Formula (Cb4)

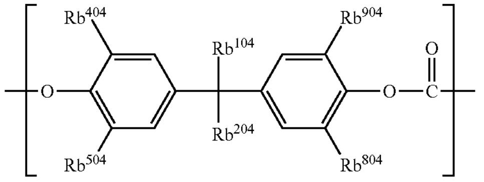

Formula (Cb5)

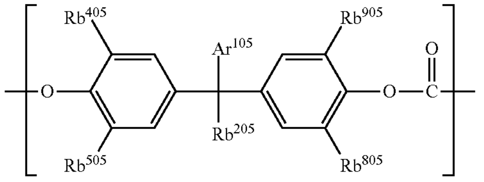

Formula (Cb6)

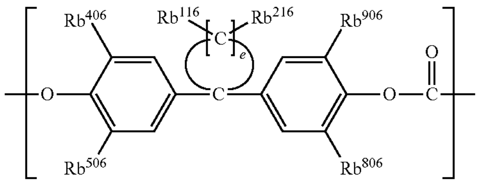

Formula (Cb8)

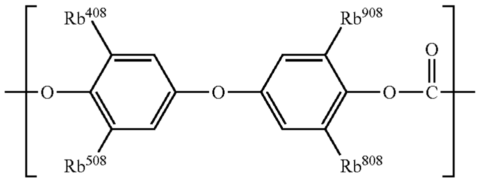

in Formula (Ca1), $n^{101}$ represents an integer of 0 or greater and 4 or less, and when $n^{101}$ is an integer greater than zero, each $Ra^{101}$ independently represents an alkyl group having 1 or more and 10 or less carbon atoms, an aryl group having 6 or more and 12 or less carbon atoms, or an alkoxy group having 1 or more and 6 or less carbon atoms, in Formula (Ca3), $n^{301}$ and $n^{302}$ each independently represent an integer of 0 or greater and 4 or less, and when $n^{301}$ is an integer greater than zero, each $Ra^{301}$, and when $n^{302}$ is an integer greater than zero, each $Ra^{302}$, independently represents an alkyl group having 1 or more and 10 or less carbon atoms, an aryl group having 6 or more and 12 or less carbon atoms, or an alkoxy group having 1 or more and 6 or less carbon atoms, in Formula (Ca4), $n^{401}$ represents an integer of 0 or greater and 6 or less, and when $n^{401}$ is an integer greater than zero, each $Ra^{401}$ independently represents an alkyl group having 1 or more and 10 or less carbon atoms, an aryl group having 6 or more and 12 or less carbon atoms, or an alkoxy group having 1 or more and 6 or less carbon atoms, in Formula (Cb1), $Rb^{101}$ represents a branched alkyl group having 4 or more and 20 or less carbon atoms, $Rb^{201}$ represents a hydrogen atom or an alkyl group having 1 or more and 3 or less carbon atoms, and $Rb^{401}$, $Rb^{501}$, $Rb^{801}$, and $Rb^{901}$ each independently represent a hydrogen atom, an alkyl group having 1 or more and 4 or less carbon atoms, an alkoxy group having 1 or more and 6 or less carbon atoms, or a halogen atom, in Formula (Cb2), $Rb^{102}$ represents a linear alkyl group having 4 or more and 20 or less carbon atoms, $Rb^{202}$ represents a hydrogen atom or an alkyl group having 1 or more and 3 or less carbon atoms, and $Rb^{402}$, $Rb^{502}$, $Rb^{802}$, and $Rb^{902}$ each independently represent a hydrogen atom, an alkyl group having 1 or more and 4 or less carbon atoms, an alkoxy group having 1 or more and 6 or less carbon atoms, or a halogen atom, in Formula (Cb3), $Rb^{113}$ and $Rb^{213}$ each independently represent a hydrogen atom, a linear alkyl group having 1 or more and 3 or less carbon atoms, an alkoxy group having 1 or more and 4 or less carbon atoms, or a halogen atom, d represents an integer of 7 or greater and 15 or less, and $Rb^{403}$, $Rb^{503}$, $Rb^{803}$, and $Rb^{903}$ each independently represent a hydrogen atom, an alkyl group having 1 or more and 4 or less carbon atoms, an alkoxy group having 1 or more and 6 or less carbon atoms, or a halogen atom, in Formula (Cb4), $Rb^{104}$ and $Rb^{204}$ each independently represent a hydrogen atom or an alkyl group having 1 or more and 3 or less carbon atoms, and $Rb^{404}$, $Rb^{504}$, $Rb^{804}$, and $Rb^{904}$ each independently represent a hydrogen atom, an alkyl group having 1 or more and 4 or less carbon atoms, an alkoxy group having 1 or more and 6 or less carbon atoms, or a halogen atom, in Formula (Cb5), $Ar^{105}$ represents an aryl group having 6 or more and 12 or less carbon atoms or an aralkyl group having 7 or more and 20 or less carbon atoms, $Rb^{205}$ represents a hydrogen atom or an alkyl group having 1 or more and 3 or less carbon atoms, and $Rb^{405}$, $Rb^{505}$, $Rb^{805}$, and $Rb^{905}$ each independently represent a hydrogen atom, an alkyl group having 1 or more and 4 or less carbon atoms, an alkoxy group having 1 or more and 6 or less carbon atoms, or a halogen atom, in Formula (Cb6), $Rb^{116}$ and $Rb^{216}$ each independently represent a hydrogen atom, a linear alkyl group having 1 or more and 3 or less carbon atoms, an alkoxy group having 1 or more and 4 or less carbon atoms, or a halogen atom, e represents an integer of 4 or greater and 6 or less, and $Rb^{406}$, $Rb^{506}$, $Rb^{806}$, and $Rb^{906}$ each independently represent a hydrogen atom, an alkyl group having 1 or more and 4 or less carbon atoms, an alkoxy group having 1 or more and 6 or less carbon atoms, or a halogen atom, in Formula (Cb8), $Rb^{408}$, $Rb^{508}$, $Rb^{808}$, and $Rb^{908}$ each independently represent a hydrogen atom, an alkyl group having 1 or more and 4 or less carbon atoms, an alkoxy group having 1 or more and 6 or less carbon atoms, or a halogen atom.

13. A process cartridge comprising:

the electrophotographic photoreceptor according to claim 1, wherein the process cartridge is attachable to and detachable from an image forming apparatus.

14. A process cartridge comprising:

the electrophotographic photoreceptor according to claim 2, wherein the process cartridge is attachable to and detachable from an image forming apparatus.

15. A process cartridge comprising:

the electrophotographic photoreceptor according to claim 3, wherein the process cartridge is attachable to and detachable from an image forming apparatus.

16. A process cartridge comprising:

the electrophotographic photoreceptor according to claim 4, wherein the process cartridge is attachable to and detachable from an image forming apparatus.

17. A process cartridge comprising:

the electrophotographic photoreceptor according to claim 5, wherein the process cartridge is attachable to and detachable from an image forming apparatus.

18. A process cartridge comprising:

the electrophotographic photoreceptor according to claim 6, wherein the process cartridge is attachable to and detachable from an image forming apparatus.

19. A process cartridge comprising:

the electrophotographic photoreceptor according to claim 7, wherein the process cartridge is attachable to and detachable from an image forming apparatus.

20. An image forming apparatus comprising:

the electrophotographic photoreceptor according to claim 1;

a charging device that charges a surface of the electrophotographic photoreceptor;

an electrostatic latent image forming device that forms an electrostatic latent image on the charged surface of the electrophotographic photoreceptor;

a developing device that develops the electrostatic latent image formed on the surface of the electrophotographic photoreceptor with a developer containing a toner to form a toner image; and a transfer device that transfers the toner image to a surface of a recording medium.

* * * * *